Figure 1:
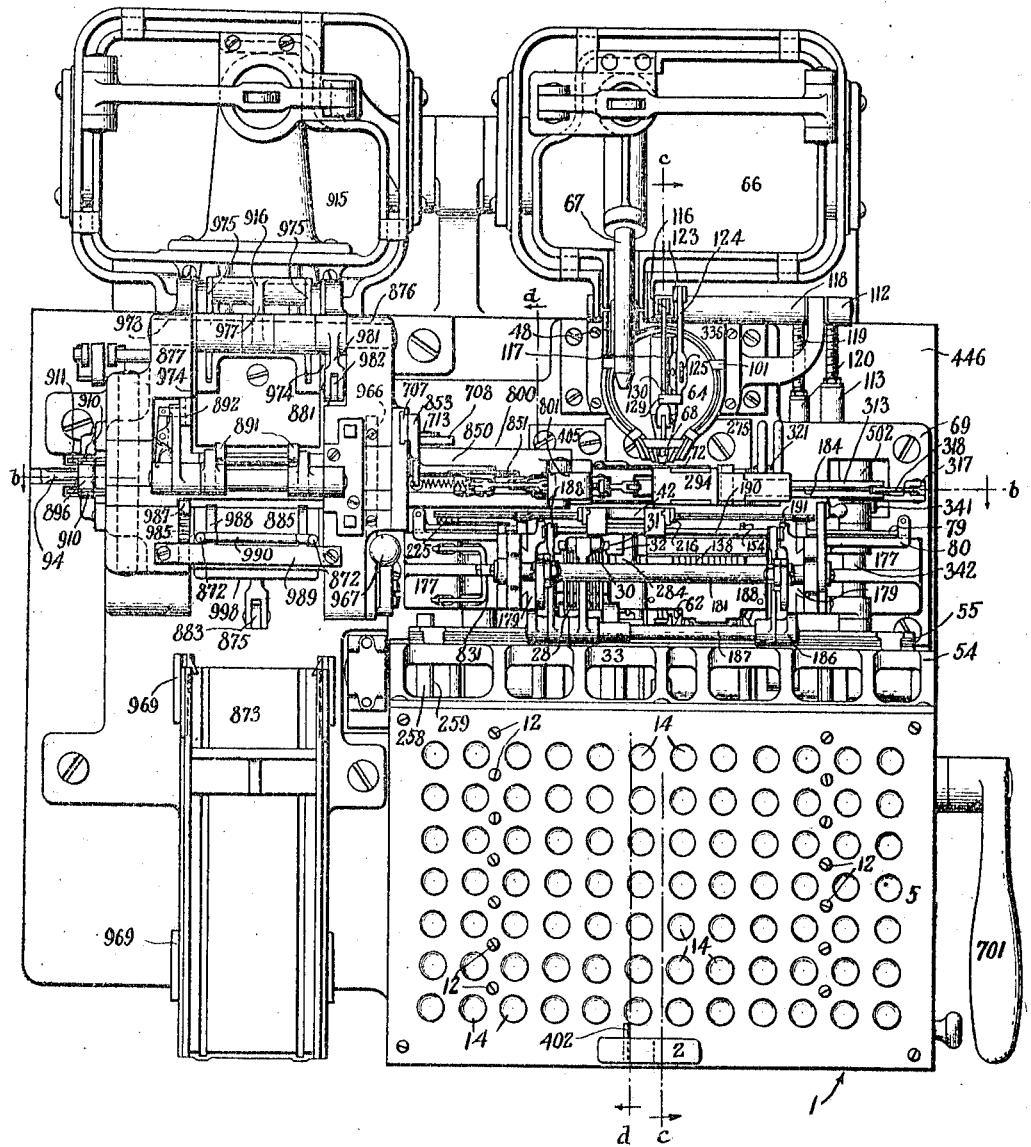

E. B. BARBER.
TYPOGRAPHIC MACHINE.
APPLICATION FILED SEPT. 16, 1911.

1,054,384.

Patented Feb. 25, 1913.
35 SHEETS—SHEET 1.

Witnesses
C. E. Smith.
C. Hansen

Inventor
Ernst B. Barber
by Chas. H. Riches
Attorney.

E. B. BARBER.
TYPOGRAPHIC MACHINE.
APPLICATION FILED SEPT. 16, 1911.

1,054,384.

Patented Feb. 25, 1913.
35 SHEETS—SHEET 2.

E. B. BARBER.
TYPOGRAPHIC MACHINE.
APPLICATION FILED SEPT. 16, 1911.
1,054,384.
Patented Feb. 25, 1913.
35 SHEETS—SHEET 3.
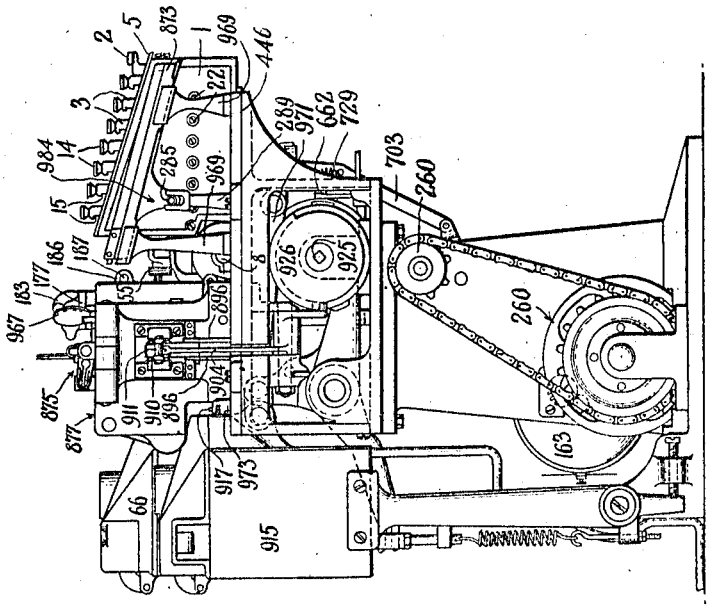
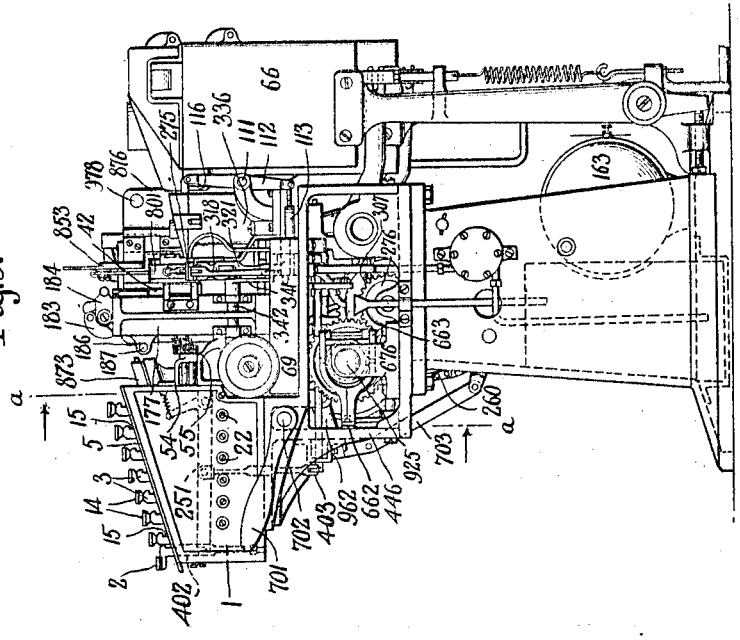
Witnesses
C. E. Smith.
C. Hansen
Inventor
Ernest B. Barber
by Chas. H. Riches
Attorney.

E. B. BARBER.
TYPOGRAPHIC MACHINE.
APPLICATION FILED SEPT. 16, 1911.
1,054,384.
Patented Feb. 25, 1913.
35 SHEETS—SHEET 4.
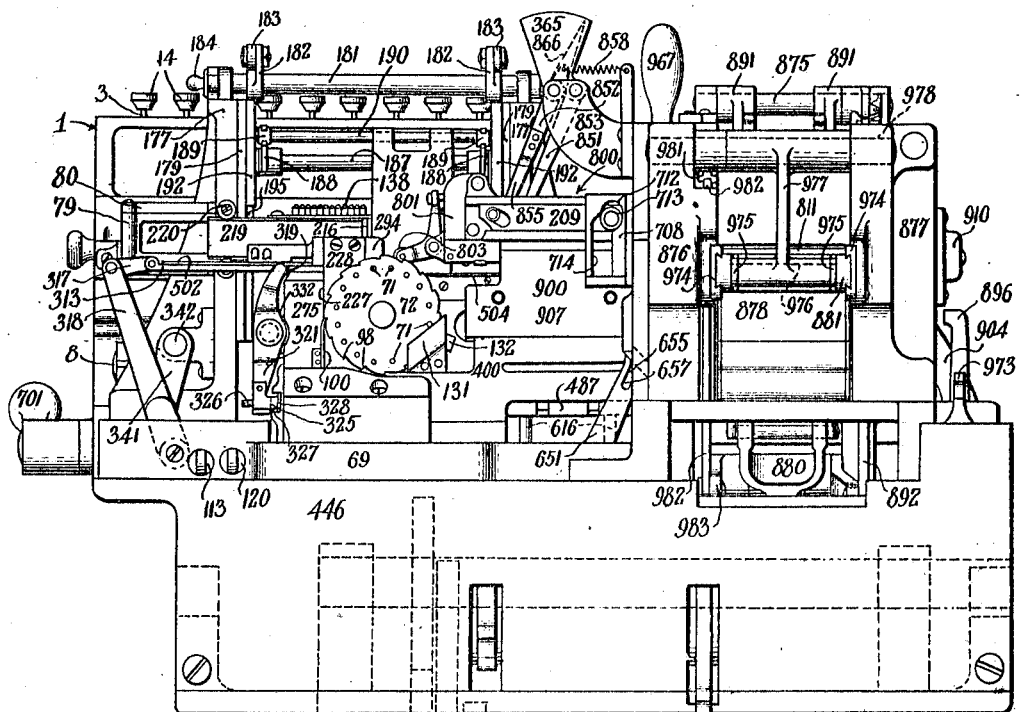
Fig. 5.
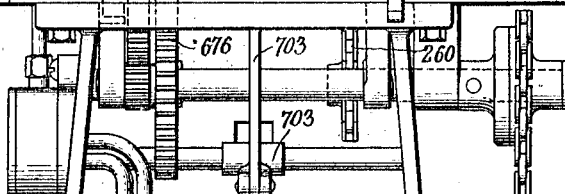
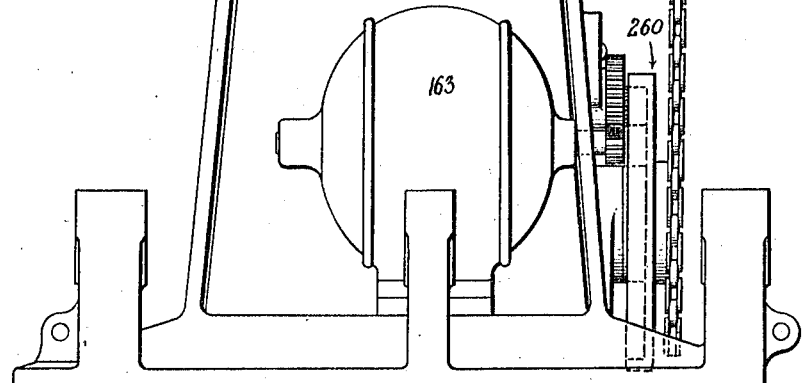
Witnesses
C. E. Smith.
C. Hansen
Inventor
Ernest B. Barber
by Chas. H. Riche
Attorney.

E. B. BARBER.
TYPOGRAPHIC MACHINE.
APPLICATION FILED SEPT. 16, 1911.

1,054,384.

Patented Feb. 25, 1913.

35 SHEETS—SHEET 5.

Witnesses
C. E. Smith.
C. Hansen

Inventor
Ernest B. Barber
by Chas. H. Nichols
Attorney.

E. B. BARBER.
TYPOGRAPHIC MACHINE.
APPLICATION FILED SEPT. 16, 1911.
1,054,384.
Patented Feb. 25, 1913.
35 SHEETS—SHEET 7.
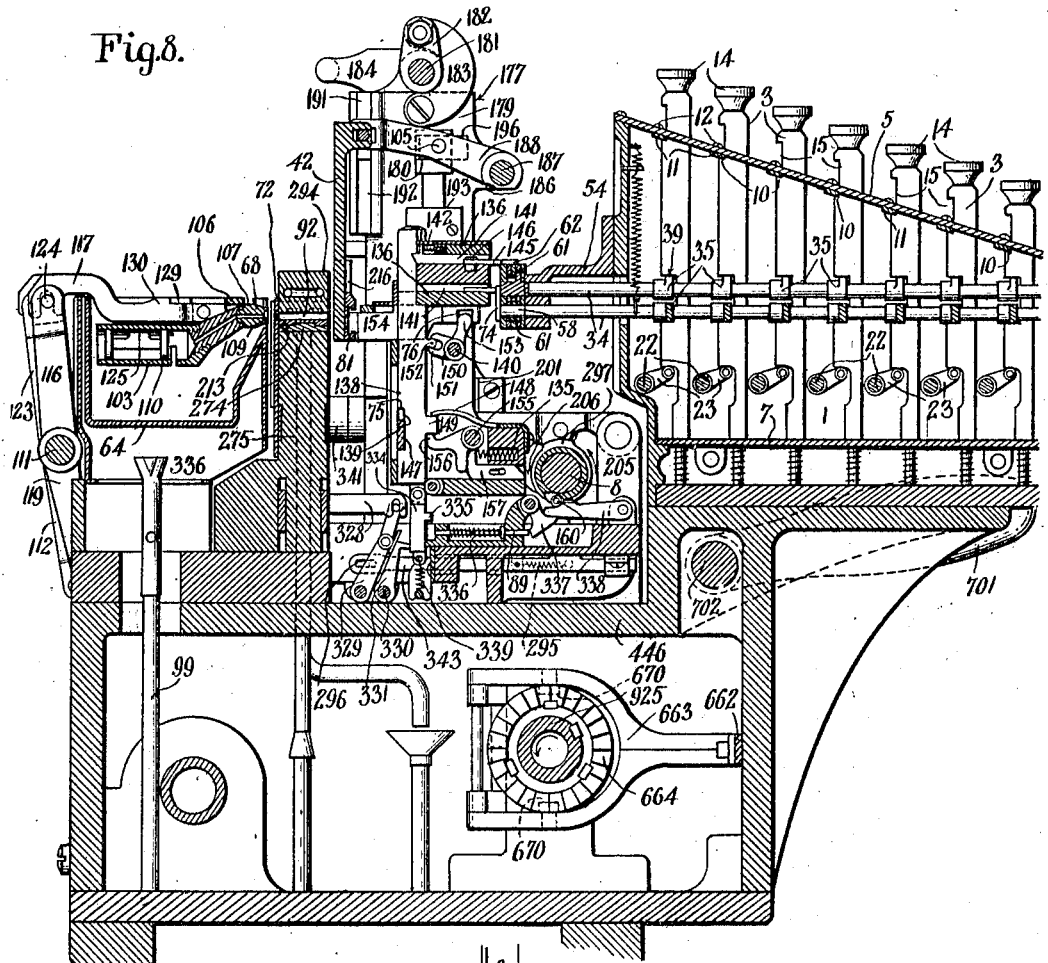
Fig. 8.
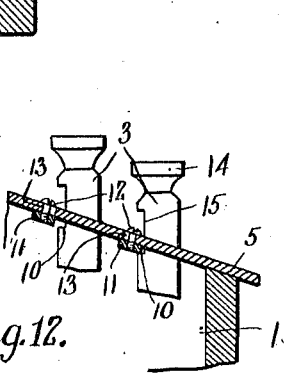
Fig. 12.
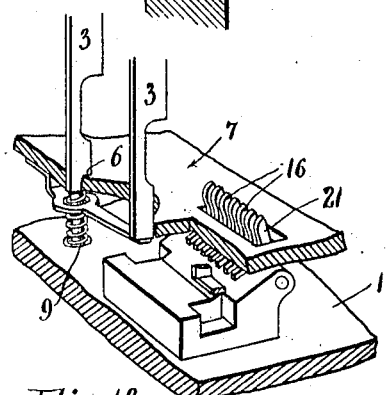
Fig. 13.
Fig. 14.
Witnesses
G. E. Smith
E. Hansen
Inventor
Ernest B. Barber
by Chas. H. Niches
Attorney.

E. B. BARBER.
TYPOGRAPHIC MACHINE.
APPLICATION FILED SEPT. 16, 1911.

1,054,384.

Patented Feb. 25, 1913.
35 SHEETS—SHEET 9.

WITNESSES:

INVENTOR:
Ernest B. Barber
by Chas H Rickes
Attorney

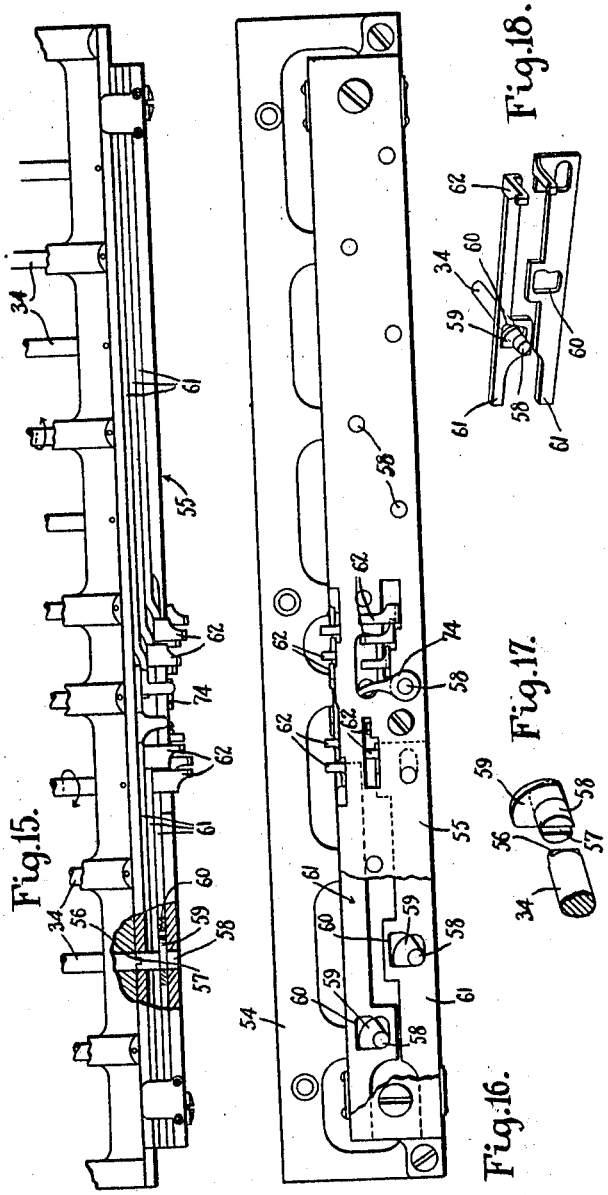

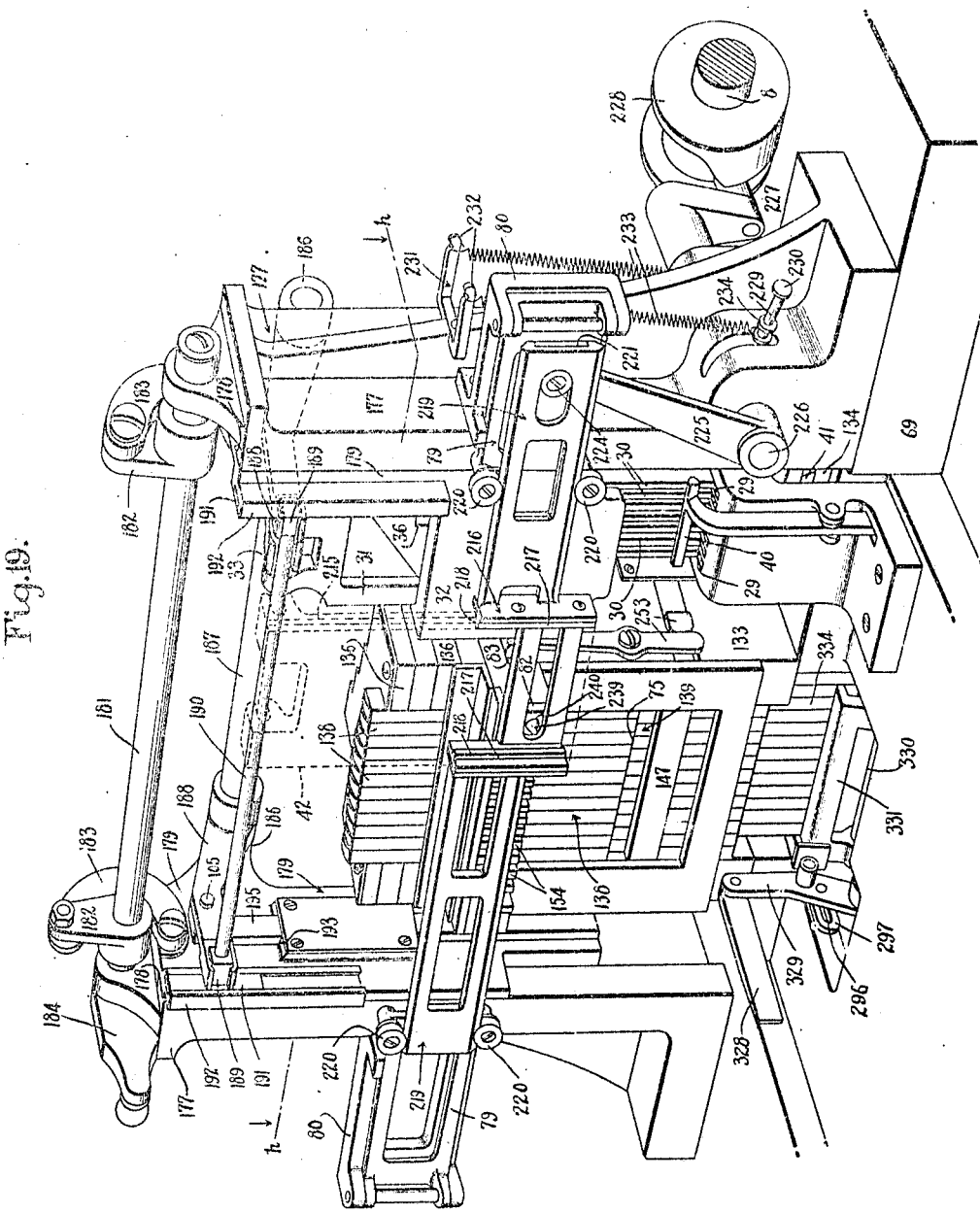

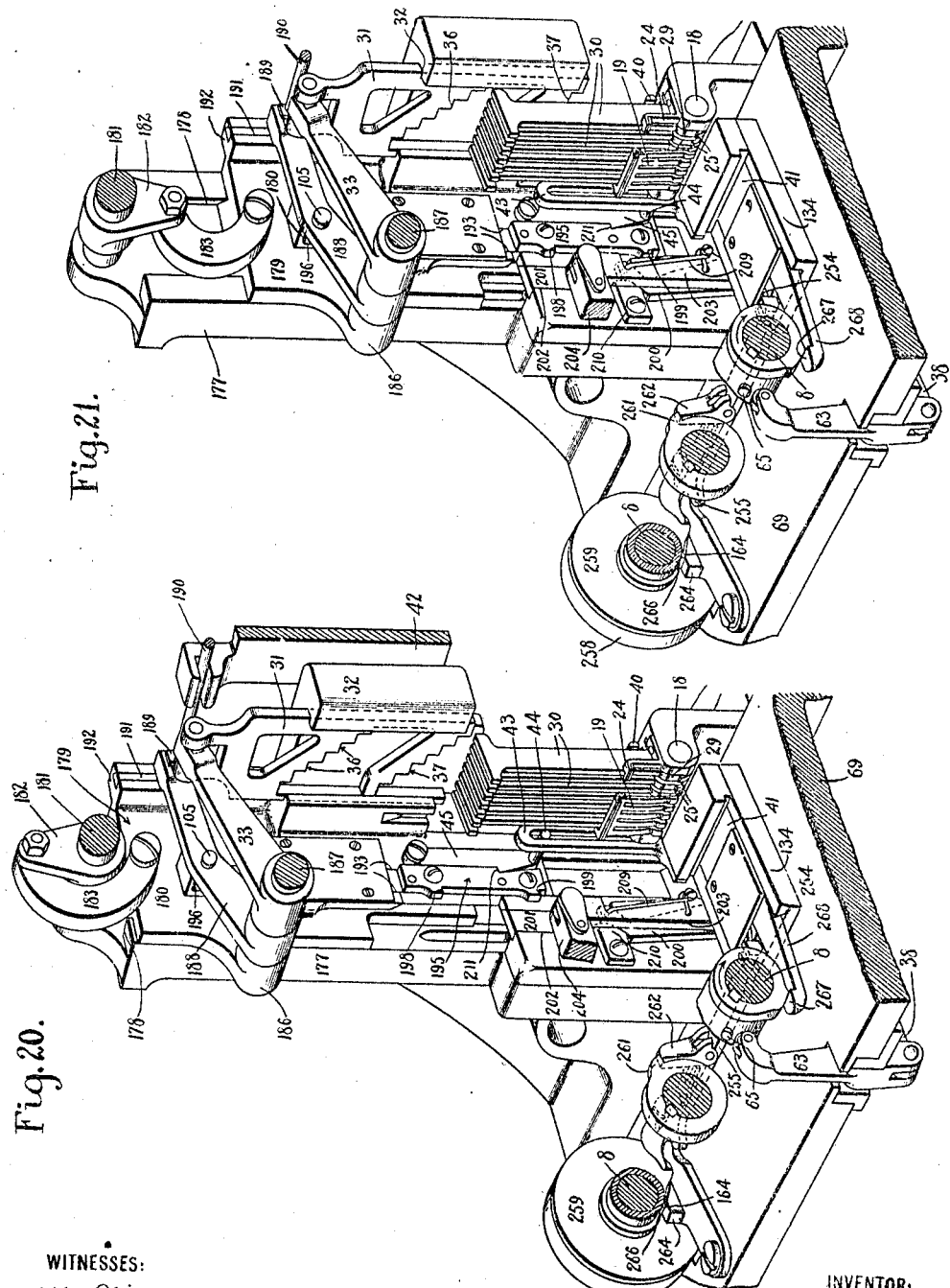

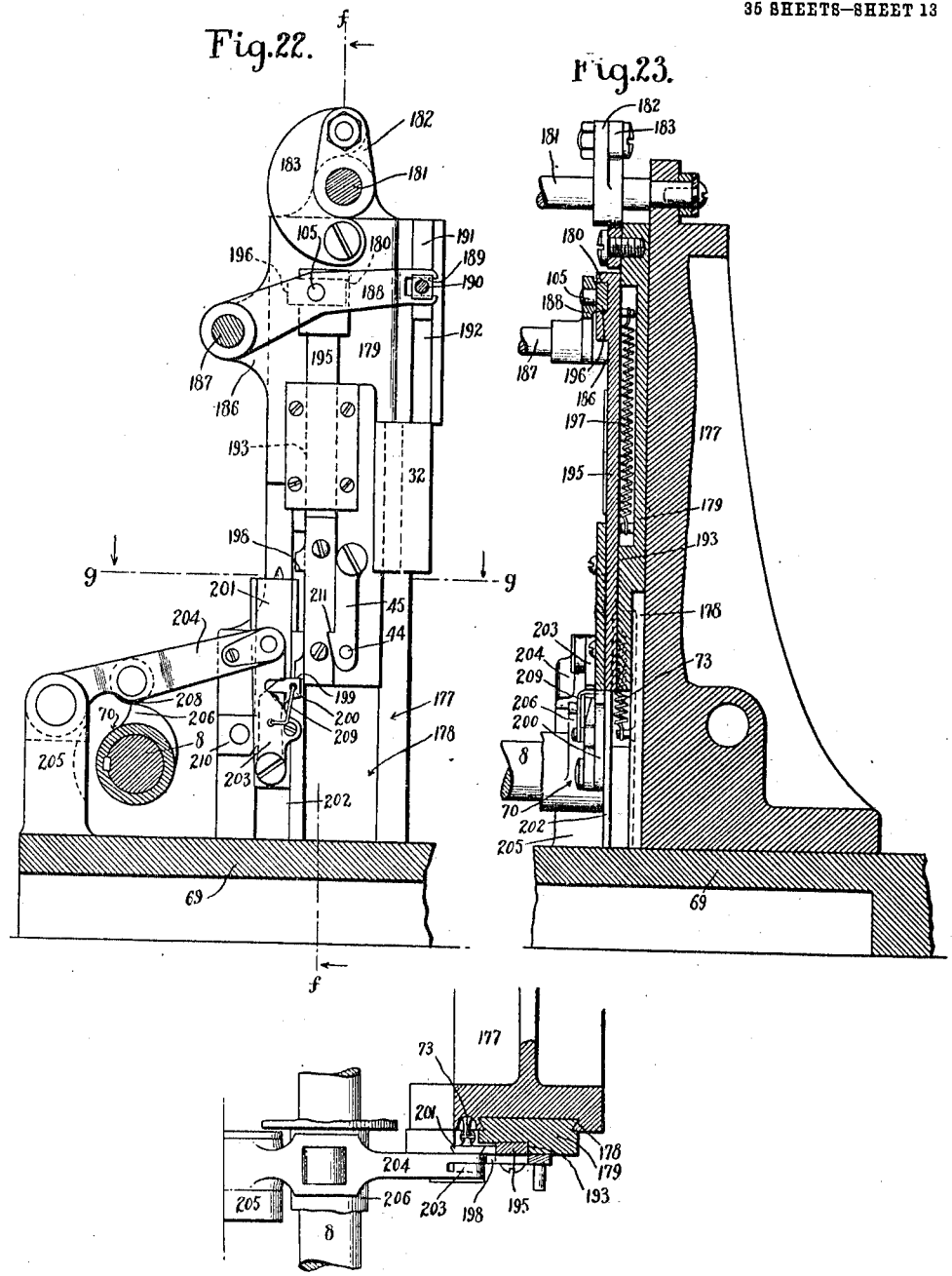

E. B. BARBER.
TYPOGRAPHIC MACHINE.
APPLICATION FILED SEPT. 16, 1911.

1,054,384.

Patented Feb. 25, 1913.
35 SHEETS—SHEET 14.

WITNESSES:

INVENTOR:
Ernest B. Barber
by Chas. H. Riches
Atty

E. B. BARBER.
TYPOGRAPHIC MACHINE.
APPLICATION FILED SEPT. 16, 1911.
1,054,384.
Patented Feb. 25, 1913.
35 SHEETS—SHEET 15.
Fig. 27.    Fig. 28.    Fig. 29.
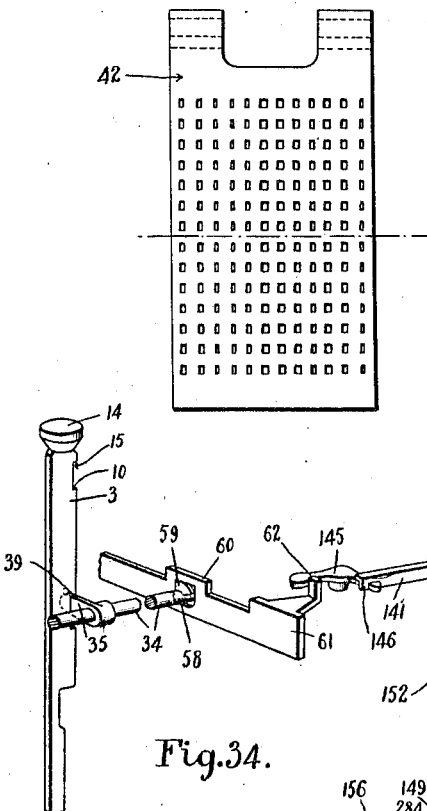
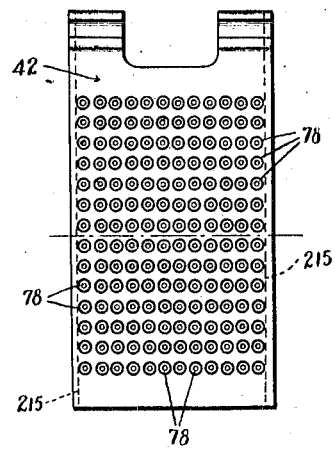
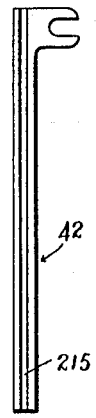
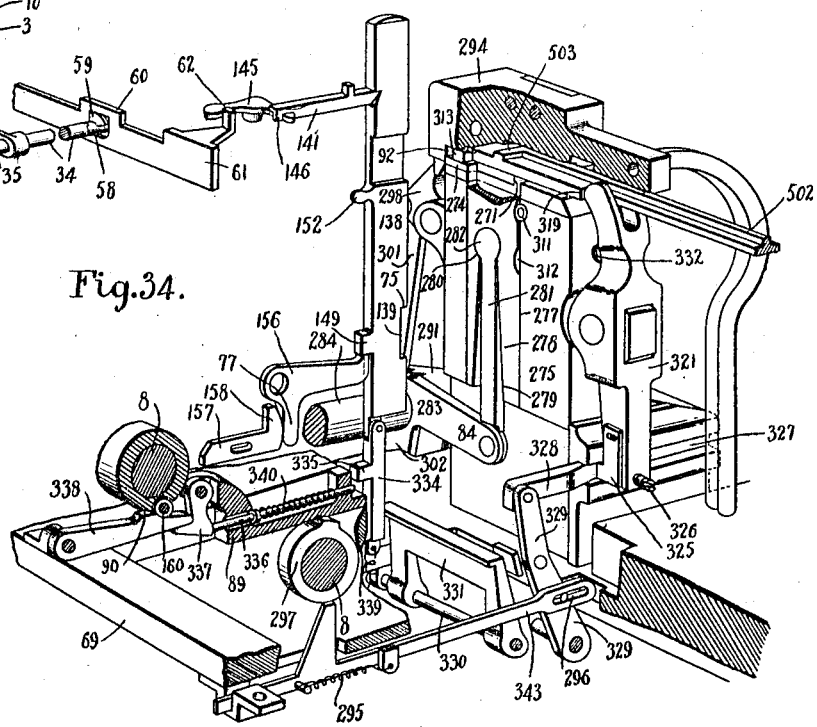
WITNESSES:
INVENTOR:
Ernest B. Barber
by Chas H Riches
Attorney E. B. BARBER.
TYPOGRAPHIC MACHINE.
APPLICATION FILED SEPT. 16, 1911.
1,054,384.
Patented Feb. 25, 1913.
35 SHEETS—SHEET 16.
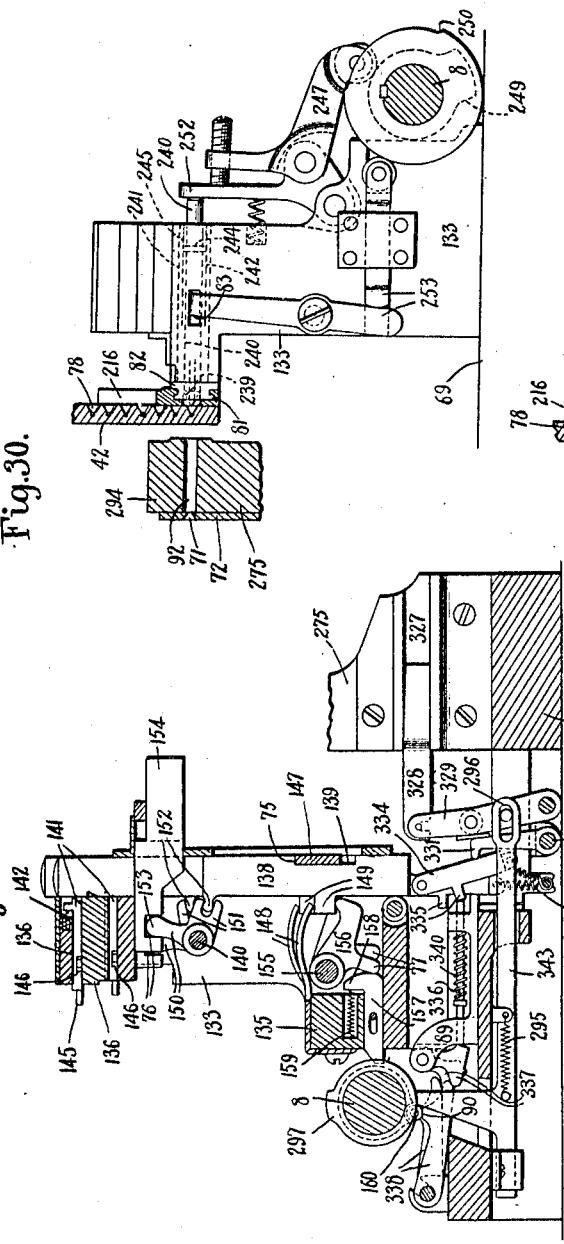
WITNESSES:
INVENTOR:
Ernest B Barber
by Chas H Riches
Attorney

E. B. BARBER.
TYPOGRAPHIC MACHINE.
APPLICATION FILED SEPT. 16, 1911.

1,054,384.

Patented Feb. 25, 1913.
35 SHEETS—SHEET 17.

WITNESSES:

INVENTOR:
Ernest B. Barber
by Chas H Riches
attorney

E. B. BARBER.
TYPOGRAPHIC MACHINE.
APPLICATION FILED SEPT. 16, 1911.

1,054,384.

Patented Feb. 25, 1913.
35 SHEETS—SHEET 18.

WITNESSES:

INVENTOR:
Ernest B Barber
by Chas H Riches
Attorney

E. B. BARBER.
TYPOGRAPHIC MACHINE.
APPLICATION FILED SEPT. 16, 1911.
1,054,384.
Patented Feb. 25, 1913.
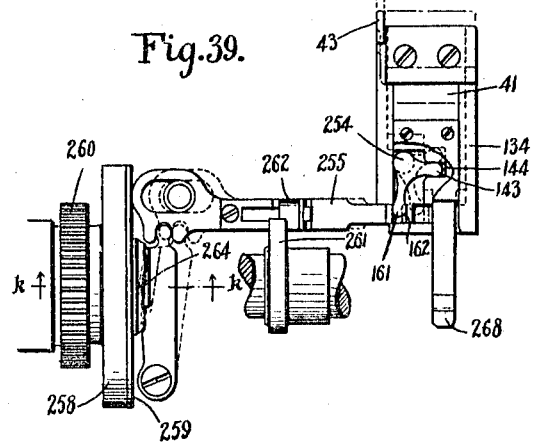
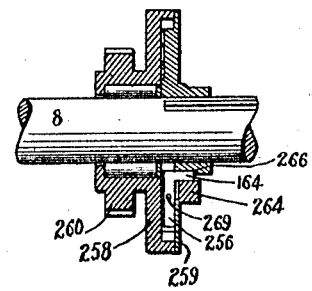
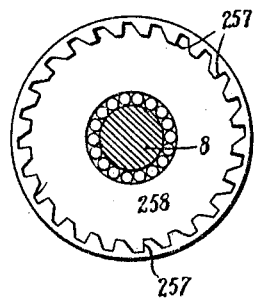
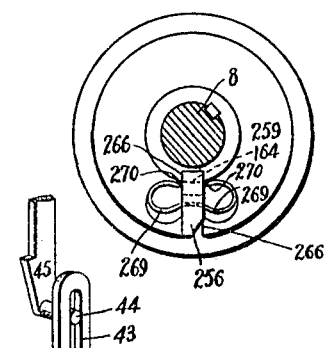
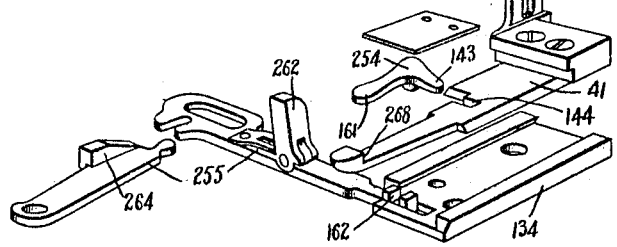
INVENTOR:
Ernest B Barber

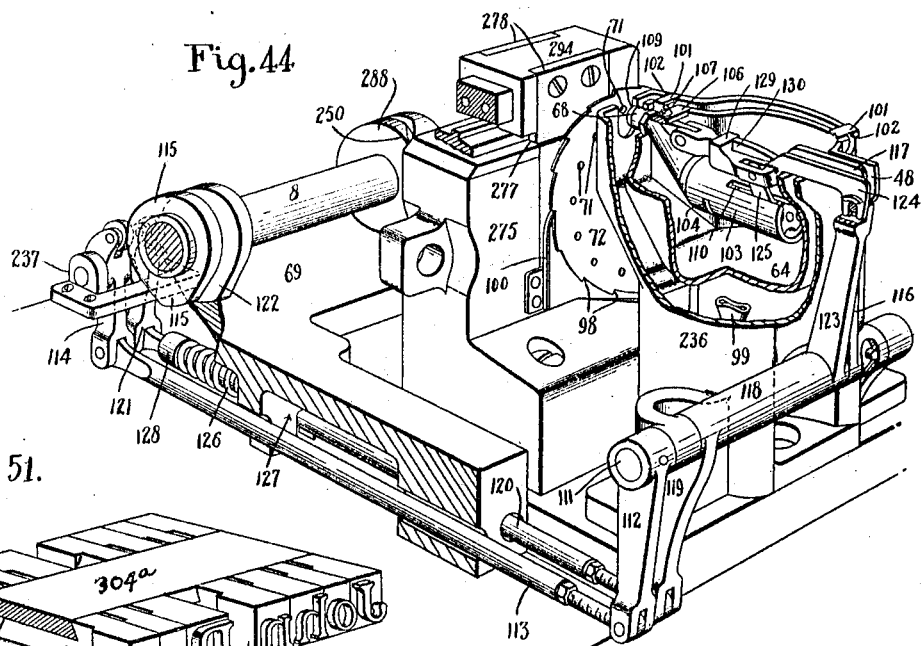
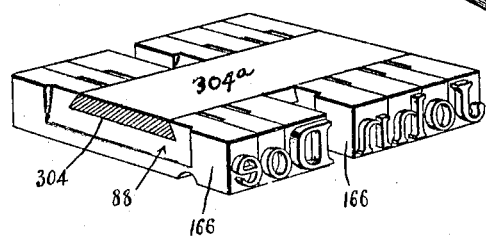
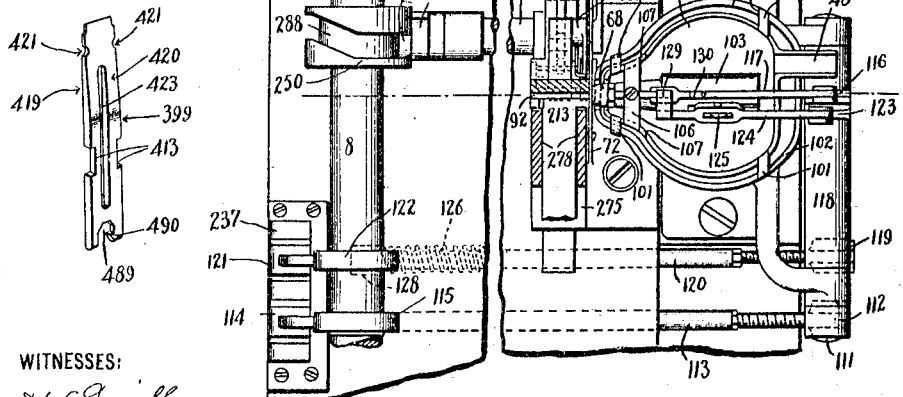

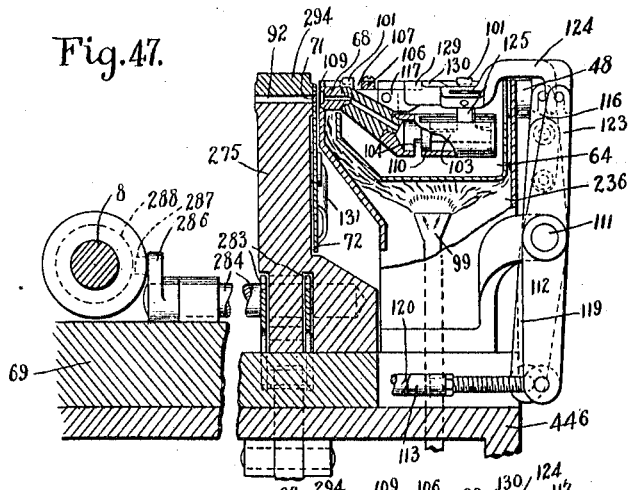

E. B. BARBER.
TYPOGRAPHIC MACHINE.
APPLICATION FILED SEPT. 16, 1911.

1,054,384.

Patented Feb. 25, 1913.
36 SHEETS—SHEET 22.

Witnesses
C. E. Smith
C. Hansen

Inventor
Ernest B. Barber
by Chas. H. Riches
Attorney.

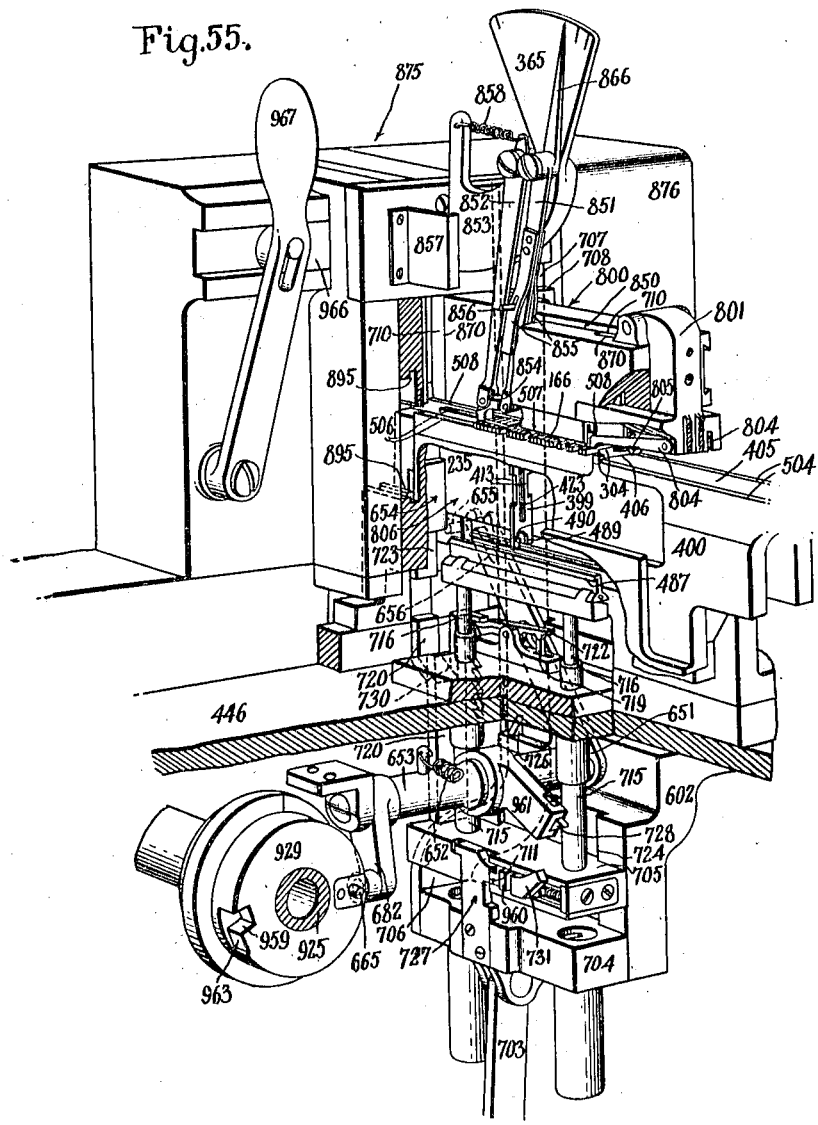

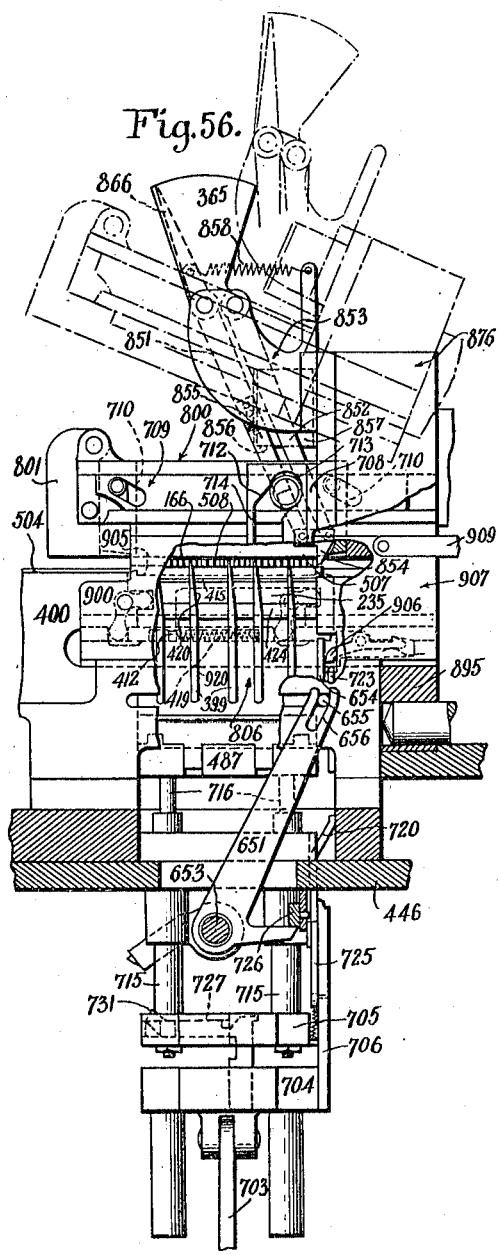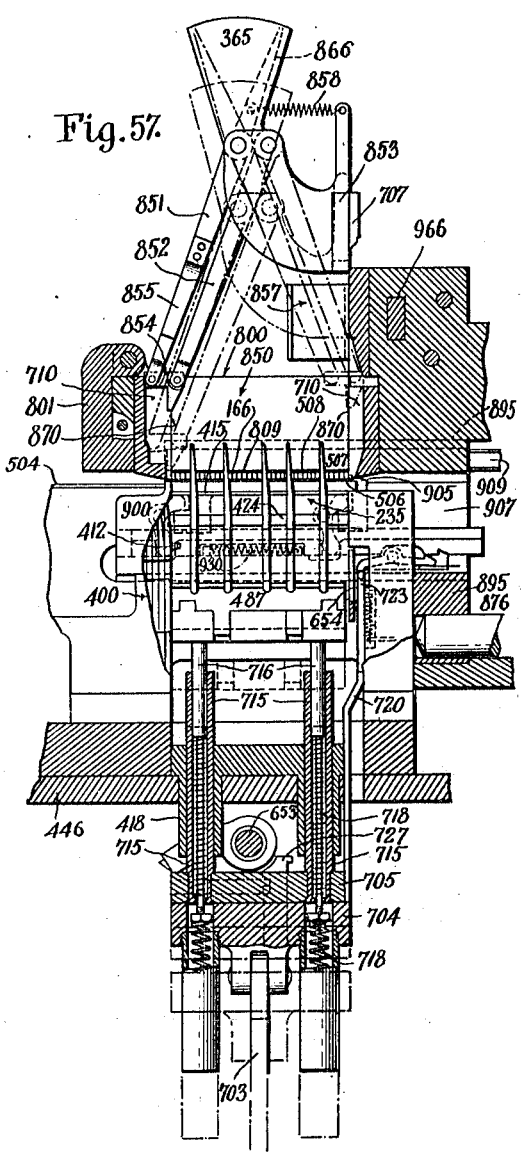

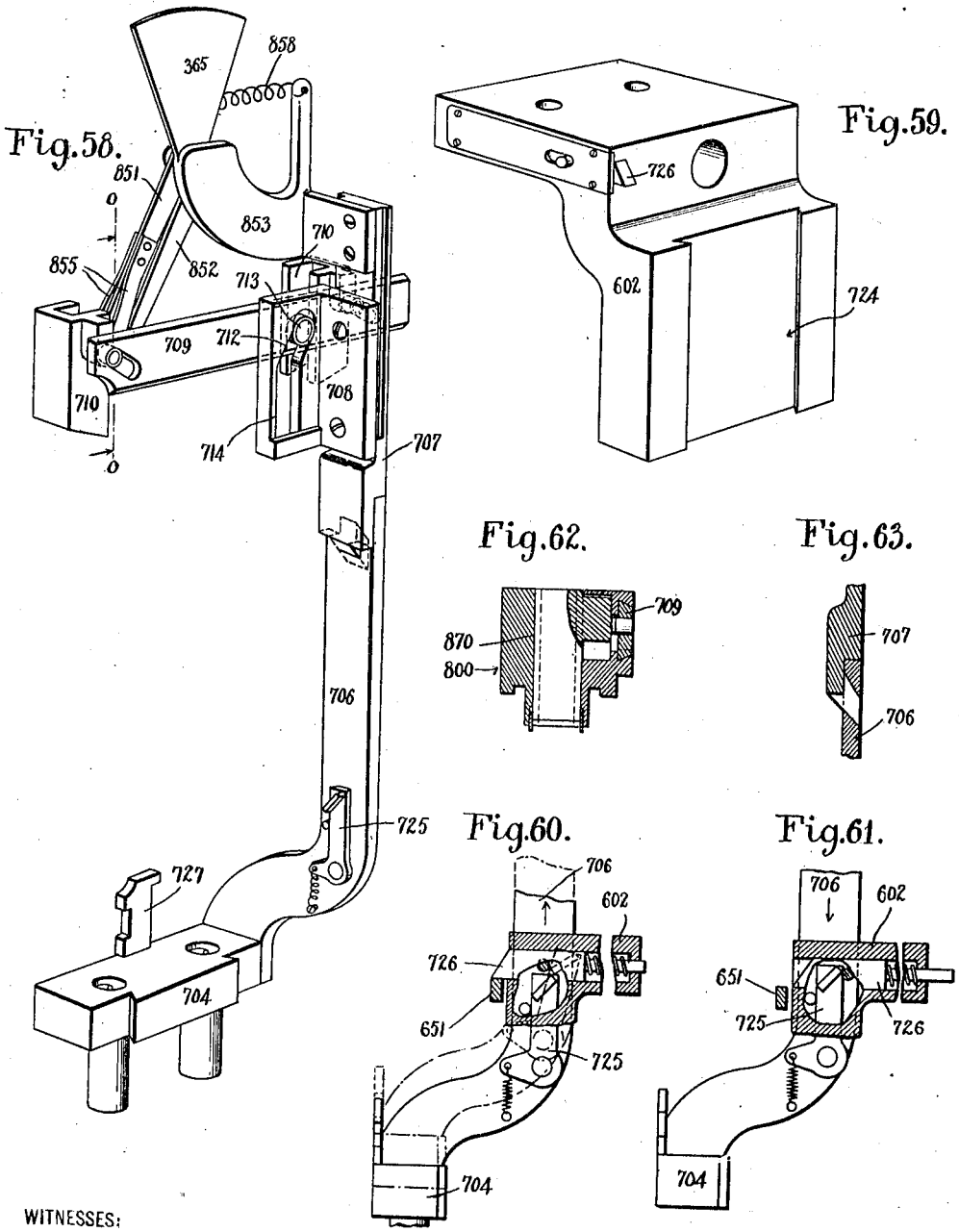

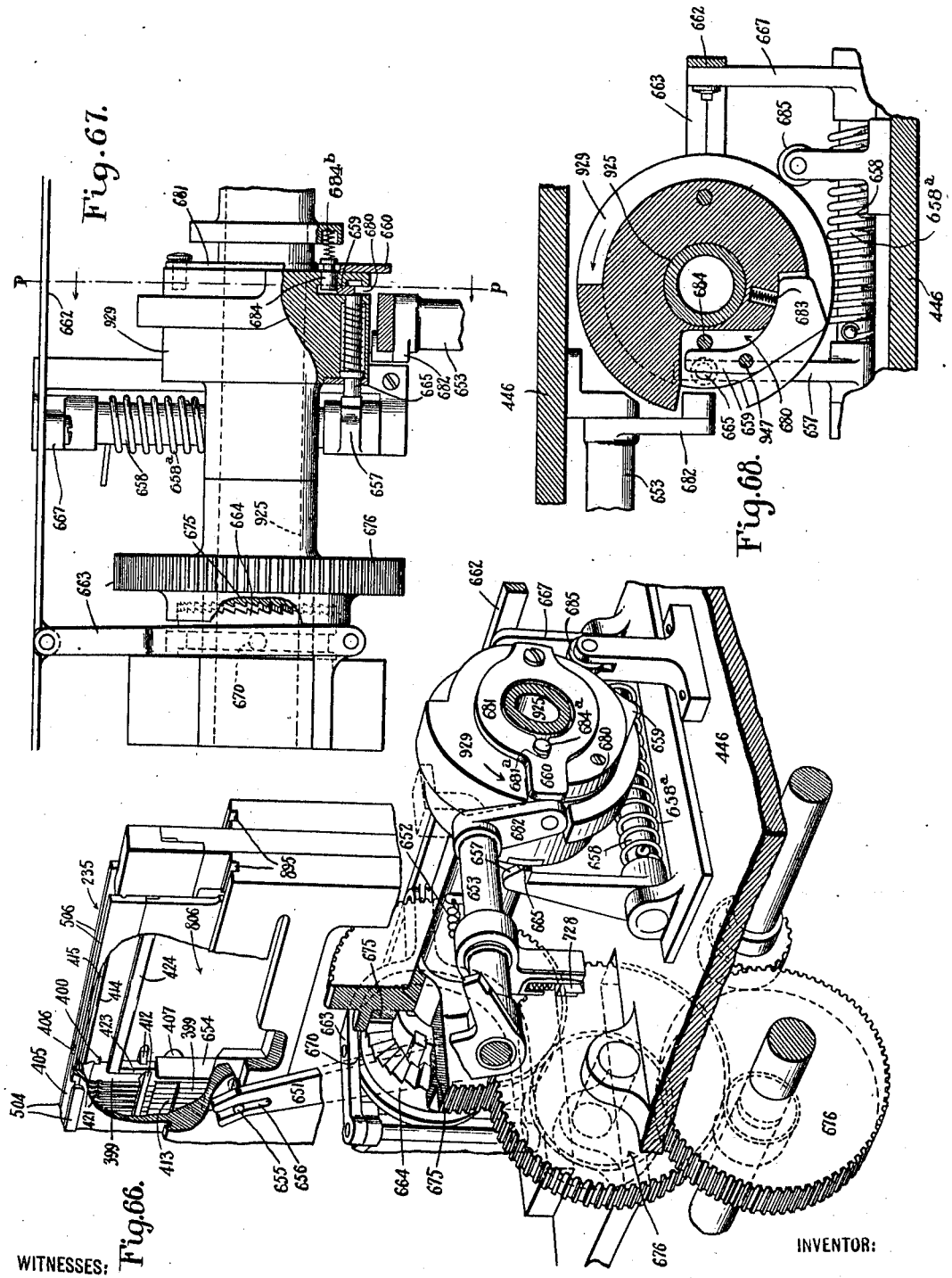

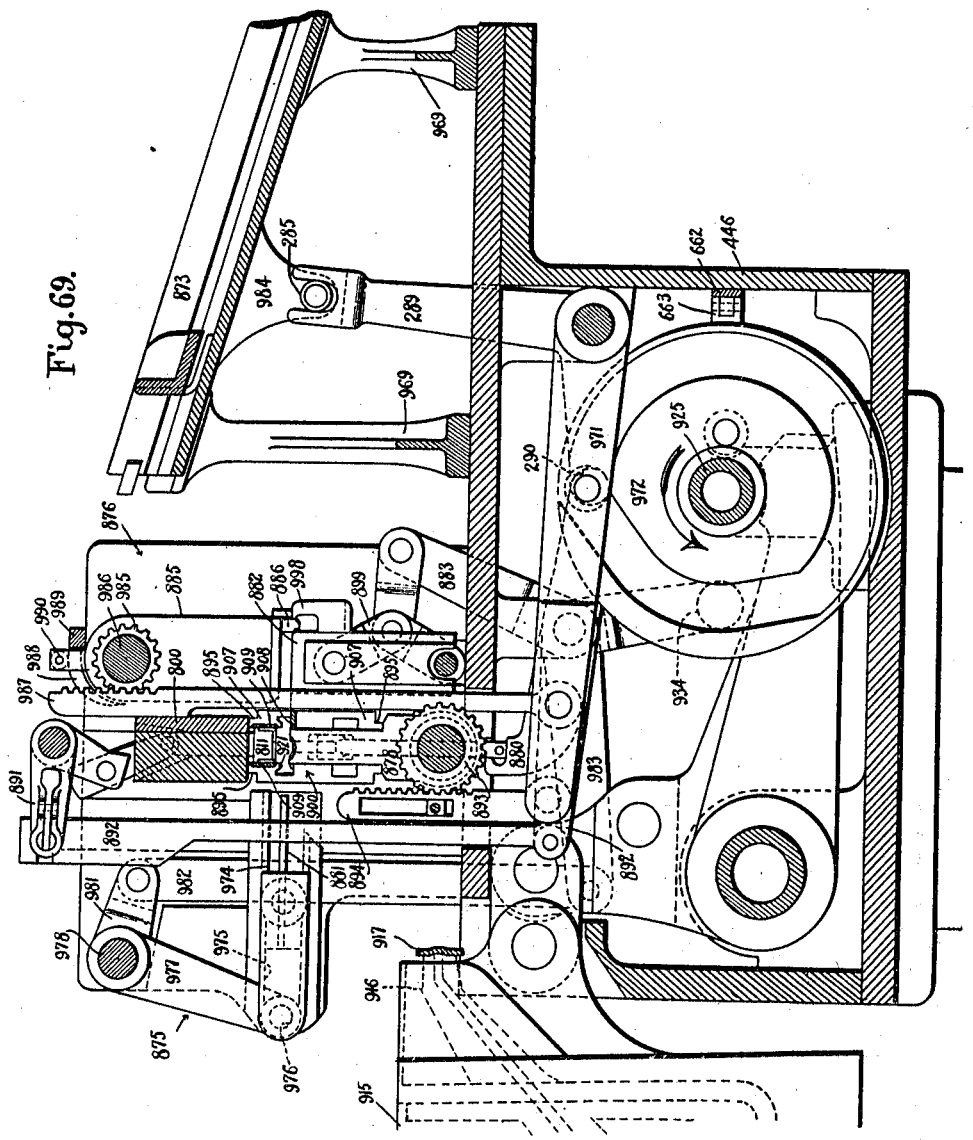

E. B. BARBER.
TYPOGRAPHIC MACHINE.
APPLICATION FILED SEPT. 16, 1911.
1,054,384.
Patented Feb. 25, 1913.
35 SHEETS—SHEET 28.
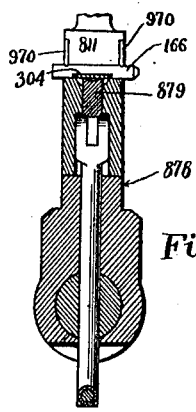
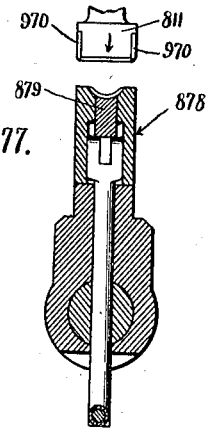
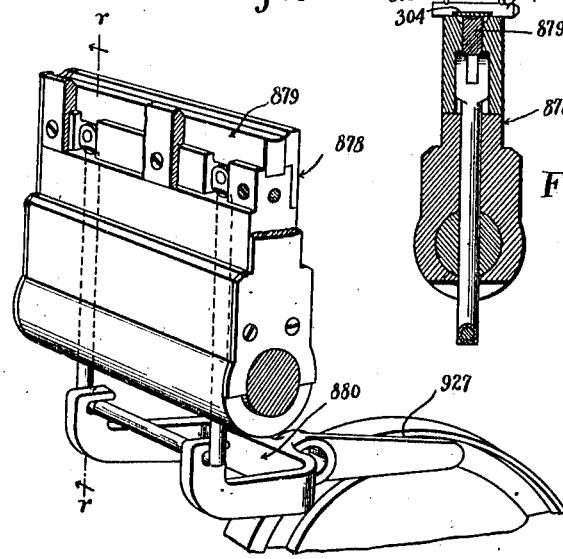
Fig. 76. Fig. 77. Fig. 78.
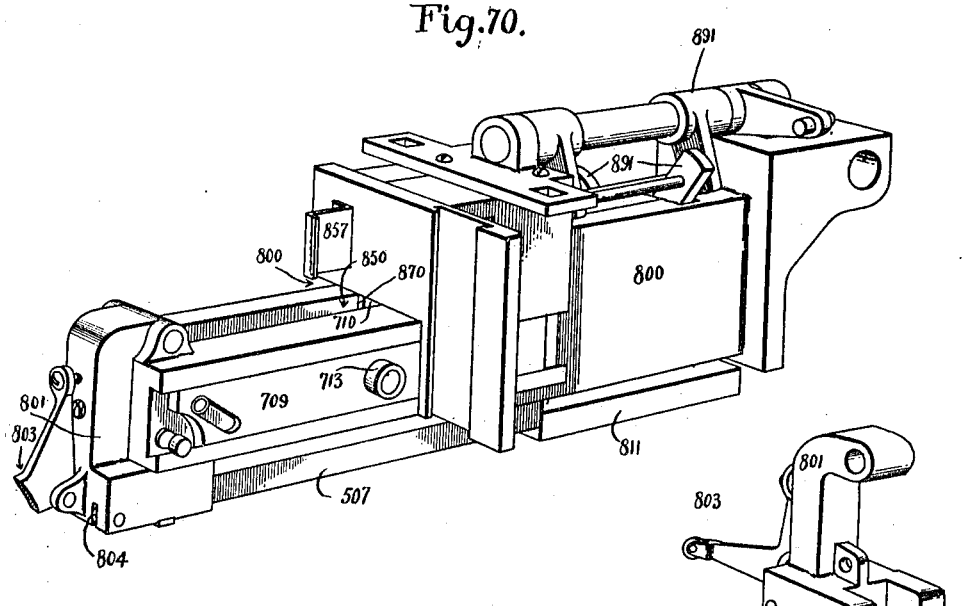
Fig. 70.
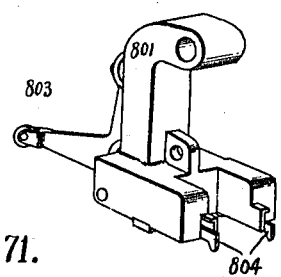
Fig. 71.
WITNESSES:
INVENTOR:
Ernest B Barber
by Chas H Riches
Atty

E. B. BARBER.
TYPOGRAPHIC MACHINE.
APPLICATION FILED SEPT. 16, 1911.

1,054,384.

Patented Feb. 25, 1913.
35 SHEETS—SHEET 29.

WITNESSES:
H. T. Trimble.
R. L. Shortell.

INVENTOR:
Ernest B. Barber
by Chas H Riches
Attorney.

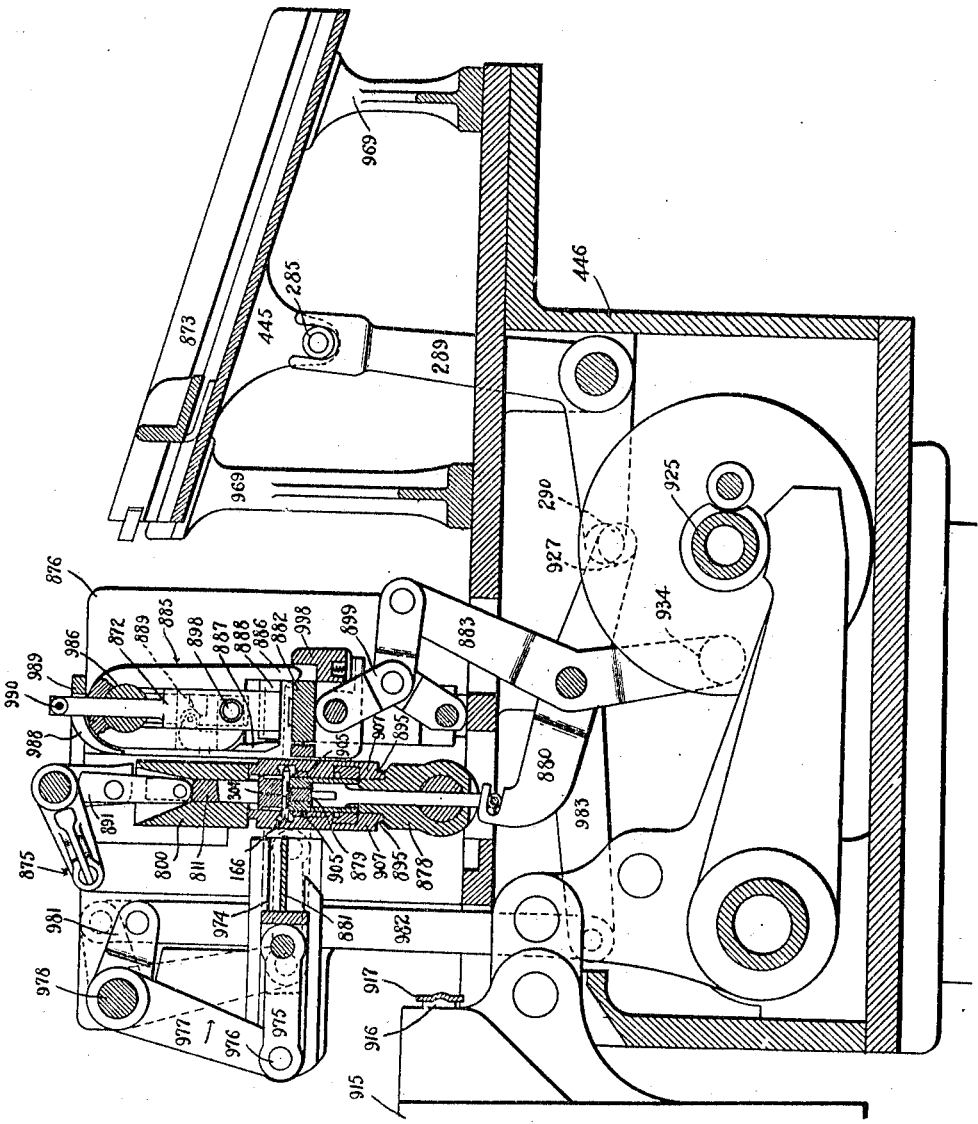

E. B. BARBER.
TYPOGRAPHIC MACHINE.
APPLICATION FILED SEPT. 16, 1911.
1,054,384.
Patented Feb. 25, 1913.
35 SHEETS—SHEET 31.
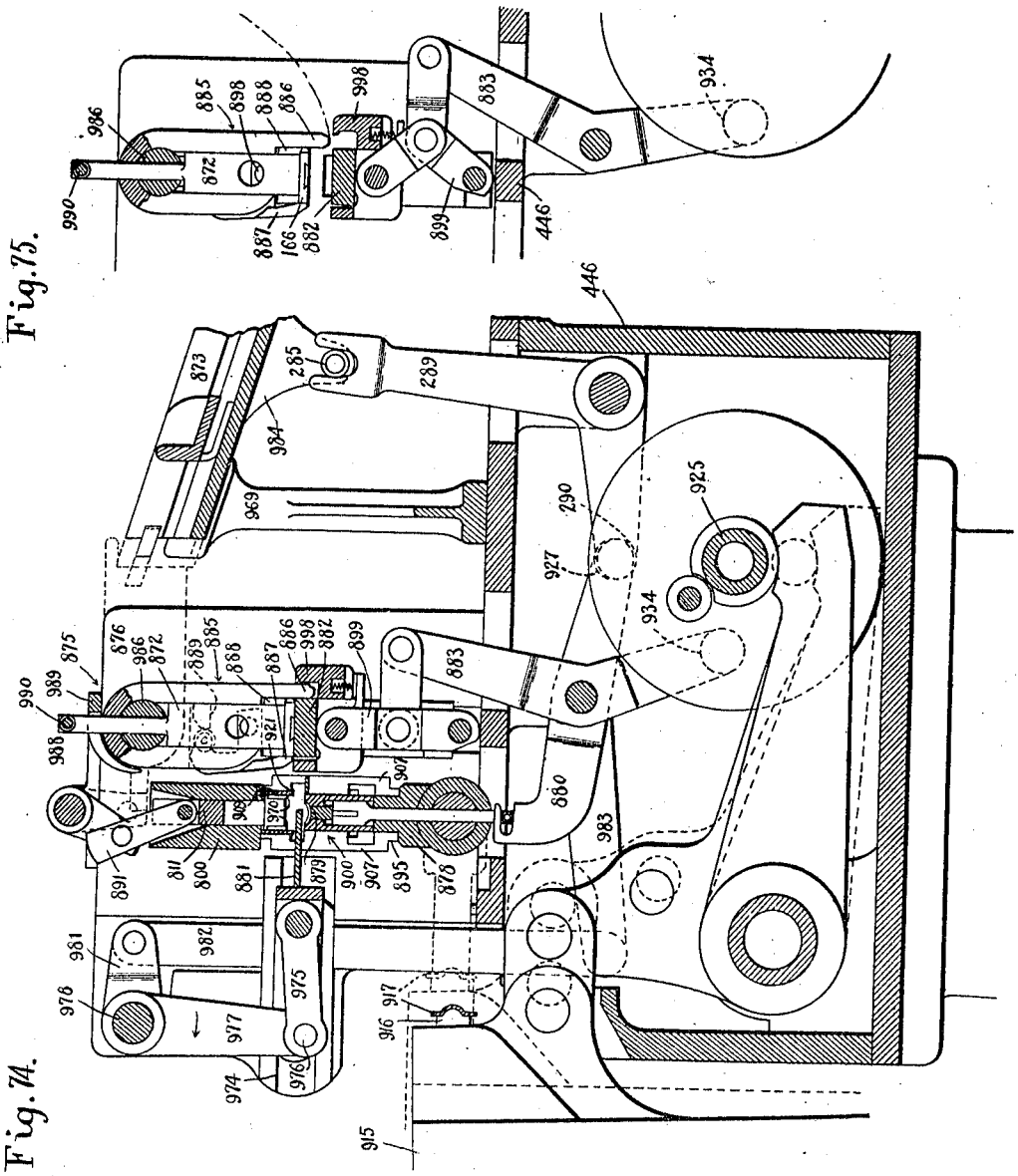

E. B. BARBER.
TYPOGRAPHIC MACHINE.
APPLICATION FILED SEPT. 16, 1911.
1,054,384.
Patented Feb. 25, 1913.
35 SHEETS—SHEET 32.
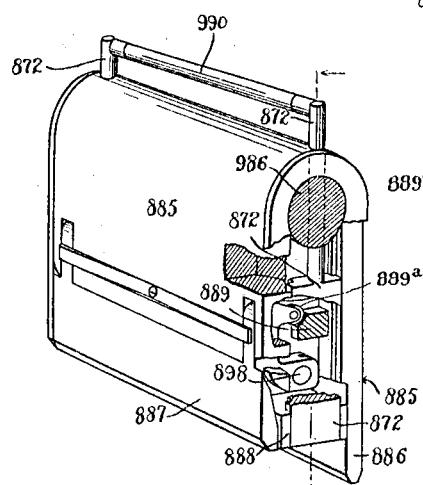
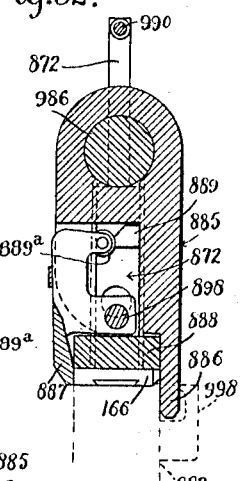
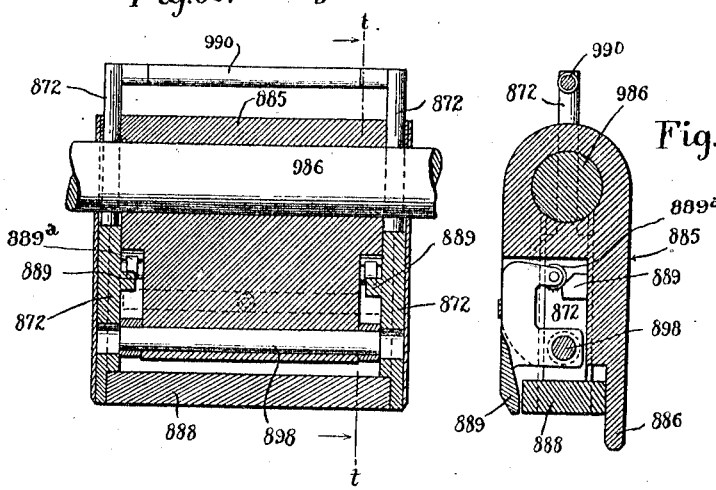
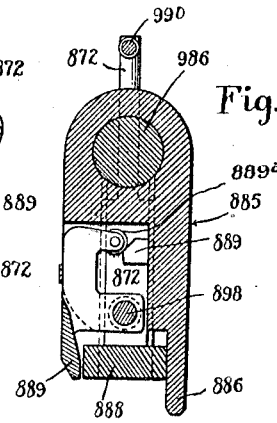
WITNESSES:
INVENTOR:
Ernest B Barber
by Chas H Riches
Attorney E. B. BARBER.
TYPOGRAPHIC MACHINE.
APPLICATION FILED SEPT. 16, 1911.
1,054,384.
Patented Feb. 25, 1913.
35 SHEETS—SHEET 33.
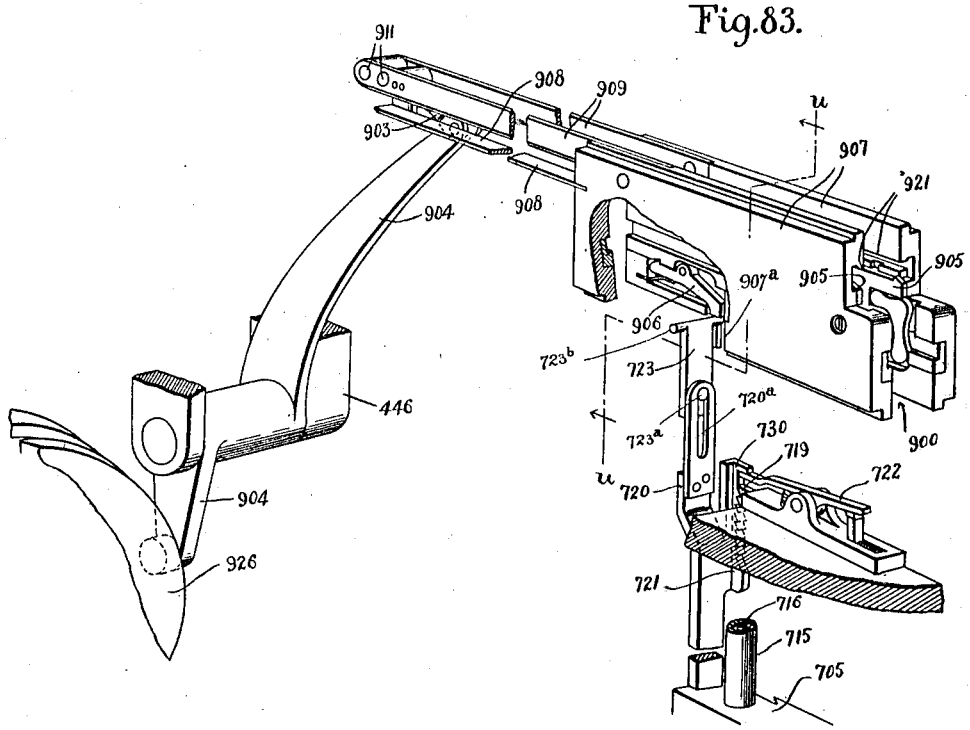
WITNESSES:
INVENTOR:

E. B. BARBER.
TYPOGRAPHIC MACHINE.
APPLICATION FILED SEPT. 16, 1911.

1,054,384.

Patented Feb. 25, 1913.
35 SHEETS—SHEET 34.

WITNESSES:

INVENTOR:
Ernest B Barber
by Chas H Rickes
Attorney

E. B. BARBER.
TYPOGRAPHIC MACHINE.
APPLICATION FILED SEPT. 16, 1911.

1,054,384.

Patented Feb. 25, 1913.
35 SHEETS—SHEET 35.

WITNESSES:

INVENTOR:
Ernest B Barber
by Chas H Riches
Attorney

UNITED STATES PATENT OFFICE.

ERNEST B. BARBER, OF NEW YORK, N. Y., ASSIGNOR, BY MESNE ASSIGNMENTS, TO INTERNATIONAL TYPESETTING MACHINE COMPANY, OF NEW YORK, N. Y., A CORPORATION OF NEW YORK.

TYPOGRAPHIC MACHINE.

1,054,384.      Specification of Letters Patent.      Patented Feb. 25, 1913.

Application filed September 16, 1911. Serial No. 649,638.

*To all whom it may concern:*

Be it known that I, ERNEST BENJAMIN BARBER, a British subject, and resident of the borough of Brooklyn, in the city, county, and State of New York, one of the United States of America, have invented certain new and useful Improvements in Typographic Machines, and do hereby declare that the following is a full, clear, and exact description of the same.

My invention relates to certain improvements in typographic machines for producing type bodies with dovetail grooves intermediate their ends, assembling these type bodies side by side in the order of their production into a composed line, introducing between the type bodies at proper intervals spacers to complete the formation of the line, advancing the spacers to spread the line to its pre-determined limits, then locking the types in their justified condition, withdrawing the spacers therefrom and returning them to their magazine, and then introducing a locking strip into the dovetail grooves of the type bodies, so that they will become a solid justified line to be delivered to a galley from which the lines may be taken and set up for use on a printing press.

In my previous Patent #1,002,212, dated September 5th, 1911, I have shown and described a machine for casting and composing type bodies in which the action of the parts originates with the pressing of a character key in the keyboard, resulting in the release of a matrix plate brought to the casting position by a two-way movement in parallel relation to the type body mold and arrested by stops directly controlled by the manipulation of the character key to bring the desired character into line with the mold cavity. I have provided in the machine shown and described in that patent, a type casting mechanism set in operation by the character key releasing the matrix plate and setting the stops for arresting its two-way movement.

The sequence of operations described in the above patent, is that the touching of a character key simultaneously adjusts two stops, then releases the matrix plate, following which the clutch is thrown into contact, and the resultant actions produce a type body bearing on its face the desired character; following which the parts are restored to their normal position and the cast type is delivered into an assembling line.

In my application #608,441, filed February 13th, 1911, I have described a means for justifying the line of assembled types, seizing the types in their justified condition, casting a locking strip, transferring the justified types from the place of type assemblage to the place where the locking strip is combined with them, pressing the locking strip and types together, and finally delivering the locked line of types to a galley, from which it is taken for printing purposes.

I have, in my present application, combined the parts of the machine shown and described in my said Patent #1,002,212 and in my said application #608,441, so that the present machine may be described as a machine of continuous operation, in which the actuation of the keyboard results in the casting of the types, and the assembling of the types into a line with spacers selectively introduced between them, the justification of the line by advancing the spacers to spread the line to its limits and then the withdrawal of the spacers therefrom, the seizing of the types in their justified condition, the carriage of the justified types to a position where they receive the locking strip, the casting of the locking strip and the combining of it with the justified types, and finally the compressing of the locking strip and justified types together for delivery to the galley.

Figure 2:
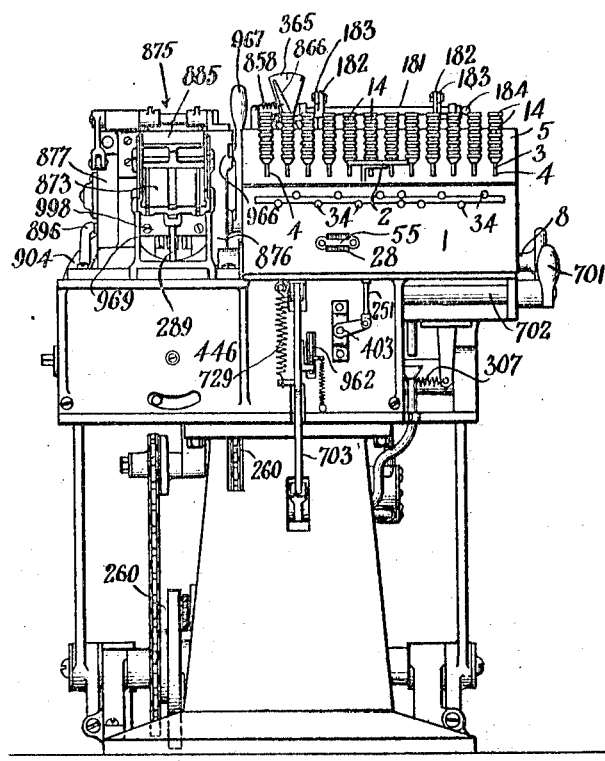
Figure 6:
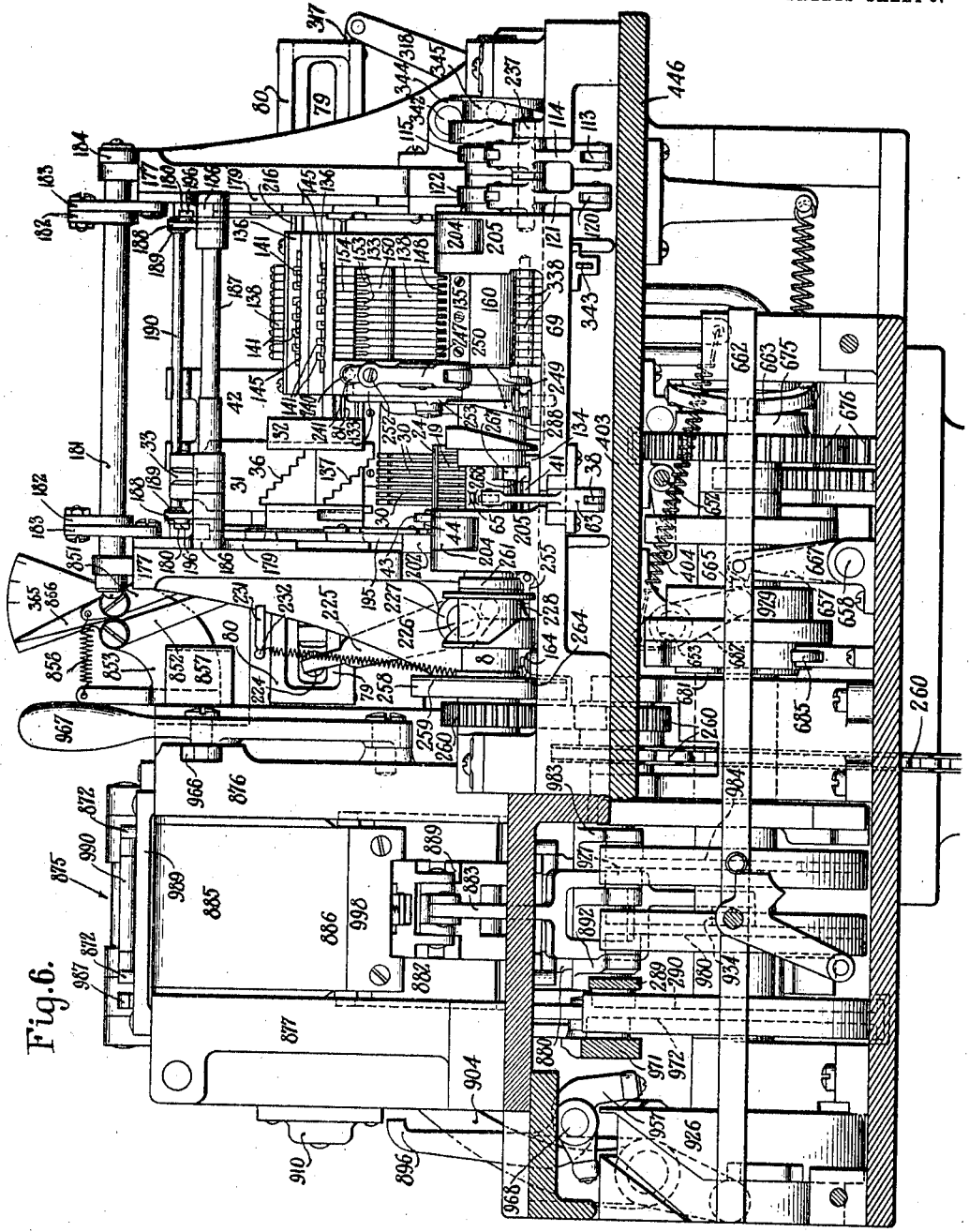
Figure 7:
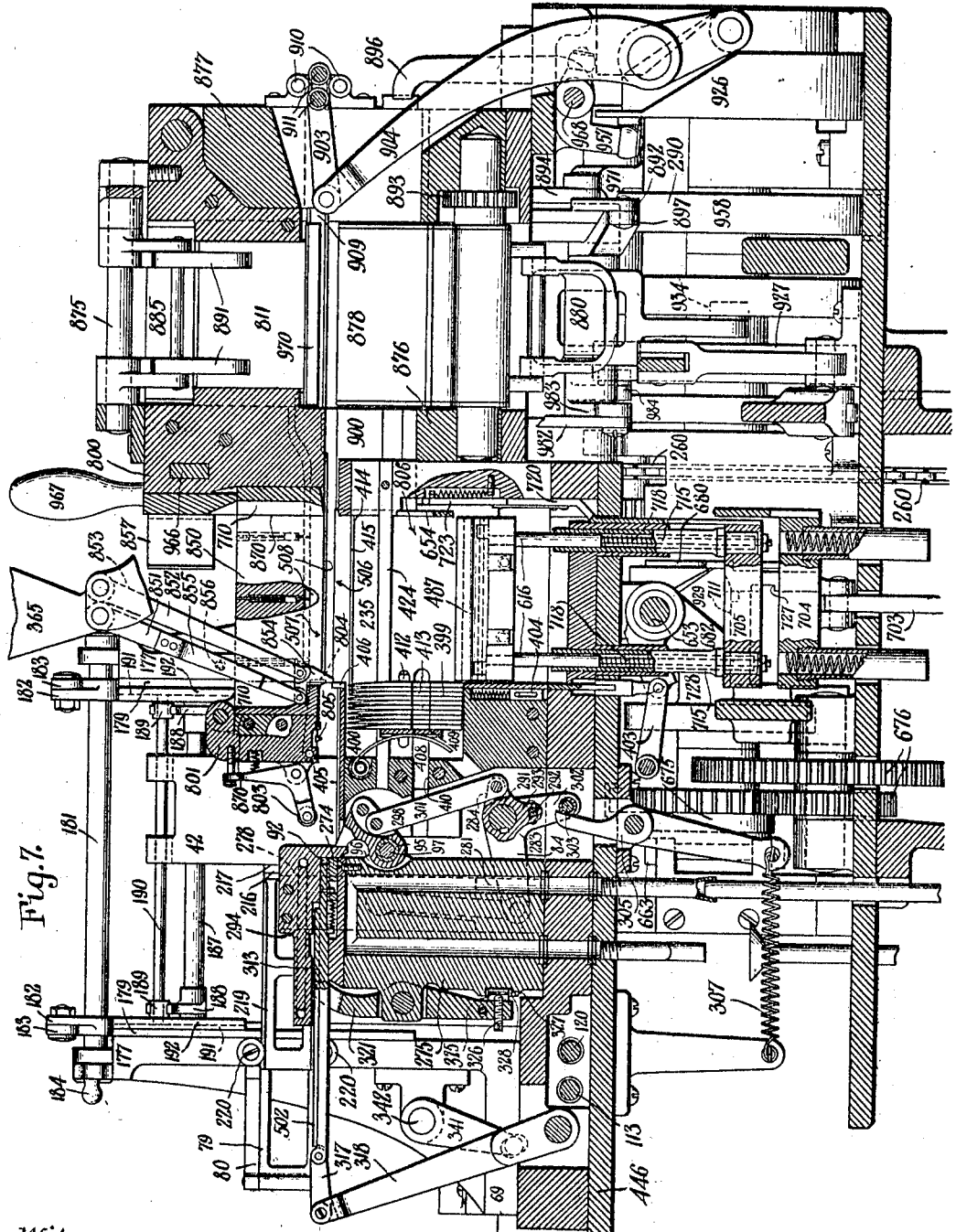
Figure 9:
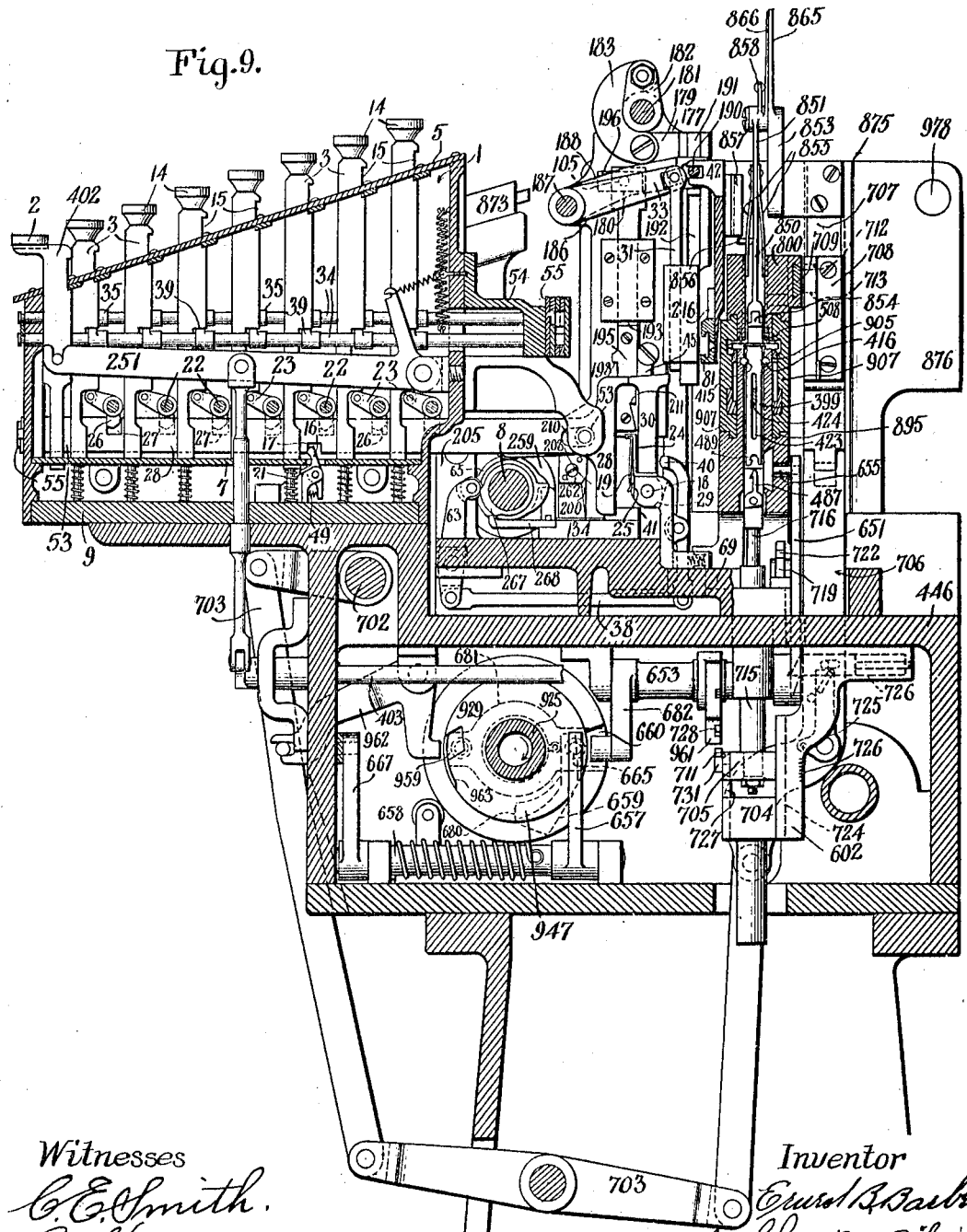
Figure 10:
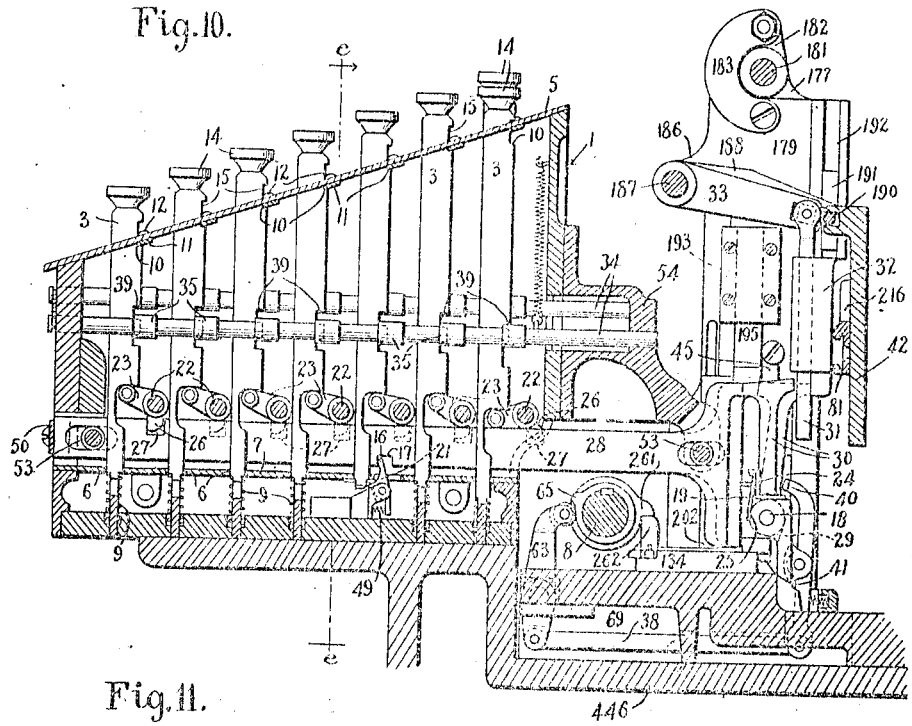
Figure 11:
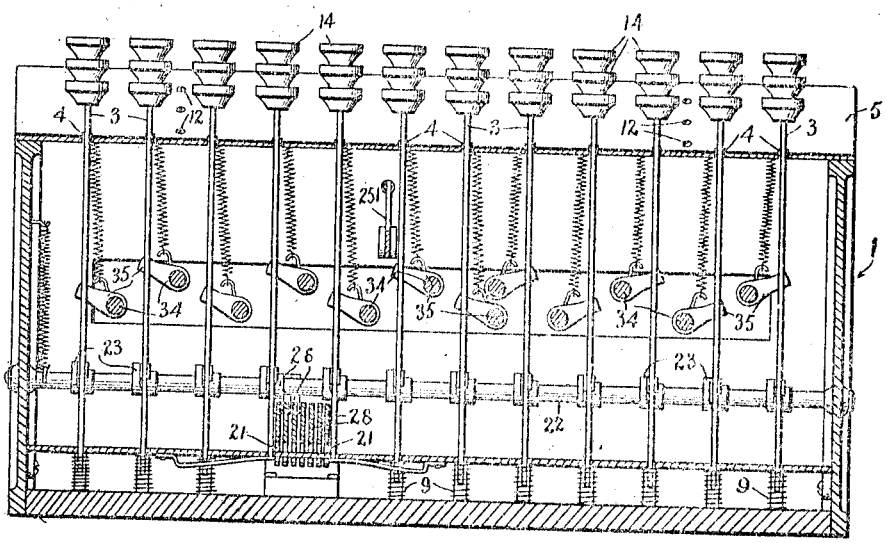
Figure 25:
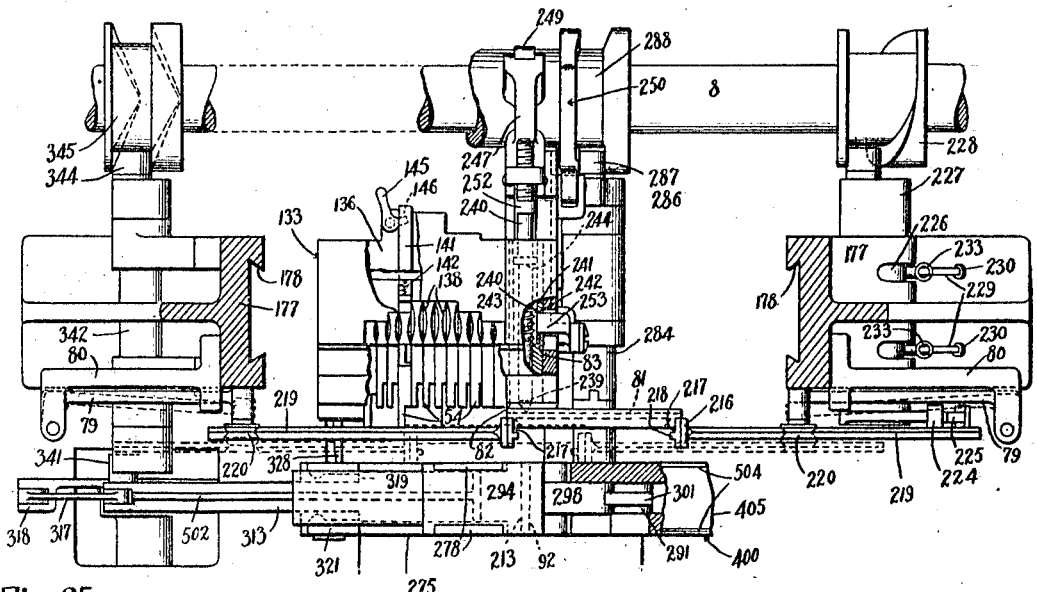
Figure 26:
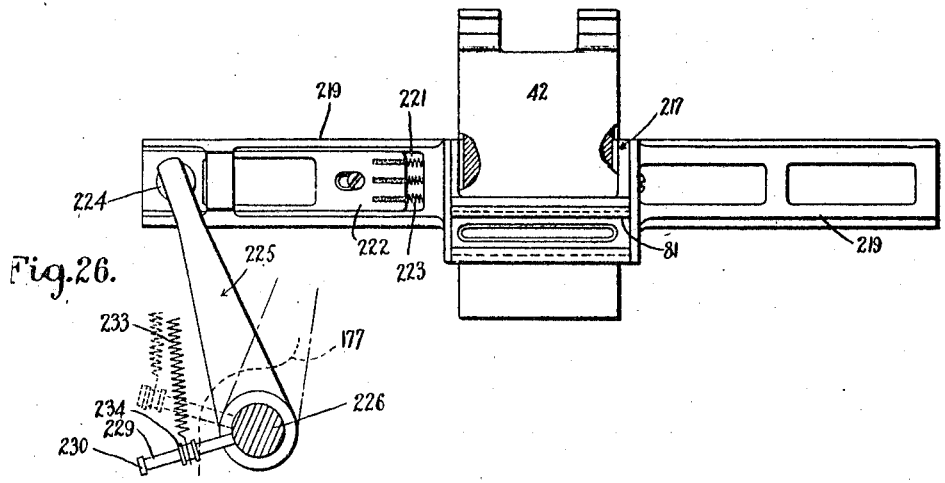
Figure 38:
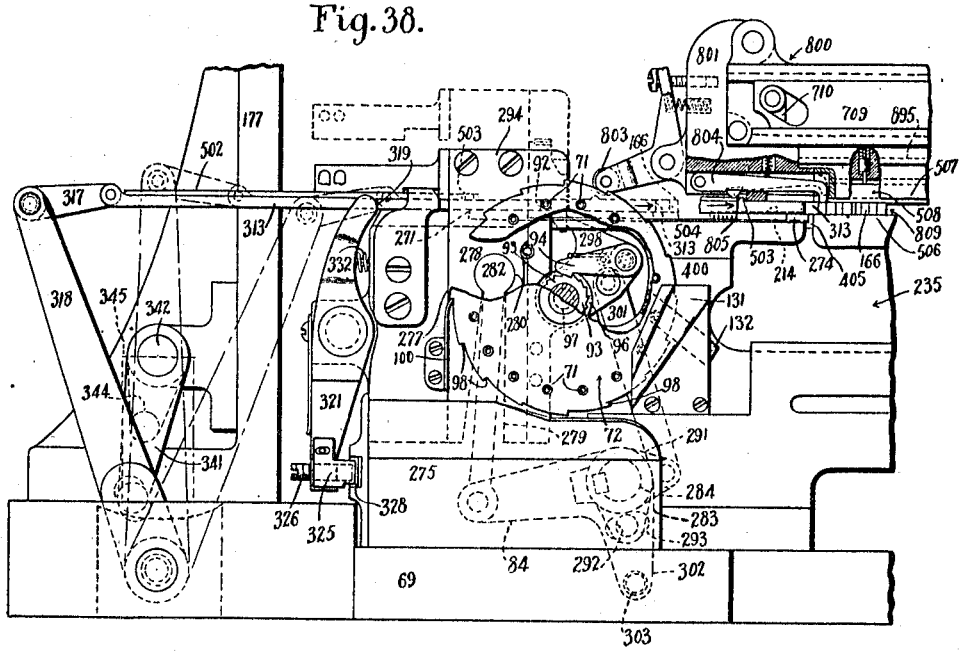
Figure 33:
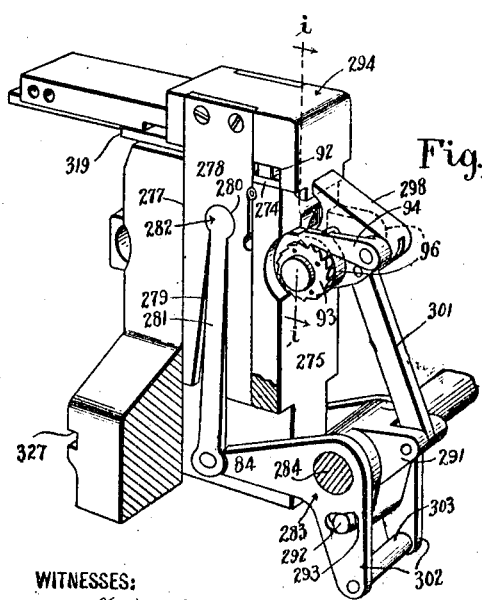
Figure 36:
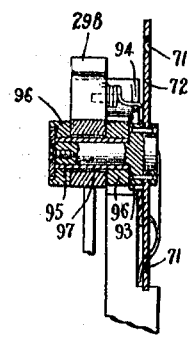
Figure 35:
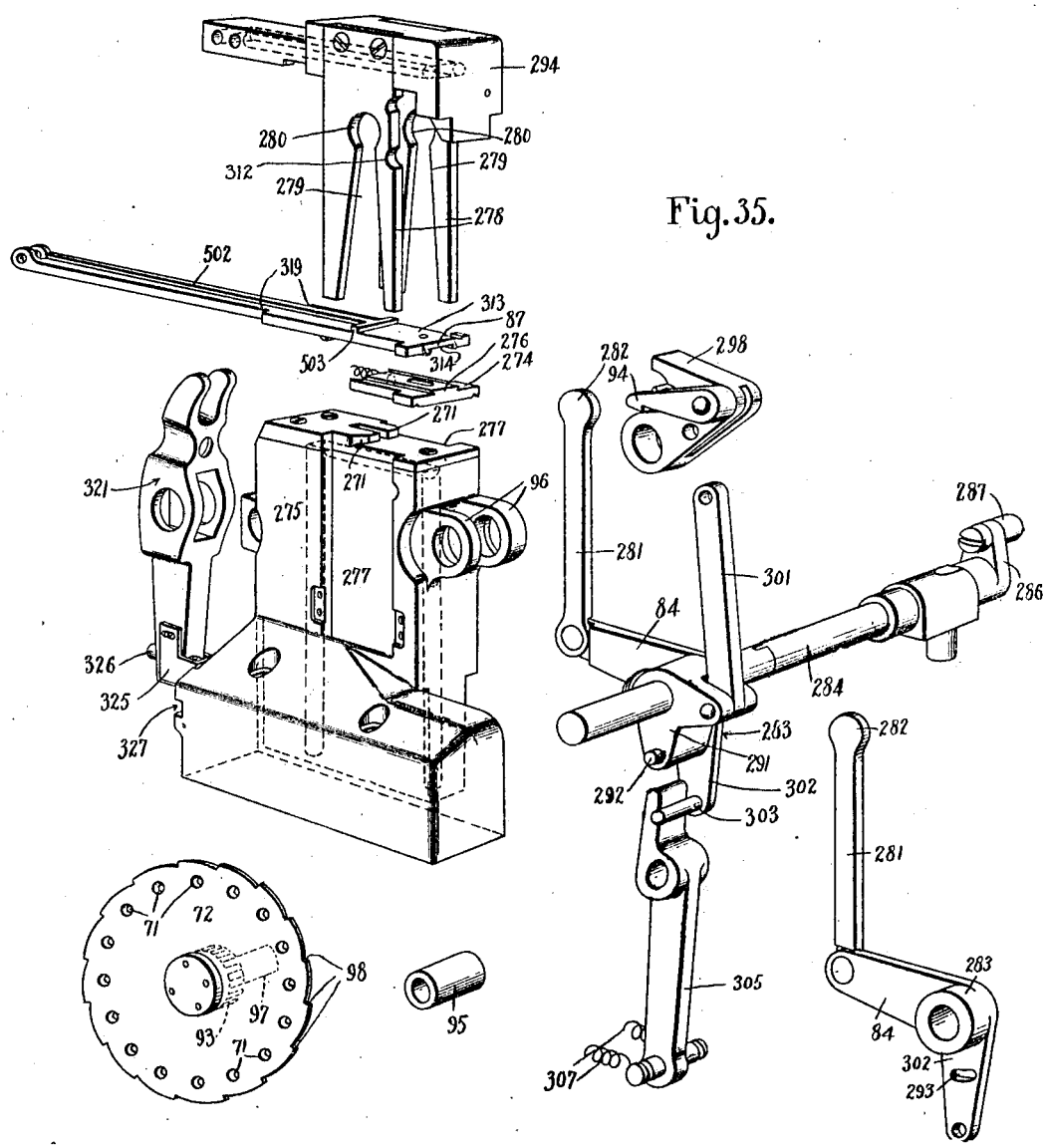
Figure 64:
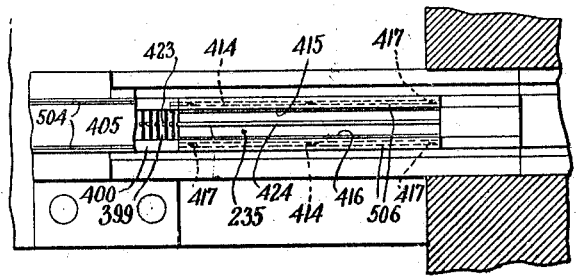
Figure 65:
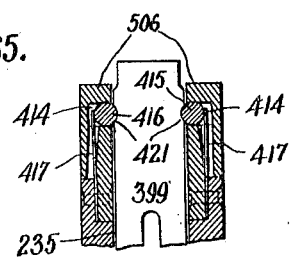
Figure 54:
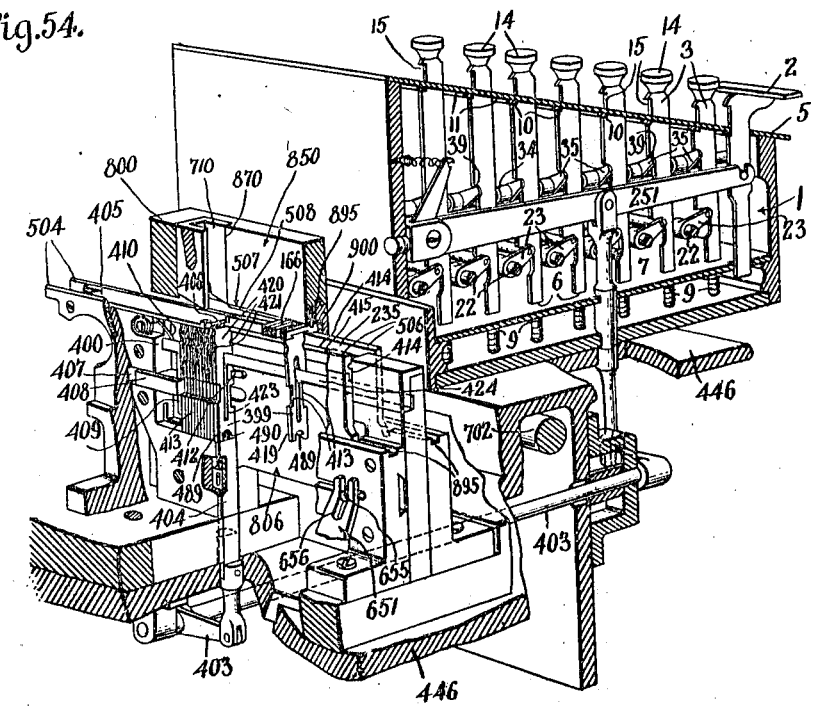
Figure 72:
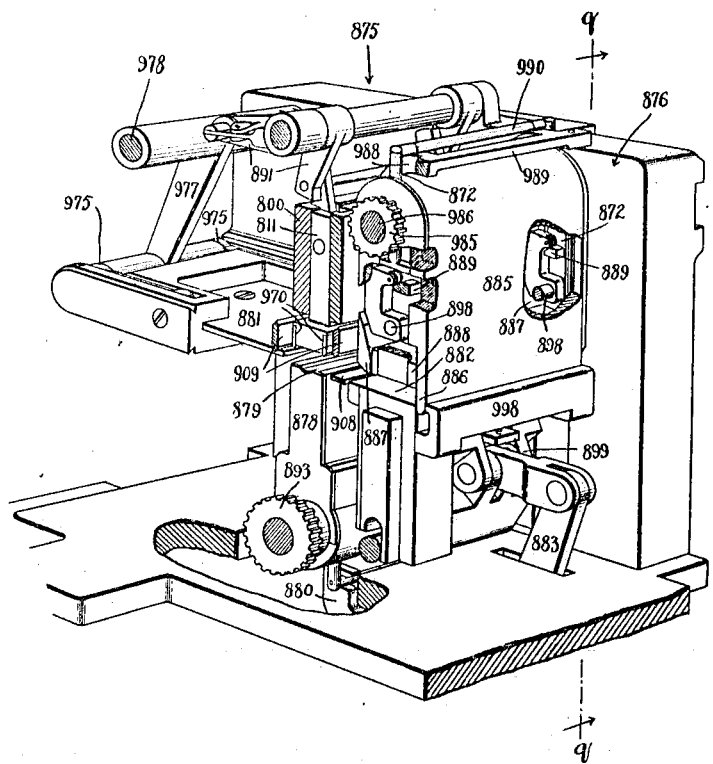
Figure 64:
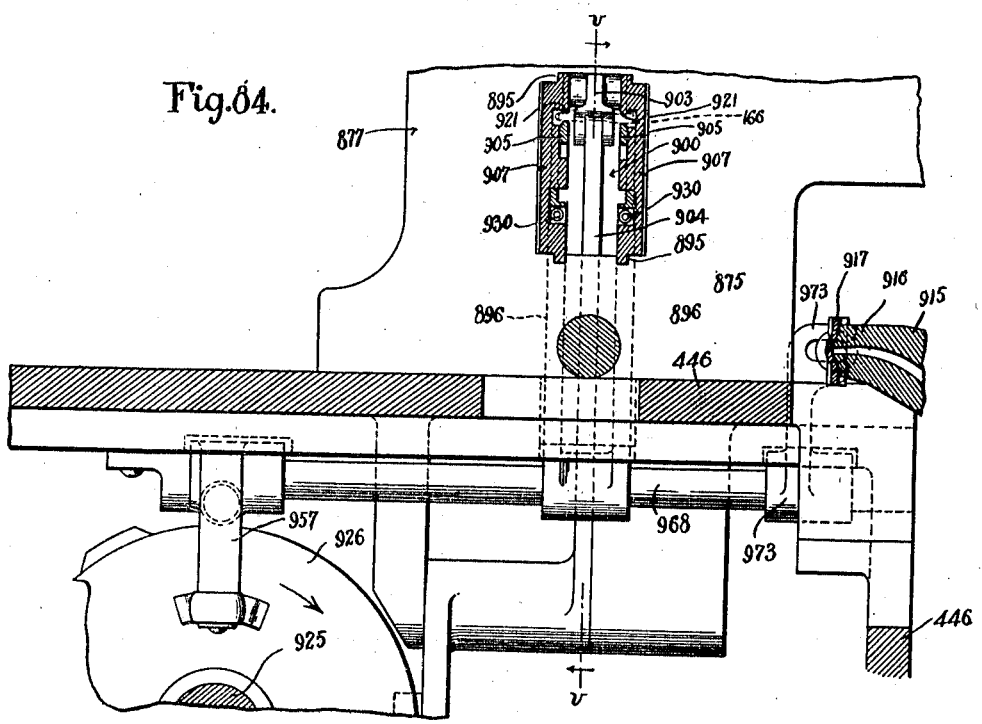
Figure 87:
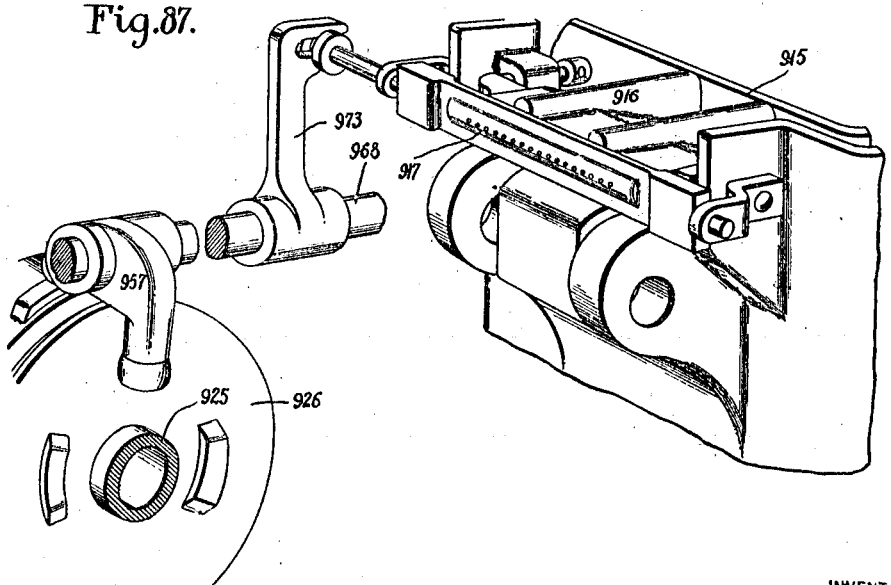
Figure 85:
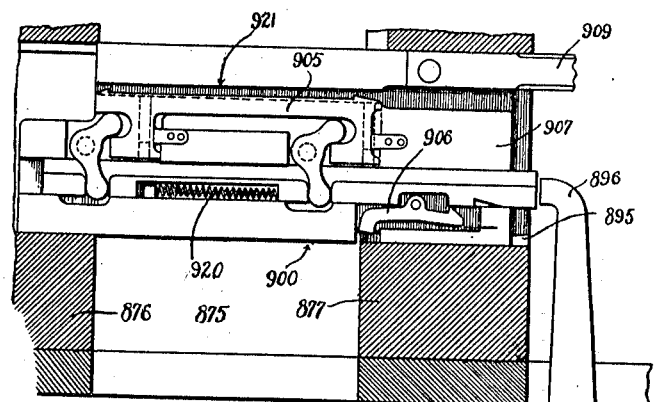
Figure 86:
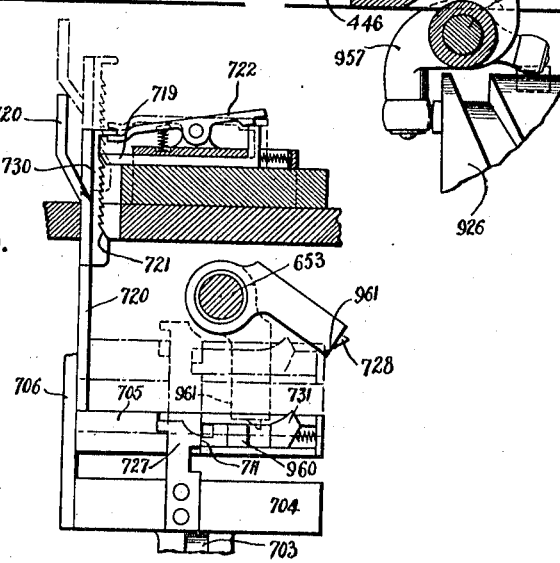

Figure 1 is a plan view of the top of the type casting machine. Fig. 2 is a front elevation of the type casting machine. Fig. 3 is an elevation of the right side of the type casting machine. Fig. 4 is an elevation of the left side of the type casting machine. Fig. 5 is a rear elevation of the type casting machine with the melting pots removed. Fig. 6 is a vertical section on the line *a—a* Fig. 3. Fig. 7 is a vertical section on the line *b—b* Fig. 1. Fig. 8 is a vertical section on the line *c—c* Fig. 1. Fig. 9 is a vertical section on the line *d—d* Fig. 1. Fig. 10 is a vertical section to show the operation of the vertical stops and stop selectors, the matrix plate being shown in this view in its lowered position. Fig. 11 is a vertical section on the line *e—e* Fig. 10. Fig. 12 is a section of part of the keyboard. Fig. 13 is a perspective view showing the pawls for returning the stop selectors. Fig. 14 is a detail of one of the pawls shown in Fig. 13. Fig. 15 is a plan view of the horizontal stop selectors. Fig. 16 is an elevation of the stop selectors shown in Fig. 15. Fig. 17 is a perspective view of the end of one of the keyboard rock shafts and its cam for operating a selector slide. Fig. 18 is a perspective view of two selector slides. Fig. 19 is a perspective view showing the matrix plate carriage and its controlling mechanism. Fig. 20 is a perspective view of part of the construction shown in Fig. 19 with the matrix plate in its elevated position, the lower matrix field being the operative one. Fig. 21 is a similar view to Fig. 20 with the upper matrix field operative. Fig. 22 is a side elevation showing one of the matrix plate elevators and its lifting mechanism. Fig. 23 is a vertical section on the line $f$—$f$ Fig. 22. Fig. 24 is a section on the line $g$—$g$ Fig. 22. Fig. 25 is a horizontal section on the line $h$—$h$ Fig. 19. Fig. 26 is a detail of the matrix plate carriage looking at it from the opposite side to Fig. 19. Fig. 27 is a front elevation of the matrix plate. Fig. 28 is a rear elevation of the matrix plate. Fig. 29 is a side elevation of the matrix plate. Fig. 30 is a view partly in section showing the matrix plate centering and stripper mechanism with the parts positioned preparatory to locking up the matrix plate and mold. Fig. 31 is a view partly in section of the construction shown in Fig. 30 with the matrix plate and mold locked up. Fig. 32 is a vertical section showing the horizontal stop return mechanism. Fig. 33 is a perspective view showing the type body mold. Fig. 34 is a perspective view partly in section showing the mold adjustment. Fig. 35 is a perspective view of the segregated parts of the mold. Fig. 36 is a vertical section on the line $i$—$i$ Fig. 33. Fig. 37 is a detail perspective view of part of the mold adjusting mechanism shown in Fig. 34. Fig. 38 is an elevation showing the type ejection. Fig. 39 is a plan view of the clutch setting mechanism. Fig. 40 is a detail perspective view of the segregated parts shown in Fig. 39. Fig. 41 is a detail view of the driving clutch member. Fig. 42 is a detail view of the driven clutch member. Fig. 43 is a section on the line $k$—$k$ Fig. 39. Fig. 44 is a perspective view partly in section of the melting pot. Fig. 45 is a plan view of the melting pot shown in Fig. 44 with the parts locked in the casting position. Fig. 46 is a vertical section of the melting pot with the parts locked in the position shown in Fig. 45. Fig. 47 is a similar view to Fig. 46 with the parts retracted. Fig. 48 is a perspective view of the piston well. Fig. 49 is a perspective view of the piston ejector. Fig. 50 is an enlarged perspective view of one of the types. Fig. 51 is an enlarged perspective view of seven types arranged in two word spaced groups and locked together by the amalgamating strip. Fig. 52 is an enlarged perspective view of the amalgamating strip. Fig. 53 is a perspective view of a space bar. Fig. 54 is a perspective view partly in section showing the type assembly, the space magazine, space bars, and space actuating mechanism. Fig. 55 is a perspective view partly in section showing the type assembly, spacing, justifying, amalgamating, and controlling mechanisms, and the line steadying apparatus. Fig. 56 is a vertical elevation, partly in section, showing the type assembly with space bars introduced into the assembling line, the means for returning the space bars to the space magazine, the justifying mechanism, and the line steadying apparatus, preparatory to the justification of the line. Fig. 57 is a vertical section of the same parts shown in Fig. 56 but with the space bars pushed into the line to spread it to its limits and the line steadying apparatus lifted above the line of types and space bars, with the jaws lowered to determine the length of line. Fig. 58 is a perspective view of the line steadying apparatus, line jaws and the upright supporting bars. Fig. 59 is a perspective view of the bracket for the upright supporting bars. Fig. 60 is a view partly in section showing the lower end of the upright bar shown in Fig. 58 and bracket shown in Fig. 59 with the locking control for the space return lever, the parts of the control being shown in their normal position. Fig. 61 is a similar view to Fig. 60 showing the control tripped to release the space return lever. Fig. 62 is a section on the line $o$—$o$ Fig. 58. Fig. 63 is a section through the joint formed by the upper and lower parts of the upright bar shown in Fig. 58. Fig. 64 is a plan view of the top of the line assembling box and part of the space magazine. Fig. 65 is an enlarged detail section showing a space bar retained by the yielding rails. Fig. 66 is a perspective view partly in section showing the space bar return mechanism and part of the starting and stopping apparatus. Fig. 67 is a plan view of the parts shown in Fig. 66, these parts being in their normal position. Fig. 68 is a section on the line $p$—$p$ Fig. 67. Fig. 69 is a vertical section through the amalgamating mechanism. Fig. 70 is a perspective view showing the hinged member of the amalgamating section. Fig. 71 is a perspective view of the assembling pawl holder. Fig. 72 is a perspective view partly in section of the amalgamating mechanism. Fig. 73 is a vertical section on the line $q$—$q$ Fig. 72 showing the position of the parts during the introduction of the amalgamating strip into the type grooves. Fig. 74 is a similar view to Fig. 73 showing the position of the parts when the compressor table is compressing the amalgamating strip into the line of types. Fig. 75 is a detail view of part of the construction shown in Figs. 73 and 74 with the compressor table below its normal position. Fig. 76 is a perspective view of the strip mold. Fig. 77 is a vertical section on the line $r$—$r$ Fig. 76 with the parts in their normal position. Fig. 78 is a similar view to Fig. 77 showing the position of the parts when the amalgamating strip is being introduced into the type grooves. Fig. 79 is a perspective view partly in section of the amalgamator. Fig. 80 is a vertical section on the line $s$—$s$ Fig. 79. Fig. 81 is a vertical section on the line $t$—$t$ Fig. 80. Fig. 82 is a similar view to Fig. 81 showing the position of the line of type when pressed into the amalgamator by the compressor table. Fig. 83 is a perspective view of the line carriage and line carriage tripping mechanism. Fig. 84 is a section on the line $u$—$u$ Fig. 83 showing also the means for unlocking the line carriage and the means for moving the stripper plate for the mouth of the strip melting pot. Fig. 85 is a section on the line $v$—$v$ Fig. 84. Fig. 86 is a view partly in section showing the safety control for the mechanism actuated by the starting handle. Fig. 87 is a perspective view showing a part of the strip melting pot, the stripper plate and actuating mechanism.

*Keyboard mechanism.*—In the keyboard 1 are eighty four character keys 3 and one space key 2. The character keys are arranged in twelve vertical rows of seven keys each, with the keys of each vertical row alined with those of the other vertical rows to form seven horizontal rows of twelve keys each. Each character key 3, tensioned by a spring 9, operates through a slot 4 in the top keyboard plate 5 and through a slot 6 in the inner keyboard plate 7, the slots 4 and 6 being of such dimensions as to permit of any key rod being inserted in or removed from the keyboard without dismantling the latter or interfering with the primal arrangement of the other keys. Each keyrod is provided with a stopping shoulder 10 engaging with a stopping plate 11 adjustably connected to the inner surface of the top keyboard plate 5 by screws 12 movable in slots 13, see Fig. 12, so that the stopping plate can be positioned in the path of the stopping shoulder 10 to limit the upward movement of the keyrod, or can be positioned clear of the stopping shoulder to allow of the keyrod being removed from or replaced in the keyboard, the keyrod between the stopping shoulder 10 and character button 14 having a clearance 15 for the movement of the keyrod. Journaled in the keyboard frame are seven rock shafts 22 for the seven horizontal rows of character keys, and fixed on each rock shaft are twelve cranks 23 engaged by the keyrods of its respective row, and also fixed on each rock shaft 22 is a crank 26 engaging in a recess 27 in one of the seven stop selectors 28, there being one stop selector for each rock shaft. When any character key is pressed, it forces its respective crank 23 downward and partly rotates the rock shaft 22 and oscillates the crank 26 moving the stop selector 28 and projecting a vertical stop 30 to arrest the downward movement of the matrix plate 42. Journaled in the keyboard frame are twelve spring tensioned rock shafts 34 for the twelve vertical rows of character keys, and fixed on each rock shaft 34 are seven cranks 35. The cranks 35 are engaged by the shoulders 39 of the key rods so that when any character key is pressed it will, by moving the engaging crank 35 downward, turn its respective rock shaft 34, and through operable connections, hereinafter described under the caption "Horizontal stops and horizontal stop actuating mechanism," release a latch bolt 141 for the descent of a drop bar 138 and project one of the twelve horizontal stops 154 to arrest the horizontal movement of the matrix plate 42. See Figs. 8, 15, 16, 17, 18 and 25. The stop selector 28 then moves the controlling slide 41 and its slotted arm 43 to disengage the detent dog 45 from the matrix plate elevator 195 for the descent of the matrix plate 42 until arrested by the vertical stop 30, described under the caption "Vertical stops." This movement of the controlling slide also actuates the clutch setting slide 255 to set the clutch 259 for the resultant actions of the machine. See Figs. 20, 21, 39, 40, 41, 42 and 43. Below the inner keyboard plate 7 are seven spring pressed pawls 21 each having an arm 16 projecting into a slot 17 in its respective stop selector 28. See Figs. 10, 11, 13 and 14. When a stop selector is actuated it rocks its corresponding pawl 21 to compress a spring 49 which remains compressed until the keyrod is restored to its initial position by the spring 9. The spring 49 then operates to restore the pawl 21 and the stop selector 28 to their normal positions, the stop selector when restored to its normal position being arrested by a stop 50 at the front of the keyboard, the stop selectors 28 being slidably supported by antifriction rollers 53.

The immediate results attained from touching a key on my keyboard are as follows: The rock shaft 22 is turned and, moving the stop selector 28, projects a vertical stop 30 to arrest the descent of the matrix plate 42, shown in Fig. 10; the rock shaft 34 is turned and, actuating its operable connections, projects a horizontal stop 154 to arrest the horizontal flight of the matrix plate 42, shown in dotted lines Fig. 25; the controlling slide 41 is moved to release the matrix plate elevator 195 for the descent of the matrix plate 42 until arrested by its projected stop 30 and the clutch 259 is set for the revolution of the high speed shaft 8 causing the subsequent actions of adjusting the matrix plate and reproducing the character therefrom. In operation these actions take place almost simultaneously although timed as noted, and the effect in summary is that the action secured from touching a character key is to immediately project stops into the path of a two way moving matrix plate to arrest its movement in two directions, and to release and adjust the matrix plate preparatory to securing a reproduction of the selected character.

*Matrix plate, matrix plate elevating mechanism, vertical stops, and field shift.*—I may use a matrix plate 42 having one, two, or more fields of matrix characters, the characters of each field being of a different style of face from those of the other fields so that by using a matrix plate having a plural number of matrix fields, I can produce from one matrix plate, without disturbing the primal arrangement of the type producing mechanism as many different styles or faces of type as there are matrix fields on the matrix plate. Thus for example I can produce from a matrix plate having two fields of matrix characters, "Roman" type from one field and "Ionic" from the other field. The matrix plate 42 which I have shown in the accompanying drawings has two fields of matrix characters, one field being vertically over the other, with the matrix characters of each field arranged in twelve vertical rows of seven matrix characters each and seven horizontal rows of twelve matrix characters each, corresponding to the arrangement of the character keys in the keyboard, the vertical rows of one field being alined with those of the other field and the characters in the vertical rows being arranged with regard to size relation, for convenience in determining the type body size of the mold, the characters in the horizontal rows being arranged without regard to size relation. The matrix plate 42 moves in two directions in angular relation to each other, viz:—vertically and horizontally; to present a selected matrix character at the casting position. To provide for these movements in two directions, the matrix plate 42 is suspended from the matrix plate shaft 190, and when released from its normal position, descends vertically until arrested by a vertical stop 30, and then moves horizontally along the matrix plate shaft until arrested by a horizontal stop 154. See Figs. 19, 20, 21 and 26. For the vertical movement of the matrix plate 42 the ends of the matrix plate shaft 190 are mounted in the matrix plate slides 191 vertically movable in slideways 192 forming part of the field shift slides 179. The matrix plate shaft 190 is provided with two bearing blocks 189 contained in the forked ends of the elevator rock shaft arms 188. The elevator rock shaft arms 188 are fixed on the elevator rock shaft 187, journaled in bearings 186 which are a part of the field shift slides 179, and these field shift slides 179 are vertically movable in slideways 178 in the standards 177. See Figs 19, 20 and 21. Journaled at the top of the standards 177 is a rock shaft 181 having two crank arms 182 pivotally connected by links 183 to the field shift slides 179, the rock shaft 181 being provided with a crank 184 by which it can be turned to raise or lower the field shift slides and thus change the matrix field presented for use.

In the field shift slides 179 are vertical slideways 193 for the matrix plate elevators 195, provided at their upper ends with horizontal grooves 180 for the slide blocks 196 pivoted to the elevator rock shaft arms 188 by studs 105. See Figs. 19, 20, 21, 22 and 23. Connected to the matrix plate elevators 195 and to the field shift slides 179 are springs 197 accelerating the descent of the matrix plate elevators and the elevator rock shaft arms 188 for the downward flight of the matrix plate 42 when the slotted arm 43 disengages the detent dog 45 from the shoulder 211 of the adjacent matrix plate elevator.

When the stop selector 28 actuated by the pressing of a character key moves the controlling slide 41, the slotted arm 43 acting on the pin 44 disengages the detent dog 45 from the shoulder 211. The springs 197 then accelerate the descent of the matrix plate elevators 195 to lower the elevator rock shaft arms 188, matrix plate shaft 190 and matrix plate 42 until the descent of the matrix plate is arrested by the vertical stop 30 positioned by the same selector 28 which moves the controlling slide 41.

I use one vertical stop 30 for each stop selector 28, seven in all, and rockably mount these vertical stops on a shaft 18 and tension them by springs 19 to prevent their vibration and their dislodgment until actuated by the stop selectors 28. The springs 19 are attached at one end to a supporting bracket 24 and engage at the other end in recesses 25 in the hubs 29 of the vertical stops 30. When a character key is pressed its respective stop selector 28 engages a corresponding stop 30 and moves it forward until its free end is in the path of the stopping element 31. This stopping element, operating vertically in a slideway 32 forming part of the field shaft slide 179, is suspended from the free end of a stopping arm 33 fixed on the elevator rock shaft 187, and is provided with a set of stops for each field of matrix characters on the matrix plate. In the present instance the matrix plate has two fields of matrix characters and consequently the stopping element 31 has two sets of stops 36, 37, the set of stops 36 being for the upper matrix field, and the other set 37 for the lower matrix field. The stops of each set are stepped diagonally across the stopping element and correspond in position with their respective horizontal rows of matrix characters, and as seven horizontal rows of matrix characters are shown in each field I have provided seven steps in each set of stops, the steps for the lower field being vertically below the corresponding steps for the upper field, each step being vertically alined with its respective stop 30. When a vertical stop 30 is positioned in the path of the stopping element 31 and the detent dog 45 is disengaged from the matrix plate elevator 195, the matrix plate elevator descends until the downward movement of the stopping element 31 is arrested by its respective vertical stop 30. The stoppage of the downward movement of the stopping element 31 arrests the downward movement of the stopping arm 33, the turning movement of the elevator rock shaft 187, and the downward movement of the elevator rock shaft arms 188, matrix plate elevators 195 and matrix plate 42.

When the downward movement of the matrix plate is arrested the horizontal row containing the selected matrix character is in line with the mold cavity 92 of the type body mold. A propelling arm 225 is then actuated to cause the horizontal flight of the matrix plate until arrested by the projected horizontal stop 154 to bring the vertical row containing the selected character into line with the mold cavity, the matrix character at the junction of these horizontal and vertical rows being the one required for presentation at the casting position. See Fig. 19. I have also provided a return mechanism for the vertical stops 30, this return mechanism consisting of a push bar 40 connected by a link 38 to a fulcrumed lever 63 actuated by a cam 65 on the high speed shaft 8, the cam operating to actuate the push bar through its operable connections when the matrix plate is being restored to its elevated position. See Figs. 19, 20 and 21.

For restoring the matrix plate to its elevated position the matrix plate elevators 195 are provided with lifting shoulders for each field of characters on the matrix plate. See Fig. 22. In the present instance the matrix plate is shown to have two fields of characters and the matrix plate elevators are therefore provided with lifting shoulders 198 for the upper field of matrix characters and lifting shoulders 199 for the lower field. Lifting dogs 200 are fulcrumed to lifting slides 201 vertically movable in slideways 202 on the standards 177, and are connected by links 203 to levers 204. The levers 204 are fulcrumed to bearings 205 on the bed plate 69 and are actuated by cams 206 on the high speed shaft 8.

If the lower matrix field is positioned for use the lower lifting shoulders 199, as shown in Fig. 22, will be engaged by the lifting dogs 200 when the lifting slides 201 rise under the influence of the cams 206 and their lever and link connections. If the upper matrix field is positioned for use the upper lifting shoulders 198 will be engaged and raised by the lifting dogs 200. Connected to the lifting slides 201 and to the bottom of the slideways 202 are springs 73 to lower the lifting slides and lifting dogs when the levers are released by the cams 206, the levers 204 descending with the lifting slides until their rollers 208 come into contact with the depressed parts 70 of the cams. Fastened to the slideways 202 in rear of the lifting dogs 200 are interfering blocks 210 having beveled faces engaging correspondingly beveled faces of the lifting dogs. These interfering blocks are so placed that the springs 209 will hold the lifting dogs 200 clear of the path of the lifting shoulders 198, 199, when the lifting dogs are in their inoperative position so that, when the field of matrix characters is being changed, the lifting shoulders can move with the field shift slides, 179, without impedance by the lifting dogs 200. See Figs. 20, 21 22, 23 and 24.

If the lower field of matrix characters is presented for use, the field shift is raised into the position shown in Figs. 20 and 22 and when the upper field of matrix characters is presented for use the field shift is lowered into the position shown in Fig. 21. In the position shown in Figs. 20 and 22 the lifting dogs 200 will engage with the lifting shoulders 199 and when the field shift is in the position shown in Fig. 21, the lifting dogs will engage with the shoulders 198. During the revolution of the high speed shaft 8, the cams 206 raise the lifting levers 204 from a substantially horizontal, to an inclined, position and these levers when raised elevate the lifting slides 201 and raise the lifting dogs 200. During their upward movement the lifting dogs are moved by the interfering blocks 210 into the path of the lifting shoulders to engage and raise the matrix plate elevators to their elevated position where they are held by the detent dog 45 engaging with the shoulder 211, the detent dog 45 being fulcrumed to the adjacent field shift slide 179 and being provided with a pin 44 to engage within the slotted arm 43 carried by the controlling slide 41.

The action of the field shift, matrix plate elevators, and vertical stops 30 may be briefly summarized as follows: When the matrix field is selected, the rock shaft 181 is turned to raise the field shift slides into the position shown in Fig. 20 or lower them into the position shown in Fig. 21, and thus bring the selected matrix field into casting relation with the mold. The change in the position of the field shift slides causes a corresponding change in the position of the matrix plate elevators, the matrix plate and the stopping element 31, all of which move unitedly with the field shift during the change of the matrix field, but all of which maintain their primal arrangement with regard to each other. Starting with the pressing of a character key 3 the action of the parts can be traced as follows: At the commencement of its action the keyrod, through its operable connections moves its stop selector 28 until the stop selector pushes its respective vertical stop 30 into the path of the stopping element 31 to arrest the downward flight of the matrix plate 42, the keyrod continuing the movement of the stop selector until it actuates the controlling slide 41 and slotted arm 43 to disengage the detent dog 45 from the shoulder 211 for the descent of the matrix plate elevators. The descent of the matrix plate elevators lowers the elevator rock shaft arms 188 and the matrix plate shaft 190 until the stopping element 31 is arrested by the vertical stop 30 projected into its path, these parts remaining in this position until a cast is made. When the cast is made the cams 206 actuate the levers 204 to raise the lifting dogs 200 and bring them into engagement with the lifting shoulders for the return of the matrix plate elevators to their elevated position where the shoulder 211, is engaged by the detent dog 45. When the keyrod is released, it and the stop selector 28 return to their normal position, and the controlling slide 41 is restored to its normal position by the action of a cam 267 revolving with the high speed shaft 8. When the matrix plate elevators have attained their elevated position and the detent dog 45 has engaged the shoulder 211 the cams 206 release the lifting levers 204 and permit them and the lifting slides 201, lifting dogs 200, and links 203, to descend under the influence of the springs 73, the lifting dogs being held clear of the path of the lifting shoulders when these parts are restored to their normal position.
tion.

*Horizontal stop and horizontal stop actuating mechanism.*—Fastened to a bracket 54 at right angles to the rock shaft 34 is a slide box 55. The rock shafts 34 project into the slide box 55 and their adjacent ends are formed with tongues 56. The tongues of eleven of the rock shafts 34 enter corresponding recesses 57 in the hubs 58 of eleven cams 59 operating in slots 60 in eleven selector slides 61, the tongue 56 of the remaining rock shaft 34 entering a corresponding recess in the hub of the finger 74. The eleven selector slides 61 reciprocate within the slide box 55, six of them having their initial movement to the left, and the remaining five to the right. The selector slides 61 are provided with fingers 62 and these fingers and the finger 74 which has its initial movement to the left, engage the bell cranks 145 and operate the latch bolts 141. See Figs. 8, 15, 16, 17, 18, 25 and 34. When any keyrod of the first five transverse rows of keys from the right of the keyboard is operated, it moves its respective rock shaft 34 to the right and causes the initial reciprocating movement of its respective selector slide 61 to the right causing its bell crank 145 to release its drop bar 138 and project its horizontal stop 154 into the path of the matrix plate carriage 216. The operation of any keyrod in the sixth transverse row from the right turns its respective rock shaft 34 and finger 74 to the left, the finger 74 acting directly on its respective bell crank 145 and causing the latter to effect the release of its respective drop bar 138 to project its horizontal stop 154. The keyrods of the remaining six transverse rows operate their respective selector slides 61 to the left in a manner corresponding to the operation of the five transverse rows operating to the right.

The latch bolt 141 for each drop bar 138 is contained in its respective section of the latch bolt comb 136 and is pressed into engagement with its respective drop bar 138 by a spring 142. Pivoted in the latch bolt comb 136 are twelve bell cranks 145 for the twelve latch bolts 141, one arm of each bell crank operating in a recess 146 in its respective latch bolt 141 and the other arm projecting beyond the comb, eleven of the projecting bell crank arms engaging with the fingers 62 of the eleven selector slides 61, and the twelfth bell crank arm engaging with the finger 74. See Figs. 15, 16, 25, 32 and 34.

When a character key is pressed its respective selector slide 61 or finger 74 actuates a bell crank 145 to withdraw a latch bolt from a drop bar 138. The drop bar 138 then descends until the shoulder 75, at the top of the recess 139, engages a stationary plate 147, the descent of the drop bar being accelerated by a spring 148 fastened at one end to the plunger comb 135 and bearing at the other end against the top surface of the lifter lug 149 forming part of the drop bar 138.

Below the latch bolt comb 136 is a shaft 140 supported by the standards 133, and loosely mounted on the shaft 140 is a bell crank 150 for each drop bar 138. Each bell crank 150 has a forked arm 151 engaging a lug 152 projecting from its respective drop bar 138, the other arm 153 of each bell crank engaging in a recess 76 in its respective horizontal stop 154. During the descent of the drop bar 138, the lug 152 oscillates the bell crank 150 to project the horizontal stop 154 into the path of the matrix plate carriage 216, see Figs. 25 and 32, the movement of the horizontal stop being arrested when the shoulder 75 comes into contact with the stationary plate 147.

On a shaft 155, passing through the plunger comb 135, is a drop bar lifter 156, for each drop bar, engaging the under side of the lifter lug 149 of its respective drop bar 138, and actuating each drop bar lifter is a plunger 157 slidable in its respective section of the latch bolt comb 135 and moved into the path of the cam 160 by the descent of the drop bar. Each plunger 157 is provided with a lug 158 against which and the end of the spring chamber in the plunger comb 135 bears a spring 159 to prevent the vibration of the plunger. See Fig. 32.

The action of the horizontal stops 154 may be briefly summarized as follows: When a key-rod is pressed it causes the release of the latch bolt 141 from its respective drop bar 138 which then descends until its motion is arrested by the arrester plate 147. The descent of the drop bar by means of the lug 152 and bell crank 150, projects a horizontal stop 154 into the path of the matrix plate carriage 216 lowering the drop bar lifter 156 and moving its respective plunger 157 into the path of the cam 160. During the revolution of the high speed shaft 8, the cam 160 engages the plunger 157 which has been projected beyond the plunger comb 135 and returns the plunger 157 into the comb. The plunger 157 during its return movement engages the drop bar lifter 156 and actuates the latter to restore the drop bar 138 to its elevated position. When the drop bar is raised to its elevated position the spring pressed latch bolt 141 locks it until it is again released by the operation of the keyrod. As the drop bar 138 ascends to its elevated position the lug 152 oscillates the bell crank 150 to restore the horizontal stop 154 to its normal position.

It has been herein stated that when a keyrod is pressed it actuates, through operable connections, to withdraw the latch bolt from the drop bar which then descends and projects a horizontal stop to arrest the horizontal flight of the matrix plate, the setting of the horizontal stop occurring before the operation of the keyboard sets the clutch for the resultant actions of the machine.

*Matrix plate, matrix plate carriage and matrix plate actuating mechanism.*—The matrix plate 42 shown in Figs. 27, 28 and 29 has on its face two fields of matrix characters, the matrix characters of each field being arranged in rows in two directions for the alinement of any character of either field with the mold cavity by a movement of the matrix plate in two directions in angular relation to each other, the movement being controlled by stops positioned by the operation of the keyboard. The characters in the matrix plate are disposed vertically with regard to size relation and horizontally without regard to size relation. In the matrix plate herein described the matrix characters in each of the two fields are arranged in twelve vertical rows and seven horizontal rows corresponding with the arrangement of the rows of character keys in the keyboard so that the operation of any character key 3 will indicate a correspondingly located character in the operative field on the matrix plate. In the reverse face of the matrix plate is a centering recess 78, for each character, to receive the centering pin 240 which centers the character with the mold cavity 92 and locks it against the mold. See Figs. 30 and 31. The matrix plate 42 is continually maintained in a plane parallel with the mold and being suspended from the matrix plate shaft 190, normally supported in an elevated position by the matrix plate elevators, descends when the matrix plate elevators are released, moving vertically downward until arrested by the vertical stop 30 set to select the horizontal row of matrix characters in the operative field of the matrix plate, the matrix plate then being moved in a horizontal direction by the matrix plate carriage 216, see Figs. 19 and 25, until arrested by the horizontal stop 154. This vertical movement of the matrix plate is independent of any movement of the matrix plate carriage and is provided for by the vertical slideways 217 in the matrix plate carriage 216. In the vertical slideways 217 are tongues 218 entering corresponding grooves 215 in the sides of the matrix plate 42 to guide it as it moves vertically in the slideways and to prevent its displacement laterally from the matrix plate carriage. See Fig. 29.

It has been stated herein that the matrix plate is supported from the matrix plate shaft 190 having vertical movement in suitable slideways and it is to be understood that the movement of the matrix plate in the slideways 217 is only limited by the vertical movement of the matrix plate shaft. During the change of the field of characters the matrix plate is shifted vertically through the slideways 217 until the selected field is brought into operative relation with the mold. During the selection of a character from the operative field the matrix plate moves in a downward direction until the matrix plate elevators and matrix plate shaft have attained the limit of their downward movement to bring the horizontal row containing the selected character into line with the mold cavity 92. The matrix plate carriage 216 then moves in a fixed path horizontally across the stop field, and being provided with carriage guides 219 extending from opposite sides of the matrix plate slideway 217, is guided by grooved idlers 220 journaled to oscillating arms 79 hinged to brackets 80 attached to the standards 177.

In one of the matrix plate carriage guides 219 is a horizontal slideway 221 for the buffer plate 222, and interposed between the buffer plate 222 and the end of the horizontal slideway 221, are buffer springs 223. Revolubly mounted in the buffer plate 222 is a swivel 224 connecting the propelling arm 225 to the matrix plate carriage. The propelling arm 225 is fixed on a rock shaft 226, having a rock shaft crank 227 engaged by the matrix plate carriage cam 228, fixed on the high speed shaft 8. See Fig. 19. The rock shaft 226 is provided with two arms 229 having stops 230 at their outer ends, and the adjacent standard 177, above the rock shaft 226, is provided with a bracket 231 having projecting arms 232 above the rock shaft arms 229, and springs 233 are connected to the bracket arms 232 and to grooved collars 234 slidable on the rock shaft arms 229.

As the horizontal flight of the matrix plate carriage is arrested by the projection of any selected horizontal stop 154 into its path, it is necessary to provide an impelling means for the matrix plate carriage which will exert on it a uniform force during its flight to that stop. It has been found in the field of actual use that when a spring is used having sufficient strength to impel the matrix plate to the farthest horizontal stop the spring if it has a fixed connection with the arms 229 of the rock shaft, impels the matrix plate carriage with too great a force against the horizontal stop 154.

To enable the propelling arm 225 to move the matrix plate carriage with a uniform impelling force from the commencement to the completion of its travel, the springs 233 are slidably connected to the arms 229 in the manner above stated, and when the matrix plate carriage is in its normal position, the collars 234 will be on the rock shaft arms 229 adjacent to the rock shaft. When the collars are in this position the springs have their greatest extension and are consequently exerting their greatest force on the rock shaft arms to start the motion of the propelling arm 225 and the flight of the matrix plate carriage. When the rock shaft turns, the arms 229 move upwardly and the collars 234 move outwardly on the arms, permitting the springs 233 to contract and decrease in force. As the force of the springs decreases the leverage resulting from the outward movement of the collars on the arms 229 increases and compensates for the decreased force of the springs. By this means it is possible to impel the matrix plate carriage with a uniform force from the commencement to the completion of its flight and employ weaker springs for that purpose than could otherwise be used.

The matrix plate carriage cam 228 is designed to quickly release the rock shaft crank 227 when the high speed shaft 8 commences its revolution so that the matrix plate carriage can commence its flight, to the projected horizontal stop 154 under the impulse of the springs 233; the matrix plate carriage cam 228 being so formed as to permit of the rapid flight of the matrix plate carriage to the projected stop 154. The matrix plate carriage is restored to its normal position by the matrix plate carriage cam 228 actuating the rock shaft crank 227 and the rock shaft 226 to return the propelling arm 225.

The horizontal flight of the matrix plate may be briefly summarized as follows: When the high speed shaft 8 starts its revolution the matrix plate carriage cam 228 releases the rock shaft crank 227 and the springs 233, through the agency of the rock shaft 226 and propelling arm 225 then move the matrix plate carriage in its horizontal flight across the stop field until arrested by the horizontal stop 154 projected into its path, the matrix plate carriage cam being timed to permit the matrix plate carriage to remain at the casting position until the cast has been made. When the cast is made the matrix plate carriage cam 228 engages with the rock shaft crank 227 moving it and turning the rock shaft 226 so that the propelling arm 225 will restore the matrix plate carriage to its normal position as the high speed shaft 8 completes the cycle of its revolution, holding it there until the commencement of the next revolution of the high speed shaft to repeat the action of the matrix plate carriage actuating parts.

The vertical flight of the matrix plate through the matrix plate carriage slideways constitutes a one-way movement of the matrix plate, and the horizontal flight of the matrix plate carriage and matrix plate to the horizontal stop constitutes another one-way movement of the matrix plate, thus the matrix plate may be said to have a two-way movement in angular relation directly controlled by the operation of the keyboard through the medium of the vertical and horizontal stops, which arrest its movement in two directions.

*Matrix plate centering and locking mechanism.*—When the vertical and horizontal flights of the matrix plate 42 are arrested by a vertical stop 30 and a horizontal stop 154, the matrix character to be reproduced is positioned opposite the mold cavity 92, of the type body mold, and as the center of the matrix character, selected for the reproduction, should be opposite the center of the mold cavity 92 during the cast, it is necessary to provide a centering means which will accurately position the character selected for reproduction opposite the center of the mold cavity. To do this the matrix plate has in its reverse side, a recess 78 for each matrix character, and when the vertical and horizontal flights of the matrix plate have been arrested by the vertical and horizontal stops, the recess 78 corresponding to the positioned matrix character is alined with the conical point 239 of the centering pin 240. See Fig. 31.

The centering pin 240 operates horizontally through a tubular stripper 241 having a stripper head 82. This tubular stripper is movable lengthwise through one of the standards 133 supporting the horizontal stops 154, and the stripper head 82 engages in a groove 81 in the matrix plate carriage 216, slidably connecting the matrix plate carriage to the stripper 241. Within the stripper 241 is a chamber 242 for the spring 243 coiled on the centering pin 240, the spring bearing against a collar 244 on the centering pin and against the end of the chamber to retract the centering pin from the recess 78 when the cast is made, the receding movement of the centering pin being limited by an adjustable nut 245 in the stripper 241.

When the selected matrix character is positioned opposite the mold cavity 92, a cam 249 on the high speed shaft 8 actuates an adjustable lever 247 and spring tensioned presser plate 252 to force the point of the centering pin into the recess 78 to correctly center the matrix character with the mold cavity and lock the matrix plate against the type body mold for the cast, the cam 249 retaining the matrix plate in this position until the cast is made. When the cast is made the cam 249 releases the lever 247 so that the centering pin 240 will, under the influence of the spring 243, recede from the recess 78. A cam 250 on the high speed shaft 8 then actuates a lever 253 to move the stripper 241 to retract the matrix plate carriage and with it the matrix plate 42 from the mold, the lever 253 engaging in a slot 83 in the stripper so that when actuated by the cam 250 it will cause the positive retraction of the stripper and matrix plate.

The lateral movement of the matrix and carriage and matrix plate to and from the type body mold, is permitted by the oscillating arms 79 movably holding the matrix plate carriage for its lateral movement toward the type body mold so that a metal tight joint will be made by the matrix plate and mold when the selected character is presented to the mold cavity.

The first action occuring during the revolution of the high speed shaft 8 is the release of the rock shaft crank 227 by the matrix plate carriage cam 228, so that the springs 233 will cause the horizontal flight of the matrix plate carriage to the horizontal stop 154 which has been set by the operation of a character key 3; after which the cam 249, by actuating the lever 247 and presser plate 252 moves the centering pin into the alined recess 78 to center the selected matrix character with the mold cavity 92 and lock the matrix plate 42 tightly against the type body mold until the cast is made. Subsequent actions resulting from the revolution of the high speed shaft are the release of the lever 247 by the cam 249 in order that the locking pin may recede from the recess 78 by the action of the spring 243 and finally the return of the stripper to its normal position under the influence of the cam 250 and lever 253 stripping the matrix plate from the type for the restoration of the matrix plate carriage to its normal position under the influence of the return movement of the propelling arm 225. See Figs. 19, 25, 30 and 31. These actions may be briefly summarized as follows:—The pressing of a character key after setting the stops controlling the vertical and horizontal flights of the matrix plate sets in motion the cam 249 and its operable connections to center the selected matrix character with the mold cavity, lock the matrix plate against the mold until the cast is made, and then withdraw the matrix plate from the mold for the return of the matrix plate to its normal position.

*Mold and mold actuating mechanism.*—The mold may be said to consist of four principal parts, viz:—a water cooled supporting structure 275, a movable mold side 274 forming one side, an ejector 313 forming another side, and a water cooled mold cap 294 forming the other two sides of the type body. It is necessary, that the ejector must be adjustable to set the type body size for a desired character and operable to push the type body from the mold cavity 92 into the assembling line of type bodies, and, that the mold cap shall be movable to close for the casting and to open for the ejection of the type. The mold side 274 is movably seated on the top of the mold supporting structure 275, which is provided with angular shoulders 271 for centering the mold side and enabling it to resist the end thrust of the mold cap 294 when locked in its casting position by the clamp 298, and on the top surface of the mold side 274 is a dovetail core 276. In the sides of the mold supporting structure are vertical slideways 277 for the slides 278 of the mold cap 294, and in the slides 278 are slots 279 terminating at their upper ends in annular sockets 280. Contained in the slots 279 are links 281 having rounded heads 282 oscillating in the annular sockets 280 as the links raise and lower the top mold part, the links 281 being pivoted to lifter arms 84 forming part of the bell cranks 283, loosely mounted on the rock shaft 284. The rock shaft 284 is provided with a crank 286 having a roller 287 engaging with the rock shaft actuating cam 288, fixed on the high speed shaft 8. Keyed on the rock shaft 284 is a bell crank 291 provided with pins 292 extending into slots 293 of the lifter arms 84, the slots being elongated to permit of a limited movement of the bell crank and pins 292 before coming into contact with the ends of the slots and actuating the lifter arms during the oscillation of the rock shaft. When the rock shaft 284 is turned by the cam 288 the pins 292 move into engagement with the adjacent ends of the slots 293 and turn the lifter arms 84 to raise the links 281 and the mold cap 294 until the mold cap is clear of the type in the mold cavity 92. As the rock shaft 284 turns in the opposite direction the lever 305 under the influence of the springs 307 engages with the pin 303 and turns the arms 302 to restore the lifter arms 84 to their normal position, returning at the same time the links 281 and lowering the mold cap 294 against the ejector 313 and the bottom mold side 274, the mold cap being pressed in its closed position by the clamp 298. See Figs. 33 and 38. The clamp 298 bearing against the mold cap 294, when the mold parts are "locked up" is pivotally connected to the adjacent end of the link 301, and the link 301 is pivoted to and moves with the bell crank 291 during the oscillation of the rock shaft 284 forcing the clamp 298 to lock the mold cap 294 in its closed position for the casting of the type body, and to release the clamp 298 from the mold cap 294 when the cast is made so that the mold cap can be raised and the type body ejected from the mold cavity 92, by the ejector 313.

In the mold supporting structure 275 is a roller 311, see Fig. 34, engaging with a serrated surface 312 on the slide 278 to tilt the mold cap during its upward and downward movement and prevent it coming into contact with or wearing on the end of the bottom mold side 274, sufficient play in the slideways being provided to allow of this movement. Slidable on the top of the bottom mold side 274 is the ejector 313, having in its bottom surface a dovetail groove 314 to receive the dovetail core 276 of the bottom mold side 274, and by which the bottom mold side 274 is connected to and carried by the ejector as it moves between the mold and the line assembling box. The ejector 313 operates between the mold cap 294 and the bottom mold side 274, the depth of the ejector determining the depth of the mold cavity 92, by spacing the mold cap from the bottom mold side.

The ejector constitutes the adjustable mold side or liner for the mold cavity 92 and on the end of the ejector is a vertically inclined protuberance 87 to form an inclined side 88 in the type body to receive the tapered space bar 399 hereinafter described, the inclination of the side 88 corresponding with the taper of the space bar. The ejector 313 is connected by a link 317 with the ejector lever 318 and projecting laterally from the ejector are two shoulders 319 engaged by the forks of the ejector adjusting lever 321 fulcrumed to the mold supporting structure 275. See Figs. 34, 35 and 38. Pivotally and adjustably connected to the lower end of the lever 321 is a shoe 325 providing an even bearing on the wedge 328 during the different positions of the lever 321. Extending through the lever 321 is a set screw 326 bearing against the shoe 325 and adjusting it relatively to the end of the lever; and in the mold supporting structure 275, opposite the adjustable shoe 325 is a slideway 327 for the mold setting wedge 328 engaging with the adjacent face of the adjustable shoe 325. The wedge 328 actuates the lever 321, to adjust the ejector 313 to vary the width of the mold cavity 92 in which the type body is to be cast and thus determine the body width of the type, the lever 321 being returned to its initial position by the springs 332. See Fig. 34.

The mold setting wedge 328 is connected to an arm 329 actuated by the wedge setting plate 331 mounted on the rock shaft 330. The wedge setting plate is engaged by the push bars 334 pivotally suspended from the drop bars 138, and the push bars 334 are provided with fingers 335 to be engaged by the plungers 336, when the push bars have been lowered by the descent of the drop bars. The plungers 336 are slidable in the plunger comb 89 and are engaged by the pawls 337, these pawls being actuated by levers 338 moving under the influence of the cam 160. Connected to the bottom of the push bars 334 and to the bed plate 69 are springs 339 which maintain the push bars in vertical position when they are relieved of the pressure of the plungers 336, the springs 339 also assisting the springs 148 in accelerating the descent of the drop bars 138. When a drop bar 138 is released, it descends, under the influence of the springs 148 and 339, and lowers its respective push bar 334, so that when the downward motion of the push bar is arrested the finger 335 will be alined with its respective plunger 336, the fingers 335 of the unoperated push bars remaining out of alinement with their respective plungers. When the high speed shaft 8 revolves the cam 160 engages the lugs 90 of the levers 338 and then actuates the pawls 337 to press the plungers 336 toward the push bars 334. The plunger 336, for the released drop bar, then pressing the finger 335 of its respective push bar moves the wedge setting plate 331 and actuates the arm 329 for setting the wedge 328. The setting of the wedge moves the lower end of the ejector adjusting lever 321 outward and the forked upper end inward to engage the shoulders 319 and adjust the ejector 313 to determine the type body width of the mold cavity 92 the ejector remaining in that position until the cast has been made when the cam 160 releases the levers 338, the levers 338, pawls 337 and plungers 336 then returning to their normal position under the influence of the springs 340. See Figs. 8, 32, 34 and 37. When the drop bar 138 is returned to its normal position, by the drop bar lifting mechanism previously described, it lifts its push bar with it, the spring 339 then causing the push bar to assume a vertical position. To vary the movement of the mold setting wedge 328 the lugs 90 are of different heights so that the levers 338 will have different movements, the difference in the movements of the levers resulting in different movements of the pawls 337 and plungers 336, these different movements of the plungers resulting in different adjustments of the wedge 328 for varying the type body width of the mold cavity.

It has herein been described how the mold setting wedge 328 is actuated by a cam 160 and operable connections consisting of the levers 333, pawls 337, plungers 336, push bars 334 and wedge setting plate 331 to adjust the mold cavity 92 for the type body width, and as it is necessary to restore the parts to their normal position after each cast I have provided the arm 329 with a spring tensioned slotted link 343 actuated by a cam 297 on the high speed shaft 8 which is so timed as to engage the link and retract it when the cast has been made to cause the return of the wedge to its initial position, a spring 295 providing for the return of the link 343 to its normal position when released by the cam 297, the slot 296 in the link 343 allowing for the setting of the wedge 328 and the subsequent operation of the machine without causing a corresponding movement of the link. See Fig. 32.

When the selected matrix character to be reproduced is presented to the mold cavity 92 by the operation of the corresponding character key projecting into the stop field a vertical stop 30 to arrest the vertical flight of the matrix plate 42 downward through the matrix plate carriage 216 and a horizontal stop 154 to arrest the horizontal flight of the matrix plate carriage in a horizontal direction, the corresponding drop bar 138 is released and carries downward with it the push bar 334, and alines its fingers 335 with the corresponding plunger 336. The high speed shaft 8 is then set in motion and the cam 160 engaging the levers 338, moves the pawls 337 to press the plungers 336 toward the push bars 334. The plungers of all the push bars, except the one which has been lowered, move under the influence of the cam 160 without coming into engagement with the fingers 335 of their respective push bars, but the plunger of the drop bar which has been lowered comes into contact with its finger 335 and moves the push bar in the direction of the wedge setting plate rocking the latter to set the wedge and determine the width of the mold cavity 92. See Fig. 32.

Before the mold parts are "locked up" the mold cap 294 is yieldingly held by the tension of the spring 307 applied to the slides 278 through the lever 305, pin 303, bell cranks 283 and links 281, and when the rock shaft 284 is oscillated, it actuates the clamp 298 through the link 301 to effect the "locking up" of the mold for the casting of the type body. See Fig. 33. When the cast is made, the rock shaft 284 oscillates to unlock the mold, moving the clamp 298 away from the mold cap 294, and causing the links 281 to lift the mold cap 294 away from the bottom mold side 274 and ejector 313. The ejector 313 and mold side 274 are then actuated by the ejector lever 318, crank 341, rock shaft 342, crank 344 and cam 345 on the high speed shaft 8 to deliver the type from the mold cavity 92 to the line assembling box 235 and then return to their normal position. The mold cap 294 is then closed and yieldingly held against the ejector 313 and bottom mold side 274, by the action of the links 281, bell cranks 283, lever 305 and springs 307. See Figs. 33, 34 and 38.

*Foot plate for mold.*—I have provided the mold with a revoluble foot plate 72 having a plural number of inlets 71 successively brought into position with the mold cavity 92 at each casting operation cleaned and in condition for the unobstructed flow of type metal from the nozzle of the working melting pot into the mold cavity, and I have mounted this foot plate on a stud 97 provided with a ratchet wheel 93 intermittently rotated by a spring tensioned ratchet pawl 94 pivoted to the clamp 298. The clamp 298 oscillates on the hollow shaft 95, supported in lugs 96 projecting from the mold supporting structure 275 and journaled in the shaft 95 is the stud 97 for the ratchet wheel 93. The inlets 71 are conical forming knife edges on the mold side of the foot plate to shear the gate from the type body as the foot plate revolves. The perimeter of the foot plate is provided with notches 98 to receive the spring detent 100 which prevents the reverse rotation of the foot plate and holds it in its fixed position until rotated by the action of the ratchet pawl and ratchet wheel. With each rotation of the high speed shaft 8 the cam 288 operates to oscillate the rock shaft 284, the resultant action of this oscillation being to close the mold cap 294 against the ejector 313 and mold side 274, through the agency of the operable connections previously described. Succeeding the action of closing the mold cap the clamp 298 is operated to lock up the mold parts and coincident therewith it actuates the ratchet pawl 94 to engage a tooth of the ratchet wheel 93 for the next partial rotation of the foot plate 72.

The ejection of the type metal from the working melting pot into the mold cavity 92 through the positioned inlet 71 then occurs after which the rock shaft 284 is oscillated to unlock the mold parts and to raise the mold cap above the type in the mold cavity. The unlocking action of the mold parts oscillates the clamp 298 away from the mold structure, and this oscillation of the clamp causes the ratchet pawl 94 to partly rotate the ratchet wheel 93, and foot plate 72, and bring the next succeeding inlet 71 into position with the mold cavity for the next cast. The foot plate 72 revolves between the two scrapers 131, 132, for removing the gates and metal flakes from the foot plate as it revolves, so that each inlet when it passes the scrapers will be thoroughly cleaned for the unobstructed passage of the type metal from the working melting pot into the mold. The mold cap 294 is then lifted and the type is delivered from the mold cavity 92 by the ejector 313 and movable mold side 274 which carry the type to the place of assemblage where the ejector pushes it into the assembling line. The continued action of the machine returns the ejector 313 and movable mold side 274 to the mold structure and closes the mold cap 294 toward ejector 313 and mold side 274 and brings the clamp 298 up to engagement with, but not tightly against the mold cap. By the use of a revoluble foot plate having conical shaped inlets and the two scrapers placed on opposite sides of the foot plate it is possible to bring to exact position to form the foot of the type body, a foot plate with inlets cleaned and in condition for the unobstructed flow of the type metal into the mold cavity, and to shear or trim the foot of the type body before it is delivered into the assembling line. See Figs. 33, 35, 36 and 38.

*High speed shaft, clutch and clutch setting mechanism.*—The controlling slide 41 reciprocates in the slide bed 134 and fulcrumed to the slide bed 134 is a bell crank 254 having one arm 143 engaging in a recess 144 in the controlling slide and the other arm 161 engaging in a groove 162 in the clutch setting slide 255. When a keyrod is pressed, the vertical stop selector 28 by moving the controlling slide 41 and causing the oscillation of the bell crank 254 moves the clutch setting slide 255 to withdraw the pivoted arm 264 from the clutch dog 256. See Figs. 10 and 39. The clutch dog 256 engages with the ratchet teeth 257 of the driving clutch member 258 loosely mounted on the high speed shaft 8, to lock together the driving clutch member 258 and driven clutch member 259. The driven clutch member 259 is fixed on the high speed shaft 8 and when the clutch dog 256 engages with the ratchet teeth 257 of the driving clutch member, the high speed shaft revolves with the driving clutch member rotated by motion transmitted from the motor 163 through the operable connections 260. The clutch dog 256 is provided with an arm 164 engaging with the pivoted arm 264 of the clutch setting slide. The arm 164 is contained in a groove 266 in the hub of the driven clutch member 259 and when the clutch dog 256 engages with the ratchet teeth 257 it locks the driving and driven clutch members together for the revolution of the high speed shaft 8. See Figs. 20, 21, 39, 40, 41, 42 and 43. To prevent the overrun of the high speed shaft, I have provided the clutch setting slide 255 with a stop 262 and I have provided the high speed shaft 8 with a stop 261, which engages with the stop 262 when the clutch setting slide 255 is moved to disengage the clutch dog 256 from the ratchet teeth 257. When the controlling slide 41 is actuated by the stop selector 28, it moves the clutch setting slide 255 and withdraws the stop 262 from engagement with the stop 261 simultaneously with the locking together of the driving and driven clutch members for the revolution of the high speed shaft 8. The high speed shaft then revolves for the resultant actions of the type producing mechanism, and during its revolution the cam 267 on the high speed shaft 8 engages with the arm 268 forming part of the controlling slide 41 to return the controlling slide to its normal position.

The return of the controlling slide to its normal position oscillates the bell crank 254, moving the clutch setting slide to position the pivoted arm 264 in the path of the clutch dog 256 so that when the high speed shaft has completed its revolution the arm 264 will engage with the arm 164 and throw the clutch dog 256 out of engagement with the ratchet teeth 257, the action of the clutch dog 256 when released by the clutch setting slide 255, being accelerated by springs 269 attached at one end to the clutch setting dog 256 and held at the other end in the recess 270 in the face of the driven clutch member 259, so that when the pivoted arm 264 of the clutch setting slide is removed from beneath the arm 164 they will throw the clutch dog quickly into engagement with the ratchet teeth 257. When the clutch setting slide 255 is moved to position the pivoted arm 264 in the path of the arm 164 it positions the stop 262 in the path of the stop 261 fixed on the high speed shaft 8 so that when the high speed shaft has completed its revolution, the stop 261 will engage with the stop 262 and prevent the overrun of the shaft. The cam 267 is timed to engage the arm 268 until the high speed shaft 8 completes its revolution and the matrix plate 42 and matrix plate stops 30 and 154 are returned to their normal position, thus locking off the action of the controlling slide 41 and consequently that of the stop selectors 28 during that interval, thereby preventing the operation of any character key 3 until the high speed shaft has completed its revolution and all the parts of the machine are correctly positioned for the next cast. See Figs. 9, 20 and 21.

It has herein been stated that when a character key is pressed its first action is to simultaneously set a vertical stop 30 to arrest the downward flight of the matrix plate and through the matrix plate carriage 216, a horizontal stop 154 to arrest the horizontal flight of the matrix plate and matrix plate carriage for the presentation of the selected character at the casting position. The next action resulting from the operation of the character key is the movement of the controlling slide 41 to disengage the detent dog 45 from the matrix plate elevator 195 for the descent of the matrix plate 42 until arrested by the vertical stop 30. The next action is the setting of the clutch through the movement of the clutch setting slide 255 for the revolution of the high speed shaft 8 which through the agency of the matrix plate carriage cam 228 rock shaft 226 and propelling arm 225 causes the horizontal flight of the matrix plate carriage 216 and matrix plate 42 to the horizontal stop 154, the high speed shaft 8 during its revolution causing the centering of the selected matrix character with the mold cavity 92 and the locking of the matrix plate against the mold which was adjusted for the type body size by the setting of the horizontal stop 154 and the operation of the wedge setting plate by the cam 160 and its operable connections. The pump of the working melting pot is then actuated to inject the type metal into the mold for the cast after which the matrix plate is stripped from the type by the receding movement of the matrix plate carriage, the matrix plate carriage then being returned to its normal position with the matrix plate which is elevated by the action of the matrix plate elevators. The mold cap 294 during these operations is raised to open the mold, the ejector 313 and movable mold side 274 are actuated to deliver the type into the assembling line, the ejector and movable mold side are returned to their normal position, and the mold cap closed against them and yieldingly held in its closed position.

*Working melting pot and melting pot actuating mechanism.*—For the production of the type bodies I have provided in my machine two melting pots one a large supply pot constantly running, and forcing molten metal to the smaller or working pot, both pots being supplied with suitable burners for heating and provision by which the overflow shall return from the working melting pot to the supply pot. In the structure of the working melting pot is a type metal reservoir 64 small in comparison to the quantity of type metal used during the operation of a type casting machine and connected with a supply pot 66 by an inlet duct 67 and an overflow 48. Surrounding the type metal reservoir 64 is a jacket 336 fastened at its base to the bed plate 69 and formed to direct the heat from the burner 99 around the reservoir 64 and the nozzle 68 of the piston well. The upper edge of the type metal reservoir is provided with outwardly projecting lugs 101 which rest in the recessed part 102 of the upper edge of the jacket 336 for the purpose of supporting the type metal reservoir within the jacket. The piston well 103 is horizontally disposed in the type metal reservoir below the normal level of the type metal and has an inlet 104 below the scum surface for a continuous supply to the piston well of molten type metal substantially free from metal dirt and oxids. See Figs. 1, 8, 44, 45, 46 and 47. A cross bar 106 is fixedly attached to the neck of the piston well and its ends removably and slidably rest in notches 107 in the upper edge of the type metal reservoir 64 and support the forward part of the piston well in position with relation to the reservoir. The nozzle 68 projects beyond the type metal reservoir 64 and when the parts are in their casting position extends slightly beyond the outer surface of the jacket. The mouth 109 of the nozzle is concaved and forms with the foot plate when the working melting pot is locked in the casting position, a metal tight joint around the inlet 71 to prevent splashing or leakage of the type metal during the cast. The nozzle does not enter the inlet 71 in the foot plate, but surrounds the inlet thus eliminating "binding or hanging" when retracting after the cast and rendering the action of the working melting pot practical for a high speed operating machine.

During the operation of the machine the piston well is moved forward in the type metal reservoir until the mouth of the nozzle is locked against the adjacent face of the foot plate, and forms with it a metal tight joint. The piston ejector 110 is then moved forward in the piston well to eject the type metal for the cast, the type metal flowing through the mouth of the nozzle, and the positioned inlet 71 of the foot plate into the mold cavity 92 and when the cast is made the nozzle is retracted from the foot plate. In order to effect the reciprocating action of the piston well I provide the working melting pot with a rock shaft 111 having a crank arm 112 to which is connected one end of a link 113, the other end of the link being connected to a lever 114 fulcrumed to a bracket 237 forming part of the bed 69 and actuated by a cam 115 on the high speed shaft 8. I also provide the rock shaft 111 with a crank arm 116 having its free end connected by a link 117 with the body of the piston well 103. During the rotation of the high speed shaft 8 the cam 115 revolves and actuating the lever 114 and link 113, moves the crank arm 112 to turn the rock shaft 111, this movement of the rock shaft 111 turning the crank arm 116 toward the working melting pot, and by means of the link 117 pushes the piston well 103 toward the type body mold until the nozzle is tightly locked against the foot plate 72. See Figs. 1, 8, 44, 45, 46 and 47.

Loosely mounted on the rock shaft 111 is a sleeve 118 provided with a crank arm 119 connected by a link 120 with the lower end of a lever 121, the upper end of the lever being engaged and actuated by a cam 122, on the high speed shaft 8. The sleeve 118 is also provided with a crank arm 123 connected by a link 124 with the lug 125 of the piston ejector 110. When the mouth of the nozzle is locked against the foot plate, the cam 122 actuates the lever 121 to rock the sleeve 118 and move the crank arm 123 and link 124 toward the type body mold. This motion of the crank arm and link pushes the piston ejector 110 in the direction of the nozzle and forces the molten metal through the nozzle and inlet 71 of the foot plate into the mold cavity. Coiled on the link 120 is a spring 126 effecting the return of the parts to their normal position when the lever 121 is relieved of the influence of the cam 122. This spring 126 bears against a lug 127 forming part of the main frame 69 and against a collar 128 on the link 120 forcing the link in the direction of the high speed shaft 8. This movement of the link 120 rocks the sleeve 118 in the opposite direction to its movement under the influence of the cam 122 and reverses the movement of the crank arm 123 and link 124 retracting the piston ejector 110 until the shoulder 129 comes into engagement with the lug 130 and by its continued movement restores the piston well to its initial position.

It is through the agency of the parts enumerated that the nozzle of the piston well is locked in its casting position against the foot plate, and the type metal is ejected from the piston well into the mold.

A working melting pot constructed in this way is practical for a high speed operating machine in which it is necessary to positively deliver a sufficient quantity of metal into the mold at each operation to cast the type body. As it is only necessary to provide sufficient metal for the largest type body size, I have arranged the piston well to contain only that quantity of metal, and by placing the piston ejector horizontally in the piston well and delivering the type metal horizontally from it into the mold I am able to reduce to a minimum the quantity of metal displaced by the piston ejector which is so inconsiderable as not to require any great exertion of power or strain of the parts. By removably suspending the piston well and ejector within the type metal reservoir, it is possible to quickly and easily remove, separate, clean, repair, reassemble, and replace them.

*Space bars and space magazine.*—The space bars 399 are contained in a space magazine 400 adjoining the mold structure 275 and are inserted into the line of assembling type bodies by the operation of the space key 2. When the space key 2 is pressed, it rocks the key lever 402, depressing the link 251 and rocking the shaft 403 to lift the space elevator 404 and project the foremost space bar 399 into the assembling line. The space magazine 400 is provided with a cover 405 having an opening 406 adjacent to the line assembling box 235 through which the space bars are inserted into the assembling line of type bodies. In the sides of the space magazine 400 are horizontal grooves 407 in which are contained the slides 408 for the supporting head 409 pressed against the space bars 399 by a spring 410. Connected to the inner faces of the space magazine sides are spring detent pawls 412 which engage with the foremost space bar 399 and prevent it moving out into the line assembling box 235 until the space bar has been inserted into the line of assembling type bodies by the operation of the space key 2. The space bars 399 are formed between their ends with notches 413 which come into line with the detent pawls so that the space bars when lifted into the assembling line can pass the pawls as they move into the line assembling box 235. At the top of the inner faces of the line assembling box sides are horizontal grooves 414, extending lengthwise of the line assembling box, and contained in the grooves are cylindrical yielding rails 415, 416, which engage with the notched edges 421 of the space bars 399. The grooves 414 are of substantially cylindrical shape each having an opening less than the diameter of the yielding rails so that only a small segment of each rail will project through its respective opening into the line assembling box. The yielding rails are free to turn in the grooves 414 and are pressed by springs 417 to project slightly through the openings of the grooves and yieldingly engage with those space bars 399 which have been inserted into the assembling line. By allowing the rails 415, 416, to revolve in the grooves 414 the wear caused by the action of the space bars will be distributed to the whole of the peripheral surface of the rails. The yielding rail 416 terminates at the junction of the line assembling box with the space magazine and the other rail 415 extends into the space magazine a distance slightly exceeding the width of one space bar. This construction permits of a space bar being inserted in the assembling line and engaged by the rail 415 without disturbing the rail 416 or releasing the space bars which have already been introduced between the type bodies. Each space bar 399 has a lengthwise slot 423 to accommodate a rail 424, held at either end of the space magazine 400, which by preventing the turning of the space bars at any period of their use, keeps them always operative in the chamber provided for them.

The space bar 399 is of a substantially prismatic shape having one face 419 vertical, and the opposite face 420 inclined to converge with the face 419 at the top of the space bar, the inclination of the face 419 corresponding to the inclination of the groove 88 in the type body 166. See Figs. 51, 50 and 53. The object of this construction is to enable the space bars to move vertically between, and engage the full depth of the side faces of the type bodies in the assembling line. Near the top of each side of the space bar 399 is a notch 421 by which it is movably suspended from the yielding rails 415, 416, and at the bottom of each space bar is a hooked foot 489, with a lug 490 engaging with the justifier head 487, when actuated to advance the space bars between the types and withdraw them from the line. The type bodies assemble on the top of the line assembling box sides, and the space bars 399 when inserted, are supported in their proper position in the assembling line by the yielding rails 415, 416 as the line advances, the assembling of the type bodies continuing until the line is approximately filled.

*Type and delivery.*—The ejector 313 is slidably attached to the bottom mold side 274 by the dovetail groove 314 lengthwise of its bottom surface and the dovetail core 276 lengthwise of the top surface of the bottom mold side 274. This construction permits of the united movement of the ejector and bottom mold side between the mold and the place of type assemblage and a limited independent movement of the ejector when the movement of the bottom mold side has been arrested. When the parts of the mold unlock the ejector 313 and the bottom mold side together with the last type cast, are moved by the ejector lever 318, out of the mold, along the V-shaped guide rails 504 which for convenience are arranged along the top of the space magazine and under an overhanging part 801 termed "assembling pawl holder," to deliver the type on to the rails 506. To the assembling pawl holder 801 is pivoted a guide 803 which, engaging the longitudinal rib 502 on the top of the ejector 313, raised to or above the level of the type, prevents the bottom mold side 274 leaving the guide rails 504 in its rapid flight to and from the mold, and insures the safe carriage of the type into the assembling line where it is detained by two spring tensioned type assembling pawls 804.

As the action of the pawls is peculiar to my machine, I will describe them in detail. Conveniently placed on the top of the ejector 313 is a cross rib 503 raised to the same level as the longitudinal rib 502; and which, as the ejector 313 passes under the assembling pawl holder 801, comes into contact with beveled lugs 805 on the under side of the spring tensioned type assembling pawls 804. As the ejector 313 passes under the type assembling pawls 804 the cross rib 503 engaging with the lugs 805 raises the type assembling pawls, and when it has cleared the lugs 805 the pawls 804 descend and their type engaging ends strike the type from the ejector 313, and retain it on the rails 506, where it is frictionally held by the false rails 508. See Fig. 38. The rails 506 are formed by continuing the sides of the space magazine 400 across a desired field sufficient for the length of line, see Fig. 38, and the false rails 508, are yieldingly contained in the lower edges of the upper rails 507 and being spring pressed frictionally hold the types against the rails 506 as the types are assembled, this yielding movement of the false rails providing for variations of two, or possibly three heights of type bodies without adjusting the upper rails 507 which form part of the hinged member 800 of the amalgamating section. See Fig. 38.

I have now described the assemblage of the types on type assembling rails 506 and the introduction of the space bars between them, the assemblage of the types and space bars being continued until the length of line, for which the machine is set, is completed or as nearly so as practice will allow. The succeeding operations of justifying the types to the exact width of line, previously determined upon, locking them in their justified condition within a line carriage and withdrawing the space bars from the justified line of types, returning the space bars to their magazine and tripping the low speed cam shaft for moving the types from the type assembling chamber to the amalgamating mechanism is then effected as follows:

*Width of line.*—Mounted under the keyboard and within bearings on the bed plate is a rock shaft 702 on the right end of which is rigidly fastened the starting handle 701. Also attached to the rock shaft 702 are the intermediate links and levers 703, actuating the sliding head 704 and 705 vertically movable in a slideway 724 within a bracket 602 rigidly attached to the under side of the bed plate 446. The sliding heads 704, 705, are separated in a normal position but, when acted upon by the operation of the starting handle 701, the lower head 704 moves upward until it meets the upper head 705, and both heads are then carried upward to the limit of motion given the starting handle 701. Attached to the lower head 704 is an upright bar 706 which protrudes through the bed plate 446 and is separably connected to an upright bar 707, slidably attached to the hinged member 800. To the bar 707 is attached an angular plate 708 having an oblique slot 712 cut therein and movable in the slot 712 is a roller 713 for moving a horizontal slide 709 having reciprocating motion within the hinged member 800. The slide 709 in turn transmits motion to two vertical jaws 710 mounted to slide within the channels 870 provided within the hinged member 800. These jaws are normally clear of the type during the type assemblage on the type assembling rails 506, and are set apart to the exact length of the determined line. The first results attained from the motion imparted by the starting handle 701 through the sliding head 704 and upright bars 706, 707, is to push the jaws 710 downward and into position at either end of the assembled line of types and space bars to determine the length of the justified line. With the setting of the jaws 710 the roller 713 attached to the horizontal slide 709 passes into the vertical slot 714 forming a continuation of the oblique slot 712 to permit of a continued motion of the bars 706—707 without further influencing the jaws 710, while the subsequent action of justifying the line is taking place. The action of these parts may be summarized as follows: The downward motion of the starting handle 701 results in the upward motion of the sliding head 704, upright bars 706, 707, angular plate 708, the horizontal movement of the slide 709, and the downward movement of the jaws 710 into position at the ends of the assembled line of types and space bars to engage the ends of the line while the space bars are being advanced by the justifying shoe 487 hereinafter described under the caption "Justification" the setting of the jaws 710 occurring before the sliding head 705 is pushed upward by the sliding head 704. When the sliding head 704 has moved upward sufficiently to effect the setting of the jaws 710 and to lift the line steadying apparatus above the line of types and spacers, it engages and pushes upward, the sliding head 705, a spring pressed latch 711 carried by the sliding head 705, then entering a notched finger 727 carried by the sliding head 704 for the return of the sliding head 705, and the parts connected thereto, with the sliding head 704 when the motion of starting handle 701 is reversed.

*Line steadying apparatus.*—Rigidly attached to the upright bar 707 is a bracket 853 pivotally holding the line steadying apparatus. This line steadying apparatus consists of two levers 851, 852, and a line steadying member 854 hinged to the lower ends of the levers 851 852 to advance with the assembling line of types. To one of the levers 851 cheek pieces 855 are attached to frictionally press against the sides of the channel 850, within the hinged member 800, as the line steadying member 854 is advanced by the assemblage of the types. When the composition of the line is completed, the starting handle 701 is operated and through the sliding head 704 and upright bars 706, 707 lifts the line steadying member 854 above the line of types and space bars, and by reason of the pin 856 of the lever 851 passing behind a bracket 857 attached to the hinged member 800, the line steadying apparatus is held back until the full motion of the starting handle 701 is completed, when the pin 856 will pass over the top of the bracket 857 and the line steadying apparatus will be thrown by the spring 858 to the opposite end of the line. When the motion of the starting handle 701 is reversed the sliding head 704 by means of the engagement of the latch 711 with the notched finger 727 lowers the sliding head 705 to its normal position and remains locked to the sliding head 705 until the latch 711 is withdrawn from the notched finger 727. The withdrawal of the latch from the notched finger 727 occurs when the space bars 399 have been returned to the space magazine 400 by the space return lever 651 moving under the influence of the spring tensioned rock shaft 653. Connected to the spring tensioned rock shaft 653 is a spring pressed pawl 728 which as the rock shaft rotates to move the space return lever 651 to sweep the space bars 399 into the space magazine 400 enters between the finger 727 and a shoulder 731 of the latch 711 (see Fig. 55), and on the return motion of the rock shaft 653 engages the shoulder 731 and withdraws the latch 711 from the notched fingers 727 to permit of the return of the sliding head 704, connections 703, and starting handle 701 to their normal position under the influence of the spring 729. See Fig. 2. With the reverse motion of the starting handle 701 the sliding head 704 lowers the upright bars 706, 707 and line steadying apparatus until the line steadying member 854 is slightly above the line of type. These parts being temporarily retained in this position, until the latch 711 is disengaged from the notched finger 727, so that the line of type can be carried away from the place of type assemblage as hereinafter described under the caption "Line carriage". When the line carriage moves away with the line of type, the latch 711 is disengaged from the notched finger 727 and the sliding head 704 then returns to its normal position lowering the line steadying member 854 into position for the next line of types. When the upright bar 706 ascends a tripping pawl 725 is moved into position to withdraw a bolt 726 movable within the rigid bracket 602 and release the spring tensioned space return lever 651 from its set position. See Figs. 58, 59, 60 and 61.

The space return lever 651 is fixed on the shaft 653, tensioned by a spring 652, and when the space return lever 651 is released the shaft 653 rocks under the influence of the spring 652 and moves the space return lever to sweep the space bars 399 into the space magazine 400. When the space return lever 651 has swept the space bars into the space magazine 400 the crank arm 682 at the end of the rock shaft 653 trips the clutch mechanism, fully described under the caption "Clutch mechanism of low speed shaft," for the revolution of the low speed shaft 925 the first resultant action from which is the carriage of the line of type from the place of type assemblage to the amalgamating mechanism. To prevent a subsequent action of the starting handle until the low speed shaft shall have completed its revolution, I have provided two lock offs for the starting handle 701, its operable connections 703 and sliding heads 704, 705. One of these lock offs consists of a shoulder 960, on the latch 711, engaging with the arm 961 fixed on the spring tensioned rock shaft 653 to prevent the upward movement of the sliding head 705 until the clutch for the low speed shaft, shall have been tripped and the low speed shaft 925 shall have been set in motion as described under the caption "Clutch mechanism of low speed shaft". The other of these lock offs consists in forming in the cam 929 a recess 959 to receive a spring tensioned lock off dog 962 actuated by the operable connections 703 when the starting handle 701 is moved downward, this recess 959 being in line with the lock off dog when the low speed shaft is in its normal position. When the low speed shaft is in its normal position the lock off dog 962 will enter the recess 959 and permit of the downward movement of the starting handle 701. When the starting handle 701 has been moved upward to nearly its normal position the low speed shaft starts its revolution and rotates the cam 929, the recess 959 then moving out of line with the spring tensioned lock off dog 962, and a depression 963 in the cam coming into position to enable the cam to clear the lock off dog 962 while the latch 911 is being disengaged from the notched finger 727 for the return of the starting handle and its connected parts to their normal position. The raised surface of the cam 929 then engages the lock off dog 962 and prevents its movement and that of the starting handle 701 until the low speed shaft shall have completed its revolution and brought the recess 959 again into line with the lock off dog. The cam 929 during its revolution engages the crank arm 682 and restores the space return lever 653 and space return plate 654 to their normal positions.

*Justification.*—When the lower head 704 moves upward and meets the upper head 705 the two heads are temporarily locked together by the spring pressed latch 711. Attached to the upper head 705 are hollow guide rods 715 in which are contained the spring pressed guide rods 716 of the justifying shoe 487. The justifying shoe 487 when moved upward, engages the hooked feet 489 of the space bars 399 and drives them upward between the types and by reason of the tapered sides of the space bars spreads the types apart to the limits of the line determined by the jaws 710. Should the types fully fill the space provided between the jaws 710 before the limit of motion provided for the starting handle 701 is reached, the springs 718 under the guide rods 716 of the justifying shoe 487 will yield and permit the parts attached to the starting handle 701 to travel to the full limit of action without effecting the further movement of the justifying shoe 487. It is therefore immaterial whether the types are spread a greater or less distance apart by the space bars 399 as the action of the starting handle and the movement of its connected parts provides that a full motion of the starting handle 701 shall be made in order that the succeeding actions shall be effective.

So necessary is it that an exact movement of the parts stated shall take place in proper order and time, that I have provided a locking device to control the action of the parts until the limit of motion has been attained. This locking device consists of a locking pawl 719 engaging with the toothed face of a rack 730 forming part of an upright bar 720 attached to the sliding head 705 and preventing the reverse movement of the heads 704 and 705 until the pawl releasing shoulder 721 of the upright bar 720 shall have engaged the pawl 719 and positioned it to be engaged by the spring pressed detent 722 which retains it out of engagement with the rack 730 for the return of the heads 704 and 705. The downward motion of the starting handle 701 effects the following actions, viz: it sets the jaws 710 at either end of the line and simultaneously therewith, lifts the line steadying apparatus until the line steadying member 854 is above the line of type and space bars, pushes the space bars 399 between the types and spreads the line to the limits provided by the jaws 710, and finally, the upright bar 720 attached to the head 705 reaches the limit of its movement displacing the locking pawl 719 to be engaged and held by the detent 722, and simultaneously projects upward a plate 723 tripping the pawls 906 within the line carriage 900 and releasing the line carriage jaws 905 which in turn grip the justified types, now more fully set out under the caption of "Line carriage." The starting handle having reached the limit of its downward motion is then reversed and with the return of the parts actuated thereby the space bars 399 are drawn downward by the justifying shoe 487 below the line of type until the justifying shoe 487 shall register with the bottom of the space magazine and automatically release the space bars. Then the tripping pawl 725 pivotally attached to the upright bar 706 withdraws the bolt 726 movable within the rigid bracket 602 and releases the spring tensioned space return lever 651 from its set position to move with the rock shaft 653 and return the space bars 399 to the magazine 400. Within the raceway 806 provided for the movement of space bars is slidably mounted a space return plate 654 having a pin 655 passing out and engaging in a slot 656 in the space return lever 651. When the lever 651 is released and turns with the spring tensioned rock shaft 653 it moves the space return plate 654 to sweep the space bars which have been withdrawn into the space raceway, ahead of it, and past the space retaining pawls 412, into the space magazine 400. When the last space bar has been swept into the space magazine the crank arm 682 trips the clutch mechanism of the low speed shaft hereinafter described.

*Line carriage.*—The line carriage comprises two line carriage plates 907 arranged to reciprocate in grooves 895 provided within the line assembly box 235, hinged member 800 housings 876, 877, and amalgamating section 875. These line carriage plates are provided with extensions 909 slidable in carriage guides 910 which insure an uniform motion of the carriage. The free ends of the extensions 909 are fastened together by studs 911 and are connected by a link 903 to the free end of the lever 904, the lever being fulcrumed to the bed plate 446 and actuated by a cam 926 on the low speed shaft 925. The line carriage plates 907 are provided with stationary jaws 921 and movable jaws 905, the movable jaws being retained in an open position by locking pawls 906 and tensioned by springs 920 to close toward the stationary jaws 921 when released by the tripping of the locking pawls 906. As the sliding head 705 moves upward to the limit of motion provided by the starting handle 701, the upright bar 720, having a slot 720$^a$ and stud 723$^a$ connection with the tripping plate 723, engages the tripping plate 723 and through it moves the locking pawls 906 to release the line carriage jaws 905 the movement of the tripping plate being guided by pins 723$^b$ movable in grooves 907$^a$ in the inner faces of the line carriage plates 907, and the downward movement of the tripping plate 723 being arrested when the guiding pins 723$^b$ reach the bottom of the grooves 907$^a$. The movable jaws 905 when released move upward and lift the types clear of the lower rails 506 and lock the types tightly against the stationary jaws 921, retaining the types in that position until they have received the type metal locking strip which amalgamates the justified types into a composite line. See Figs. 83, 85 and 86. As the crank arm 682 of the rock shaft 653 trips the mechanism which starts the low speed shaft 925 the line carriage with the line of type locked therein moves to a position over the strip mold 878 where a type metal locking strip previously prepared, is impressed into the grooves 304 of the types by a hammer 879 consisting of a moving section of the mold, and while the metal strip is being impressed into the grooves, an anvil 811 within the hinged member 800 is actuated by a compound lever 891, having operable connections 892 consisting of an arm, link and lever with a cam 958 on the low speed shaft 925, to sustain the thrust of the hammer 879. In that position and with the type pressed tightly against the anvil 811 and securely held there by the strip forcing hammer 879 and knives 970 forming part of the anvil, the movable jaws 905 of the line carriage are unlocked by a forked lever 896 fixed on a rock shaft 968 mounted within bearings on the bed plate 446, this lever operating to unlock the jaws 905 when the rock shaft 968 turns under the influence of the cam 926 and lever 957, the line carriage then being moved back by the reverse movement of the lever 904 to the type assembling box 235 prepared for receiving the succeeding line of type, the strip forcing hammer holding the line of type against the anvil until the line carriage has passed away.

*Strip making mechanism.*—Pivoted within the housings 876 and 877 is the strip mold 878 arranged and provided with means consisting of a pinion 893 mounted on the strip mold 878 and a rack 894 pivotally connected to a lever 971 actuated by a cam 972 on the low speed shaft 925 for effecting a quarter turn, from an upright to a horizontal position. In its horizontal position, the mold 878 fronts on the mouth 916 of a strip melting pot 915 arranged to deliver the molten metal through a perforated stripper plate 917 into the mold 878. Before the separation of the pot mouth 916 and stripper plate 917 from the strip mold 878 the stripper plate 917 is given a slight movement lengthwise of the mold, for shearing off the gates which may have been formed on the metal strip just cast, this movement of the stripper plate being effected by a lever 973 fixed on the shaft 968 actuated by the cam 926 on the low speed shaft 925. The mold 878 with the strip 304ª then assumes an upright position in the path of the line carriage 900 but below the line of type which during its movements, straddles the mold 878. Within and forming a part of the mold 878 is a moving section 879 termed strip forcing hammer having in the upright position of the mold a connection, through a pivoted lever 880, to a cam 927 on the low speed shaft 925. When the line of type is in position over the strip mold 878, action is imparted by the low speed shaft 925, cam 927 and lever 880 to the hammer 879 which forces the strip 304ª upward and out of the mold and into the grooves 304 of the type and spreading the strip 304ª locks the line of types together and tightly against the anvil 811 until after the line carriage has been unlocked and passes back to the assembly box 235. The line of type is then released by the return of the strip forcing hammer 879 and a line ejector 881 pushes the locked line of type from between the mold and the anvil across a bridge 908 attached to one of the extensions 909 of the line carriage and into and upon a compressor table 882, the outward movement of the type being arrested by the front plate 886 of the amalgamator against which the face of the type is alined by the pressure of the ejector 881. The line ejector 881 moves horizontally in slideways 974 in the housings 876, 877 to push the line of type on the compressor table 882 and is provided with two pivoted links 975 connected to a shaft 976 passing through the end of an arm 977 fixed to the rock shaft 978 having bearings in the housing 876, 877 above the line ejector. One end of the rock shaft 978 is provided with a crank arm 981 connected by a link 982 to a lever 983 actuated by a cam 984 on the low speed shaft 925, the cam being timed to actuate the line ejector when the line carriage shall have been returned to the line assembling box 235.

*Amalgamator.*—The line which has just been deposited upon the compressor table 882, while it has received the amalgamating strip 304ª for binding the types has not been fully compressed but in the actions now succeeding, this is effected. The compressor table 882 is slidably arranged for upward movement between the housing 876, 877, and is connected through a toggle 899 and lever 883 to a cam 934 on the low speed shaft 925. Opposite and above the compressor table 882 is what I have termed an amalgamator 885. This amalgamator 885 is pivoted and timed to move in unison with the strip making mold 878 and has a movement equivalent to a quarter turn of a circle. The amalgamator 885 is fixed on a rock shaft 986 provided with a pinion 985 meshing with a rack 987 pivotally connected to the lever 971 which is actuated by the cam 972 on the low speed shaft 925. As the cam 972 revolves it actuates the lever 971 to move the rack 894 and turn the strip mold 878 to a horizontal position and present it to the mouth of the strip melting pot and to simultaneously move the rack 987 and turn the amalgamator 885 to a horizontal position for the delivery of the composite line to the galley and to afterward restore the strip mold and amalgamator to their vertical positions. In its vertical position the mouth of the amalgamator is opposite and over the compressor table 882 and the recently deposited line of type, and it is in this position that the amalgamator effects the final alinement and compression of the types to the exact height and thickness of line. Against the front plate 886 of the amalgamator the types are pressed by the rear plate 887 which is hinged at 898 and moves inward against the feet of the type as the wedge 889 bearing against a roller 889ª forces its upper end outward when the line is being pressed up into the amalgamator 885 by the compressor table 882, the wedge 889 forming part of a compressing plate 888. The compressing plate 888 gives way under the upward movement of the line of type and compressor table 882 until the exact height of the line of type has been attained when the compressing plate 888 bottoms and the compressor table 882 then squeezes the amalgamating strip 304ª smoothly and evenly to the surface of the types themselves, disposing of any surplus metal in the cavities formed by the withdrawal of the space bars 399. The compressor table 882 is then withdrawn from the amalgamator 885 by the reverse action of the toggle 899, and the line being gripped between the front plate 886 and rear plate 887, remains held by them while the amalgamator 885 makes a quarter turn, by means of the pinion 985 and rack 987, and positions itself in front of a receiving galley 873 the amalgamator then being in a substantially horizontal position and the connecting bar 990 for the links 872, in contact with the compound lever 891. The composite line of type is then ejected to the galley 873 by the compound lever 891 pushing the links 872 and the compressing plate 888 outward, the compound lever 891 being actuated by the cam 958 for that purpose, the outward movement of the compressing plate 888 in turn releasing the rear plate 887 which has locked the line of types against the front plate 886. The amalgamator 885 then makes a quarter turn and resumes its vertical position.

When the amalgamator is resuming its vertical position two arched lifters 988 connected to a cross bar 989 fixed to the top of the housings 876, 877, engages beneath the connecting member 990 attached to the top of the links 872 of the compressing plate 888, and raise the links 872 to restore the compressing plate to its normal position within the amalgamator 885. This is necessary owing to the position assumed by the compressing plate under the influence of the compound lever 891 while the amalgamator was in its horizontal position for the delivery of the line of type to the galley 873. To prevent the amalgamator moving from its vertical position during the delivery of the line of type by the line ejector to the compressor table 882 and the alinement of the face of the type against the front plate 886 I have provided a thrust member 998 fixed to and movable with the compressor table 882. This thrust member 998 when the compressor table is in its normal position overlaps the lower edge of the front plate 886, and resists its outward movement. This thrust member has a rigid connection with the compressor table 882 and as the compressor table has only a vertical sliding movement in a fixed path cannot move laterally. The compressor table 882, when descending to relieve its pressure on the line of type, moves below its normal position and disengages the thrust member from the front plate 886 of the amalgamator, which then turns from a vertical to a horizontal position to deliver the composite line to the galley 873. When the amalgamator has been again returned from its horizontal to its vertical position the compressor table 882 rises to its normal position to bring the thrust member again into position to overlap to the lower edge of front plate 886.

*Hinged member.*—The hinged member 800 contains the anvil 811, the vertical jaws 710, line steadying apparatus, and the assembling pawl holder, which, when the hinged member is in its closed position, have operative relation with line of types. When the hinged member is in its open position as shown by dotted lines in Fig. 56, access may be had to the types and space bars in the course of assembly, to the assembled line of types and to the strip mold. In its closed position the hinged member 800 is locked by a sliding bolt 966 in the housing 876, the sliding bolt being provided with a lever 967 by which it is moved between its locking and unlocking positions.

*Galley.*—The galley 873 is mounted to reciprocate on stationary standards 969, and has a lug 984 provided with rollers 285 engaging in the forked end of the lever 289 actuated by the cam 290 on the low speed shaft 925, the galley reciprocating toward the amalgamator when the line of type is being delivered to the galley and reciprocating away from the amalgamator when the line of type has been delivered.

*Clutch mechanism of low speed shaft.*—In my description of the justification I have stated how the opposite end of the space return lever 651 trips the clutch mechanism that starts the low speed shaft 925. Mounted upon the low speed shaft 925 and moving with it is the starting cam 929 and parallel with the shaft 925 is a spring pressed pin 665 held normally to project from the side of the cam 929 and retain a beveled finger 657 attached to a spring tensioned shaft 658. The spring tensioned shaft 658 is mounted upon the bed plate 446 and is set at right angles to the low speed shaft 925 and passes under the same. The pin 665 is held against the tension of the shaft 658 and beveled finger 657 by a locking pawl 659, capable of oscillating movement upon a pin 947 in the slot 680 formed in the cam 929. A locking plate 681 having a finger 660 is hinged to and overhangs the cam 929, in such a manner that, when the upper end of the space return lever 651 has completed the work of delivering the space bars 399 to the space magazine 400 the crank arm 682 at the end of the rock shaft 653 shall strike the finger 660 and, moving the plate 681 slightly, will withdraw the spring-pressed pin 684 from the path of the locking pawl 659 and allow the locking pawl 659 under the influence of the spring 683 to move out of the path of the pin 665. For the operation of the pin 684, the plate 681 is slotted as shown at 681$^a$, and through this slot, the pin 684 projects, being provided on the outer side of the plate with a head 684$^a$, with which the plate engages as it moves under the influence of the crank arm 682. The return of the pin 684 to its normal position is effected by the spring 684$^b$, which yieldingly holds it there until again displaced by the action of the rock shaft. The pressure of the finger 657 and spring tensioned shaft 658 then causes the pin 665 to recede within the cam 929 and allows the shaft 658 to rock under the influence of its spring 658$^a$. The movement thus given to the shaft 658 is in turn, imparted to a detent finger 667 fixed on the shaft 658 and connected to a detent bar 662 slidably mounted within the front apron of the bed plate 446 to one end of which is attached a pivoted yoke 663 arranged with points 670 to throw a toothed ring 664, slidably mounted on the low speed shaft 925, into and out of mesh with relation to a constantly running toothed ring 675 connected through suitable reducing gearing 676 to a driving motor 163. It follows that the movement of the detent bar 662 to which the yoke 663 is attached will connect or disconnect, through the meshing of the toothed rings, the clutch driving the low speed shaft 925. Thus at any point in the cycle of movement of this low speed shaft the clutch may be disconnected at will by manually moving the detent bar 662 and bring the driving mechanism entirely under the control of the operator. During the revolution of the low speed shaft 925 the pawl 659 resumes, under the influence of the roller 685, its position covering the end of the pin 665, and when the low speed shaft has completed its revolution, causes the pin 665 to interfere with the beveled finger 657 and automatically disconnect through the agency of its related parts the toothed rings and throws the low speed shaft out of action until the spring pressed pin 665 shall have again been released.

I have herein described operative means for the assemblage of the types and spacers, the justification, the locking of the justified types, their delivery to an amalgamator mechanism in which a lead locking strip is impressed into the justified types and the product has been delivered to a galley and the stop and start mechanism through which these several actions are effected, but I wish it to be understood that these means may be varied within the scope of the appended claims without departing from the principle of the invention.

Having thus fully described my invention and in what manner the same is to be performed, I declare that what I claim as new and desire to secure by Letters Patent, is:

1. In a typographic machine, a keyboard, means actuated thereby for casting and assembling a line of types, spacers, means for introducing the spacers between the assembling types, a movable element for advancing the spacers between the types and then withdrawing them therefrom, a line carriage actuated by said movable element to seize the line of types when the spacers have been advanced to their limit of motion, means for moving the line carriage to a position where the types receive a locking strip and then returning the line carriage to the place of type assemblage, and means for combining the locking strip with the types to lock them together in their justified condition.

2. In a typographic machine, a keyboard, means actuated thereby for casting and assembling a line of types, spacers, means for introducing the spacers between the assembling types, a movable element for advancing the spacers between the types and then withdrawing them therefrom, a line carriage actuated by the movable element to seize the line of types when the spacers have been advanced to their limit of motion, means for moving the line carriage to a position where the types receive a locking strip and then returning the line carriage to the place of type assemblage, and means for casting the locking strip and combining it with the types to lock them together in their justified condition.

3. In a typographic machine, a keyboard, means actuated thereby for casting types and assembling them into a line, spacers, means for introducing the spacers between the assembling types, a movable element for advancing the spacers to justify the line of types and then withdrawing the spacers therefrom, a line carriage actuated by said movable element to seize the line of types when the spacers have been advanced to their limit of motion, means for actuating the line carriage to move the types to a place where they receive a locking strip, means for casting the locking strip and combining it with the types, and means for compressing the locking strip and types together.

4. In a typographic machine, a keyboard, means actuated thereby for casting and assembling a line of types, means for justifying the line, a line carriage actuated by the justifying means for seizing the types when justified and transferring them from the place of type assemblage to the place where they receive a locking strip, means for casting the locking strip and combining it with the types, and means for pressing the locking strip and types together to lock them in their justified condition.

5. In a typographic machine, a keyboard, means actuated thereby for casting and assembling a line of types, means for justifying the line of types, means for combining a locking strip with the types, a line carriage actuated by the justifying means to seize the types when justified, and means set in motion by the justifying means for actuating the line carriage to carry the justified types from the place of type assemblage to the place where they receive the locking strip.

6. In a typographic machine, a keyboard, means actuated thereby for casting and assembling a line of types, means for justifying the line, a line carriage inoperative during the assembly of the types and actuated by the justifying means to seize the types when justified, means for combining a locking strip with the justified types, operable means actuated by the justifying means for moving the line carriage with the justified types from the place of type assemblage to the place where they receive the locking strip.

7. In a typographic machine, a keyboard, means actuated thereby for casting and assembling a line of types, means for justifying the line, a line carriage inoperative during the assembly of the types, means for combining a locking strip with the justified types, means associated with the justifying means and actuated thereby causing the line carriage to seize the justified types, and means for moving the line carriage with the justified types from the place of type assemblage to the place where they receive the locking strip.

8. In a typographic machine, a keyboard, means actuated thereby for casting and assembling a line of types, means for justifying the types, means for casting a locking strip and combining it with the types to lock them in their justified condition, and means associated with the justifying means and actuated thereby to seize the justified types and carry them from the place of type assemblage to the place where they receive the locking strip.

9. In a typographic machine, a keyboard, means actuated thereby for casting and assembling a line of types, means for justifying the types, means for casting a locking strip and combining it with the types to lock them in their justified condition, means associated with the justifying means and actuated thereby to seize the justified types and carry them from the place of type assemblage to the place where they receive the locking strip, and means for compressing the locking strip and types together.

10. In a typographic machine, a keyboard, means actuated thereby for casting and assembling a line of types, means for justifying the types, means for casting a locking strip and combining it with the types to lock them in their justified condition, means associated with the justified means and actuated thereby to seize the justified types and carry them from the place of type assemblage to the place where they receive the locking strip, means for compressing the locking strip and types together into a locked line, and means to deliver the line from the compressing means.

11. In a typographic machine, a keyboard, means actuated thereby for casting and assembling a line of types, means for justifying the types, means for casting a locking strip and combining it with the justified types, a line carriage inoperative during the type assemblage, and means associated with the justifying means and actuated thereby causing the line carriage to seize the justified types and hold them in their justified condition while the locking strip is being combined with them.

12. In a typographic machine, a keyboard, means actuated thereby for casting and assembling a line of types with dovetail grooves interjacent their ends, means for justifying the types, means for casting a locking strip and introducing it into the type grooves, a line carriage inoperative during the type assemblage, means associated with the justifying means and actuated thereby causing the line carriage to seize the justified types and hold them in their justified condition while the locking strip is being introduced into the type grooves, and means for compressing the locking strip and types together.

13. In a typographic machine, a keyboard, means actuated thereby for casting and assembling a line of types with dovetail grooves interjacent their ends, means for justifying the types, means for casting a locking strip and introducing it into the type grooves, a line carriage inoperative during the type assemblage, means associated with the justifying means and actuated thereby causing the line carriage to seize the justified types and hold them in their justified condition while the locking strip is being introduced into the type grooves, means for moving the line carriage with the justified types from the place of type assemblage to the place where they receive the locking strip, and means for compressing the locking strip and types together.

14. In a typographic machine, a keyboard, means actuated thereby for casting and assembling a line of types with dovetail grooves interjacent their ends, means for justifying the types, means for casting a locking strip and introducing it into the type grooves, a line carriage inoperative during the type assemblage, means associated with the justifying means and actuated thereby causing the line carriage to seize the justified types and hold them in their justified condition while the locking strip is being introduced into the type grooves, means for moving the line carriage with the justified types from the place of type assemblage to the place where they receive the locking strip, means for compressing the locking strip and types together into a locked line, a galley, and ejecting means co-acting with the compressing means to deliver the line to the galley.

15. In a typographic machine, a keyboard, means for casting types and assembling them into a line operably connected with the keyboard, spacers, means to introduce the spacers between the assembling types, a justifying element for advancing the spacers to spread the line to its limits and withdrawing them therefrom, means for returning the spacers to a position of rest when withdrawn from the line, a starting handle actuating the justifying element, and a shaft set in motion by the spacer return means when it has returned the spacers to their position of rest, said shaft being provided with means to prevent the subsequent action of the starting handle until the shaft has completed its revolution and come to a normal position.

16. In a typographic machine, a keyboard, means for casting types and assembling them into a line operably connected with the keyboard, spacers, means to introduce the spacers between the assembling types, means to advance the spacers for the justification of the line and withdraw them therefrom, in combination with means for returning the spacers to a position of rest when withdrawn from the line, a locking strip mold for producing a locking strip and combining it with the justified line, means for compressing the justified line and locking strip together, a shaft from which the action of the locking strip mold and compressing means is taken, and a clutch for the shaft, set by the spacer return means when it has returned the spacers to a position of rest.

17. In a typographic machine, a keyboard, means for casting types and assembling them into a line operably connected with the keyboard, spacers, means to introduce the spacers between the assembling types, means to advance the spacers for the justification of the line and then withdraw them therefrom, in combination with means for returning the spacers to a position of rest when withdrawn from the line, a locking strip mold for producing a locking strip and combining it with the justified line, means for compressing the justified line and locking strip together, and a shaft from which the action of the locking strip mold and compressing means is taken, set in motion by the spacer return means when it has returned the spacers to a position of rest.

18. In a typographic machine, a keyboard, means for casting types and assembling them into a line operably connected with the keyboard, spacers, means to introduce the spacers between the assembling types, means to advance the spacers for the justification of the line and then withdraw them therefrom, in combination with means for returning the spacers to a position of rest when withdrawn from the line, means for producing a locking strip and combining it with the justified line, and means for compressing the justified line and locking strip together controlled by the spacer return means until it has returned the spacers to a position of rest.

19. In a typographic machine, a keyboard, means for casting types and assembling them into a line operably connected with the keyboard, spacers, means to introduce the spacers between the assembling types, means to advance the spacers for the justification of the line and then withdraw them therefrom, in combination with means for returning the spacers to a position of rest when withdrawn from the line, a locking strip mold for producing a locking strip and combining it with the justified line, and a line carriage to transfer the justified line from the place of type assemblage to the locking strip mold controlled by the action of the spacer return means.

20. In a typographic machine, a keyboard, means for casting types and assembling them into a line operably connected with the keyboard, spacers, means to introduce the spacers between the assembling types, means to advance the spacers for the justification of the line and then withdraw them therefrom, in combination with means for returning the spacers to a position of rest when withdrawn from the line, a locking strip mold for producing a locking strip and combining it with the justified line, and a shaft from which the action of the locking strip mold is taken, controlled by the spacer return means.

21. In a typographic machine, a keyboard, means for casting types and assembling them into a line operably connected with the keyboard, a spacer magazine, spacers, means to introduce the spacers between the assembling type, means to advance the spacers to justify the line, means for producing a locking strip and combining it with the justified line, means for actuating the locking strip producing means, and means for returning the spacers to the spacer magazine controlling the action of the locking strip producing means.

22. In a typographic machine, a keyboard, means for casting and assembling a line of types operably connected with the keyboard, a spacer magazine, spacers, means to introduce the spacers between the assembling types and advance them to justify the line and then withdraw them therefrom, means to return the spacers to the spacer magazine, and means to combine a locking strip with the justified line, actuated by the spacer return means when it has returned the spacers to the spacer magazine.

23. In a typographic machine, a keyboard, means for casting and assembling a line of types operably connected with the keyboard, means for justifying the line, and means for combining a locking strip with the justified line, automatically actuated by the justifying means when returned to a normal position.

24. In a typographic machine, a keyboard, means for casting and assembling a line of types operably connected with the keyboard, means for justifying the line, means for casting a locking strip and combining it with the justified line, means for compressing the justified line and locking strip together, and operable means for actuating the compressing means, automatically set in motion by the justifying means when returned to a normal position.

25. In a typographic machine, a keyboard, means for casting and assembling a line of types operably connected with the keyboard, means for justifying the line, and means for producing a locking strip and combining it with the justified line, automatically actuated by the justifying means when returned to a normal position.

26. In a typographic machine, a keyboard, means for casting and assembling a line of types operably connected with the keyboard, spacers, means to introduce the spacers between the assembling types, a justifying element for advancing the spacers to spread the line to its limits and withdrawing them therefrom, actuating means for the justifying element, and mechanically controlled means for returning the spacers to a position of rest, automatically actuated by the justifying element when returned to a normal position.

27. In a typographic machine, a keyboard, means for casting and assembling a line of types operably connected with the keyboard, spacers, means to introduce the spacers between the assembling types, a justifying element for advancing the spacers to spread the line to its limits and withdrawing them therefrom, means for returning the spacers to a position of rest when withdrawn from the line, and a locking control for the justifying element until it has effected the justification of the line.

28. In a typographic machine, a keyboard, means for casting and assembling a line of types, operably connected with the keyboard, means for justifying the line, a starting handle connected with the justifying means, and means controlling the action of the justifying means and starting handle until the justifying means has completed the justification of the line.

29. In a typographic machine, a keyboard, means for casting and assembling a line of types operably connected with the keyboard, spacers, means to introduce the spacers between the assembling types, means to advance the spacers for the justification of the line and then withdraw them therefrom, in combination with means for returning the spacers to a position of rest when withdrawn from the line, a locking strip mold for producing a locking strip, means for compressing together the locking strip and the justified line, a shaft from which the action of the locking strip mold and compressing means is taken, and a clutch for the shaft set by the spacer returning means when it has returned the spacers to a position of rest.

30. In a typographic machine, a keyboard, means for casting and assembling a line of types operably connected with the keyboard, spacers, means to introduce the spacers between the assembling types, a justifying element for advancing the spacers to spread the line to its limits and withdrawing them therefrom, means for returning the spacers to a position of rest, means for casting a locking strip and combining it with the assembled types, and means for compressing the locking strip and the justified line together, set in motion by the spacer return means when it has restored the spacers to the spacer magazine.

31. In a typographic machine, a keyboard, means for casting types and assembling them into a line operably connected with the keyboard, spacers, means to introduce the spacers between the assembling types, a justifying element for advancing the spacers to spread the line to its limits and withdrawing them therefrom, and a locking control for the justifying element until its limit of motion has been attained.

32. In a typographic machine, a keyboard, means for casting and assembling a line of types operably connected with the keyboard, spacers, means to introduce the spacers between the assembling types, a justifying element for advancing the spacers to spread the line to its limits and withdrawing them therefrom, and a locking control for the justifying element until its limit of motion has been attained.

33. In a typographic machine, a keyboard, means for casting and assembling a line of types operably connected with the keyboard, spacers, means to introduce the spacers between the assembling types, a justifying element for advancing the spacers to spread the line to its limits and withdrawing them therefrom, means for returning the spacers to a position of rest when withdrawn from the line, means for casting a locking strip and combining it with the assembled types, and means for compressing the justified line and locking strip together, controlled by the action of the spacer return means.

34. In a typographic machine, a keyboard, means for casting and assembling a line of types operably connected with the keyboard, means for justifying the line, means for actuating the justifying means, means for locking the types in their justified condition, and means associated with the justifying means to prevent the return of the justifying means to a normal position, until the line has been justified.

35. In a typographic machine, a keyboard, means for casting types and assembling them into a line in the order of their production operably connected with the keyboard, means for justifying the line, means for locking the line in its justified condition, and means associated with the justifying means for preventing the return of the justifying means to a normal position until the justification of the line is effected.

36. In a typographic machine, a keyboard, means for casting types and assembling them into a line operably connected with the keyboard, means for justifying the line, and means associated with the justifying means for preventing the return of the justifying means to a normal position until the justification of the line is completed.

37. In a typographic machine, a keyboard, means for casting types and assembling them into a line operably connected with the keyboard, means for justifying the line, means for locking the line in its justified condition, and means associated with the justifying means for preventing the return of the justifying means to a normal position until the justification of the line is completed, and the line is locked in its justified condition.

38. In a typographic machine, a keyboard, means for casting and assembling a line of types operably connected with the keyboard, means for justifying the line, and means associated with the justifying means for preventing the return of the justifying means to a normal position until the limit of motion has been attained.

39. In a typographic machine, a keyboard, means for producing and assembling a line of types operably connected with the keyboard, a spacer magazine, spacers normally stored in the spacer magazine, means for introducing the spacers from the spacer magazine into the assembling line, a justifying element for advancing the spacers between the types and withdrawing them therefrom, and a control therefor preventing the subsequent operation of the justifying element until the spacers have been restored to the spacer magazine.

40. In a typographic machine, a keyboard, means for producing and assembling a line of types operably connected with the keyboard, means for justifying the line, means for producing a locking strip and combining it with the justified line, and a control therefor preventing the subsequent operation of the justifying means until the locking strip producing means has completed its cycle of motion and come to a normal position.

41. In a typographic machine, a keyboard, means for producing and assembling a line of types operably connected with the keyboard, means for justifying the line, means for producing a locking strip and combining it with the justified line, means for carrying the line of types from the assembling and justifying means to the locking strip producing means, and a control therefor preventing the subsequent action of the justifying means until the locking strip producing means has completed its cycle of motion and returned to a normal position.

42. In a typographic machine, a keyboard, means for producing and assembling a line of types operably connected with the keyboard, means for justifying the line, a line carriage for removing the justified line from the place of type assemblage, means for producing a locking strip and combining it with the justified line, means for compressing the justified line and locking strip together, and a control therefor preventing the subsequent operation of the justifying means, until the line carriage, the locking strip producing means, and the compressing means have completed their cycle of motion.

43. In a typographic machine, a keyboard, means for casting and assembling a line of types operably connected with the keyboard, means for justifying the line, means for locking the line in its justified condition, and means associated with the justifying means for preventing the return of the justifying means to a normal position until the justification of the line is effected.

44. In a typographic machine, a keyboard, means for casting and assembling a line of types operably connected with the keyboard, means for justifying the line, means for actuating the justifying means, means for locking the types in their justified condition, and means associated with said actuating means to prevent the return of the justifying means to a normal position, until the line has been justified.

45. In a typographic machine, a keyboard, means for producing and assembling a line of types operably connected with the keyboard, means for producing a locking strip and combining it with the line, and an amalgamator in which the line of types and locking strip are compressed together, having within it a moving part against which the line is compressed, said moving part operating to eject the line from the amalgamator after the line is compressed.

46. In a typographic machine, a keyboard, means for producing and assembling a line of types operably connected with the keyboard, means for producing a locking strip and combining it with the line, and an amalgamator in which the line of types and locking strip are compressed together, having an oscillating motion between the place where it receives the line and the place of delivery, and having within it a moving part against which the line is compressed.

47. In a typographic machine, a keyboard, means for casting and assembling a line of types operably connected with the keyboard, means to justify the line, a line carriage to seize the justified line, line jaws set apart to the length of line and positioned normally clear of the types during the type assemblage, means for setting the jaws to engage the ends of the line during its justification, and means for actuating the line carriage to remove the justified line from the place of type assemblage.

48. In a typographic machine, a keyboard, means for producing and assembling a line of types operably connected with the keyboard, a line resistant having operative relation with the line assembling means, means for moving the line resistant to an inoperative position, means for justifying the line, a line carriage, movable jaws for the line carriage to lock the line of types in its justified position, and a control for the line carriage jaws, released when the justification of the line is effected.

49. In a typographic machine, a keyboard, means for producing and assembling a line of types operably connected with the keyboard, spacers, a justifying element for advancing the spacers to justify the line and withdrawing them therefrom, a line carriage actuated by the justifying element when advanced to its limit of motion, to seize the justified types and retain them in their justified condition, means for producing a locking strip, means for transferring the line carriage with the justified types to the locking strip producing means, means for introducing the locking strip into the justified types, and means for compressing the locking strip and types together.

50. In a typographic machine, in which the types are delivered from the casting position to a place of type assemblage, means for assembling a line of types, a keyboard, a mold for casting types operably connected with the keyboard, said mold comprising a mold part movable from the casting position to the place of type delivery, means for causing the movement of the mold part, means to steady the mold part during its movement, and means for separating the type from the mold part at the place of type delivery.

51. In a typographic machine in which the types are delivered from the casting position to a place of type assemblage, a keyboard, means for composing and assembling a line of types, a mold for casting types operably connected with the keyboard, said mold comprising a mold part movable to and from the casting position for the carriage of the type to the assembling means, means for causing the movement of the movable mold part, and means to separate the type from the movable mold part and deliver it to the assembling means.

52. In a typographic machine in which the types are delivered from the casting position to a place of type assemblage, a keyboard, means for assembling a line of types, and a type mold operably connected with the keyboard, said type mold comprising two normally connected mold parts for the casting of the type and its carriage to the type assembling means, means causing the two mold parts to move unitedly to and from the casting position, and means to separate the type from the mold parts for the delivery of the type to the type assembling means.

53. In a typographic machine, a keyboard, means for producing and assembling a line of types operably connected with the keyboard, a line resistant advanced step by step during the assembly of the types, a supporting member to which the line resistant is pivotally connected, and means for actuating the supporting member to remove the line resistant from operative relation with the types until the line has been removed and to then return the line resistant to its initial position.

54. In a typographic machine, a keyboard, means for producing types and assembling them into a line operably connected with the keyboard, two line jaws normally positioned clear of the type and set apart to the exact length of line, a line resistant, and operable means to move the line resistant into and out of operative relation with the line, said operable means having a sliding connection with the line jaws to set them at opposite ends of the line as the line resistant is moved from operative relation therewith.

55. In a typographic machine, a keyboard, means for producing and assembling a line of types operably connected with the keyboard, means for delivering the types to the type assembling means, a line resistant advanced step by step with the assembling types, a supporting member to which the line resistant is pivoted, and means actuating said supporting member to withdraw the line resistant from operative relation with the line.

56. In a typographic machine, a keyboard, means for producing and assembling a line of types operably connected with the keyboard, and a mold to form a locking strip for binding the line of types together, said mold having a movable member within it for impressing the locking strip into the line of types, and means to support the line of types while the locking strip is being impressed into the types.

57. In a typographic machine, a keyboard, means for producing and assembling a line of types operably connected with the keyboard, and a mold to cast a locking strip for binding the types together, said mold having within it a movable member for introducing the locking strip into the line of types.

58. In a typographic machine, a keyboard, means for producing types in any desired order with locking grooves intermediate their ends and assembling them into a composed line operably connected with the keyboard, means for producing a locking strip comprising a mold having within it a moving element for forming the locking strip and introducing it into the locking grooves of the assembled types, and means to compress the locking strip in the said grooves.

59. In a typographic machine, a keyboard, means for producing grooved types and assembling them into a line operably connected with the keyboard, means to justify the line, a locking strip mold, a line carriage to position the justified line contiguous to the locking strip mold, means within the locking strip mold for introducing the locking strip into the grooved types, and means to return the line carriage to its normal position.

60. In a typographic machine, a keyboard, means for producing and assembling a line of types operably connected with the keyboard, a locking strip mold, means within and forming part of the locking strip mold for introducing the locking strip into the line, means to bring the line into operative relation with the locking strip mold to receive the locking strip, a compressor, and means to move the line to the compressor.

61. In a typographic machine, a keyboard, means for producing and assembling a line of types operably connected with the keyboard, a locking strip mold, means within and forming part of the locking strip mold for introducing the locking strip into the line of types, means to bring the line of types into operative relation with the mold to receive the locking strip, and means to resist the pressure on the line during the introduction of the locking strip.

62. In a typographic machine, a keyboard, means for casting and assembling a line of types operably connected with the keyboard, a locking strip mold, means within and forming part of the locking strip mold for introducing the locking strip into the line of types, and means to bring the line of types into operative relation with the locking strip mold to receive the locking strip.

63. In a typographic machine, a keyboard, means for producing types with grooves interjacent their ends and assembling them into a composed line operably connected with the keyboard, and means for producing a locking strip, said means comprising a mold having within it a moving element for introducing the locking strip into the grooved types.

64. In a typographic machine, a keyboard, means for producing types with grooves interjacent their ends and assembling them into a composed line operably connected with the keyboard, means for producing a locking strip, said means comprising a mold having within it a moving element for impressing the locking strip into the grooved types, and means for resisting the pressure of the moving element on the types.

65. In a typographic machine, a keyboard, means for producing types with grooves interjacent their ends and assembling them into a composed line operably connected with the keyboard, a locking strip producing means having within it a moving element for impressing the locking strip into the grooved types; said locking strip producing means having an oscillating motion between the place where it receives the line and the place of delivery.

66. In a typographic machine, a keyboard, means for producing types with grooves interjacent their ends to receive a locking strip and means for assembling the types into a composed line operably connected with the keyboard, a melting pot, and a locking strip mold oscillating between the melting pot and the line of types, said mold having a moving element for impressing the locking strip into the grooved types.

67. In a typographic machine, a keyboard, means for producing and assembling a line of types operably connected with the keyboard, a spacer magazine, spacers, means for introducing the spacers into the line during the assemblage of the types, justifying means for advancing the spacers and spreading the line to its limits and withdrawing the spacers therefrom, means to return the spacers to the spacer magazine, a control for locking the spacer return means in a normal position, means to release said control when the spacers have been withdrawn from the line, said spacer return means then operating to restore the spacers to the spacer magazine and means to restore the spacer return means to a normal position.

68. In a typographic machine, a keyboard, means for producing and assembling a line of types operably connected with the keyboard, a spacer magazine, spacers, means for introducing the spacers from the spacer magazine into the line, justifying means for advancing the spacers and spreading the line to its limits and withdrawing the spacers therefrom, means to return the spacers to the spacer magazine, a control for locking the spacer return means in a normal position, and means to release said control when the spacers have been withdrawn from the line and the justifying means have been returned to a normal position.

69. In a typographic machine, a keyboard, means for producing and assembling a line of types operably connected with the keyboard, a spacer magazine, spacers, means to introduce the spacers into the assembling line, justifying means to advance the spacers and spread the line to its limits and withdraw the spacers therefrom, and means for returning the spacers to the spacer magazine, automatically actuated by the justifying means when the spacers have been withdrawn from the line and the justifying means have been returned to a normal position.

70. In a typographic machine, a keyboard, means for producing and assembling a line of types operably connected with the keyboard, means for determining the length of line normally positioned clear of the path of the types, a line resistant normally positioned in the path of the types and advanced step by step with the assembling line, means for spacing the line, and means for setting the line determining means at the end of the line, removing the line resistant therefrom, and advancing the spacing means to spread the line to the line determining means.

71. In a typographic machine, a keyboard, means for casting types and means for assembling them into a line operably connected with the keyboard, means for justifying the line, and a locking control associated with the justifying means for controlling the action of the justifying means until the limit of motion has been attained.

72. In a typographic machine, a keyboard, means for casting types and assembling them into a line operably connected with the keyboard, two jaws set apart to the exact length of line and normally clear of the types, a line resistant normally in the path of the line, and means for simultaneously setting the jaws at the ends of the line and removing the line resistant therefrom.

73. In a typographic machine, a keyboard, means for casting types and means for assembling them into a line operably connected with the keyboard, means for determining the length of line normally positioned clear of the path of the types, a line resistant normally positioned in the path of the types and advanced step by step with the assembling line, means for justifying the line, and means for setting the line determining means at the ends of the line and removing the line resistant therefrom.

74. In a typographic machine, a keyboard, means for casting types and means for assembling them into a line operably connected with the keyboard, means for justifying the line, and a locking control associated with the justifying means for controlling the action of the justifying means until the justification of the line is completed.

75. In a typographic machine, a keyboard, means for casting types and means for assembling them into a line operably connected with the keyboard, means to justify the line, a line carriage to seize the justified line, line jaws set apart to the exact length of line and normally positioned clear of the types during the type assemblage, means for setting the line jaws to engage the ends of the line during the justification, and means for actuating the line carriage to remove the justified line from the place of type assemblage.

76. In a typographic machine, a keyboard, means for casting types and means for assembling them into a line operably connected with the keyboard, means for justifying the line, means for locking the line in its justified condition, and a locking control associated with the justifying means, controlling the action of the justifying means until the justification of the line is effected and the line is locked in its justified condition.

77. In a typographic machine, a keyboard, means for producing types and assembling them into a composed line operably connected with the keyboard, means to justify the line, a line carriage to seize the justified line and retain it in its justified condition, means for producing a locking strip, means for transferring the line carriage with the justified line to the locking strip producing means, a moving element within the locking strip producing means for introducing the locking strip into the justified line, and means for compressing the locking strip and justified line together.

78. In a typographic machine, a keyboard, means for producing types in any desired order and assembling them into a line operably connected with the keyboard, a spacer magazine, spacers therein, means to introduce the spacers between the assembling types, justifying means to advance the spacers to spread the line to its limits and withdraw the spacers therefrom, and operable means controlled by the justifying means for returning the spacers to the spacer magazine when withdrawn from the line.

79. In a typographic machine, a keyboard, means for producing types in any desired order and assembling them into a composed line operably connected with the keyboard, a spacer magazine, spacers, means for introducing the spacers into the line, justifying means for advancing the spacers and spreading the line to its limits and withdrawing the spacers therefrom, means to return the spacers to the spacer magazine, and a control for the spacer return means actuated when the spacers have been withdrawn from the line.

80. In a typographic machine, a keyboard, means for producing types in any desired order and assembling them into a composed line operably connected with the keyboard, a spacer magazine, spacers, means for introducing the spacers into the line, means for advancing and withdrawing the spacers from the line, a spacer return means, a control for the spacer return means actuated by the means for advancing and withdrawing the spacers.

81. In a typographic machine, a keyboard, means for casting and assembling a plural number of types into a line operably connected with the keyboard, a mold for forming a locking strip, means within and forming part of the mold for introducing the locking strip into the line of assembled types, and means to bring the assembled types into operative relation with the mold to receive the locking strip.

82. In a typographic machine, a keyboard, means for producing types with locking grooves interjacent their ends to receive a locking strip and assembling them into a composed line operably connected with the keyboard, in combination with a melting pot, and a mold for forming a locking strip oscillating between the melting pot and the line, said mold having a moving element within it for forming the locking strip and impressing it into the grooved types.

83. In a typographic machine, a keyboard, means for casting types and assembling them into a line operably connected with the keyboard, in combination with a melting pot, a mold for forming a locking strip oscillating between the melting pot and the assembled line of types, means for causing the oscillation of the mold to bring it alternately into operative relation with the melting pot and the line, means within and forming part of the mold for ejecting the locking strip when in operative relation with the line, and means opposed to the line to resist the pressure of the means for ejecting the locking strip from the mold.

84. In a typographic machine, in combination, means for composing and assembling a line of types, a keyboard, means operably connected with the keyboard for casting types, and means forming part of the type casting means for carrying them from the casting position to the place of type assemblage.

85. In a typographic machine, in combination, means for composing and assembling a line of types, a keyboard, and a mold operably connected with the keyboard for casting types, and means forming part of the type casting means for carrying them from the casting position to the place of type assemblage.

86. In a typographic machine, in combination, means for composing and assembling a line of types, a keyboard, a mold operably connected with the keyboard for casting types, means forming part of the type casting means for carrying them from the casting position to the place of type assemblage, and means to effect the separation of the types from the carrying means at the place of type assemblage.

87. In a typographic machine, in combination, means for composing and assembling a line of types, a keyboard, a mold, having a mold part movable in a fixed path for carrying each type when cast from the casting position to the place of type assemblage, operably connected with the keyboard, and means to effect the separation of the type from the movable mold part at the place of type assemblage.

88. In a typographic machine, in combination, means for composing and assembling a line of types, a keyboard, a mold, comprising a movable element for the carriage of each type from the casting position to the place of type assemblage, operably connected with the keyboard, and means to effect the separation of the type from the movable element at the place of type assemblage.

89. In a typographic machine, in combination, a keyboard, means for casting types operably connected with the keyboard, means for composing and assembling the types, means forming part of the type casting means for carrying the types to the type assembling means, and means for removing the types from the type carrying means to the type assembling means.

90. In a typographic machine, in combination, a keyboard, means for casting and assembling a line of types operably connected with the keyboard, a spacer magazine, spacers, means to introduce the spacers into the assembling line, justifying means to advance the spacers and spread the line to its limits and withdraw the spacers therefrom, means for returning the spacers to the spacer magazine, and a control for the spacer returning means released by the justifying means when restored to a normal position.

91. In a typographic machine, in combination, a keyboard, means for casting and assembling a line of types operably connected with the keyboard, a spacer magazine, spacers, means actuated by the keyboard for introducing the spacers into the line, justifying means for advancing the spacers and spreading the line to its limits and withdrawing the spacers therefrom, means to return the spacers to the spacer magazine, and a control for the spacer return means released by the justifying means when the spacers have been withdrawn from the line and the justifying means have been returned to a normal position.

92. In a typographic machine, in combination, a keyboard, means for casting and assembling a line of types operably connected with the keyboard, a spacer magazine, spacers, means actuated by the keyboard for introducing the spacers into the line, justifying means for advancing the spacers to spread the line to its limits and withdrawing them therefrom, means to return the spacers to the spacer magazine, a control for the spacer return means released by the justifying means when the spacers have been withdrawn from the line and the justifying means have been restored to a normal position, and means to restore the spacer return means to a normal position.

93. In a typographic machine in which a line of types is locked together by a locking strip, in combination, a keyboard, means for casting and assembling a line of types operably connected with the keyboard, means for justifying the line, means for casting a locking strip and combining it with the assembled types, means for pressing the locking strip and justified types together, and a locking control for the justifying means until restored to a normal position.

94. In a typographic machine in which a line of types is locked together by a locking strip, in combination, a keyboard, means for casting and assembling a line of types operably connected with the keyboard, means for justifying the line, a mold for casting a locking strip having within it a moving part for combining the locking strip with the assembled types, and means for compressing the justified types and locking strip together, set in motion by the action of the justifying means when restored to a normal position.

95. In a typographic machine, in combination, a keyboard, means for casting types in any desired order and assembling them into a line operably connected with the keyboard, means to justify the line, a line carriage, a locking strip mold, means within the locking strip mold for introducing the locking strip into the line, means actuating the line carriage to seize the justified line and position it contiguous to the locking strip mold, and means to release the line carriage and return it to a normal position when the locking strip is introduced into the line.

96. In a typographic machine, in combination, a keyboard, operable means for casting type, operable means for trimming the foot of the type, and a control therefor operably connected with the keyboard and actuated coincident with the operation of a character key.

97. In a typographic machine, in combination, a keyboard, operable means for casting type, means for trimming the foot of the type, means for ejecting the type from the type casting means to an assembling line, and a control for the casting, trimming and ejecting means operably connected with the keyboard and actuated by the operation of a character key.

98. In a typographic machine, in combination, a keyboard, operable means for casting type, having an ingate for the mold, means for cleaning the ingate, and a control for the cleaning means operably connected with the keyboard and actuated coincident with the operation of a character key.

99. In a typographic machine, in combination, a keyboard, means actuated by the keyboard for casting individual types and assembling them into a line in the order of their production, means for determining the length of line normally clear of the types, means for justifying the line, and operable means for setting the line determining means at the ends of the line, and then actuating the justifying means to spread the line to its limits.

100. In a typographic machine, in combination, a keyboard, means actuated by the keyboard for casting individual types and assembling them into a line in the order of their production, a line resistant advanced step by step with the assembling line, means for determining the length of line, means for justifying the line, and operable means for removing the line resistant from the line and setting the line determining means at the ends thereof and then actuating the justifying means to spread the line to its limits.

101. In a typographic machine, in combination, a keyboard, means actuated by the keyboard to produce and assemble a line of types, a spacer magazine, spacers introduced from the spacer magazine into the assembling line, a justifying element to advance the spacers and spread the line to its limits and then withdraw the spacers therefrom, spacer return means normally locked in an inoperative position released when the justifying element has withdrawn the spacers from the justified line, means to remove the justified line from its place of assemblage, and a control for the line removing means actuated by the spacer return means.

102. In a typographic machine, a keyboard, means actuated by the keyboard to produce individual types and assemble them into a line, spacers, means to introduce the spacers between the assembling types, a justifying element to advance the spacers to spread the line to its limits and then withdraw the spacers therefrom, spacer return means normally locked in an inoperative position released by the justifying element when it has withdrawn the spacers from the line, means to introduce a locking strip into the justified line, and a control therefor actuated by the spacer return means.

103. In a typographic machine, a keyboard, means actuated by the keyboard for producing individual types and assembling them into a line, spacers, means for introducing the spacers between the assembling types, a justifying element to advance the spacers for the justification of the line and then withdraw the spacers therefrom, spacer return means normally locked in an inoperative position released by the justifying element when it has withdrawn the spacers from the justified line, means to produce a locking strip, means to introduce the locking strip into the justified line, and a control therefor actuated by the spacer return means when it has returned the spacers to a position of rest.

104. In a typographic machine, a keyboard, means actuated by the keyboard for producing and assembling a line of types, means for justifying the line, and a locking control for the justifying means until its limit of motion has been attained.

105. In a typographic machine, a keyboard, means actuated by the keyboard for producing and assembling a line of types, means for determining the length of line, means for bringing the line determining means into operative relation with the line, and a locking control therefor until the limit of motion has been attained.

106. In a typographic machine, a keyboard, means actuated by the keyboard for producing and assembling a line of types, means for determining the length of line, means for justifying the line, and a locking control for the justifying means until its limit of motion has been attained.

107. In a typographic machine, a keyboard, means actuated by the keyboard for producing and assembling a line of types, a line resistant advanced step by step during the assemblage of the types, means for justifying the line, and a locking control for the justifying means until its limit of motion has been attained.

108. In a typographic machine, a keyboard, means actuated thereby for producing and assembling a line of types, a spacer magazine, means for introducing the spacers therefrom into the assembling line, means for returning the spacers to the spacer magazine, means for justifying the line, and a control for the spacer return means released when the justifying means has completed its cycle of motion.

109. In a typographic machine, a keyboard, means actuated by the keyboard for producing and assembling a line of types, a spacer magazine, means for introducing the spacers from the spacer magazine into an assembling line, a justifying element for advancing the spacers to spread the line to its limits and then withdrawing the spacers therefrom, means for returning the spacers to the spacer magazine normally locked in an inoperative position and released by the justifying element when it has withdrawn the spacers from the justified line, means for producing and combining a locking strip with the justified types, a shaft from which the locking strip producing and combining means are actuated and a control for the revolution of the shaft actuated by the spacer return means when it has returned the spacers to the spacer magazine.

110. In a typographic machine, a keyboard, means actuated by the keyboard for producing and assembling a line of types, a spacer magazine, spacers contained therein, means for introducing the spacers from the spacer magazine into the assembling line, means for returning the spacers to the spacer magazine, a starting means controlling the action of the spacer returning means, means for producing a locking strip and combining it with the justified types, a shaft for actuating the locking strip producing means, a control for the shaft actuated by the spacer return means when the spacers have been returned to the spacer magazine, and a control for the starting means preventing its subsequent action until the shaft has completed its cycle of motion.

111. In a typographic machine, a keyboard, means actuated thereby for casting and assembling a line of types, spacers, means for introducing the spacers between the assembling types, a justifying element for advancing the spacers to justify the line and withdrawing them therefrom, a line carriage, said justifying element actuating the line carriage to lock the types in their justified condition, means for then moving the line carriage to a position where the types receive a locking strip and then returning the line carriage to the place of type assemblage, and a mold for casting a locking strip, having within it a moving element for combining the locking strip with the types to lock them in their justified condition.

112. In a typographic machine, a keyboard, means actuated thereby for casting and assembling a line of types, spacers, means for introducing the spacers between the assembling types, a justifying element for advancing the spacers to justify the types and withdrawing them therefrom, a line carriage, said justifying element actuating the line carriage to lock the types in their justified condition before the spacers are withdrawn therefrom, means for moving the line carriage to a position where the types receive a locking strip and then returning the line carriage to the place of type assemblage, and a mold for casting a locking strip having within it a moving element for combining the locking strip with the types to lock them in their justified condition.

113. In a typographic machine, a keyboard, means actuated thereby for casting and assembling a line of types, spacers, means for introducing the spacers between the assembling types, a justifying element for advancing the spacers to justify the line and then withdrawing them therefrom, a line carriage, said justifying element actuating the line carriage to lock the line in its justified condition, means for moving the line carriage to a position where the types receive a locking strip and then returning the line carriage to the place of type assemblage, and a mold for casting the locking strip having within it a moving element for combining the locking strip with the types to lock them in their justified condition.

114. In a typographic machine, a keyboard, means actuated thereby for casting and assembling a line of types, spacers, means for introducing the spacers between the assembling types, a justifying element for advancing the spacers to justify the types and withdrawing them therefrom, a line carriage, said justifying element actuating the line carriage to lock the types in their justified condition before the spacers are withdrawn therefrom, means for moving the line carriage to a position where the types receive a locking strip and then returning the line carriage to the place of type assemblage, and a mold for casting a locking strip having within it a moving element for combining the locking strip with the types to lock them in their justified condition.

115. In a typographic machine, a keyboard, means actuated thereby for casting types and assembling them into a line, spacers, means for introducing the spacers between the assembling types, a justifying element for advancing the spacers to justify the types and then withdrawing them therefrom, a line carriage, said justifying element actuating the line carriage to lock the types in their justified condition, means for actuating the line carriage to move the types to the place where they receive a locking strip, a mold for casting the locking strip, having within it a moving element for combining the locking strip with the types, and means for compressing the locking strip and types together.

Brooklyn, September 15th, 1911.

ERNEST B. BARBER.

Signed in the presence of—
CLARENCE E. SMITH,
ANNA T. CLAMPETT.

---

Copies of this patent may be obtained for five cents each, by addressing the "Commissioner of Patents Washington, D. C."